United States Patent
Tanaka

(10) Patent No.: US 6,818,568 B2
(45) Date of Patent: Nov. 16, 2004

(54) METHOD OF USING BEAM HOMOGENIZER AND LASER IRRADIATION APPARATUS

(75) Inventor: Koichiro Tanaka, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/122,392

(22) Filed: Apr. 16, 2002

(65) Prior Publication Data

US 2002/0146873 A1 Oct. 10, 2002

Related U.S. Application Data

(62) Division of application No. 09/515,691, filed on Feb. 29, 2000, now Pat. No. 6,393,042.

(30) Foreign Application Priority Data

Mar. 8, 1999 (JP) ............................................. 11-060368

(51) Int. Cl.[7] .......................... H01L 21/26; H01L 21/00; H01L 21/331; H01L 21/20; H01L 21/44

(52) U.S. Cl. ...................... 438/795; 438/166; 438/378; 438/487; 438/662; 438/795

(58) Field of Search ................................. 438/166, 378, 438/487, 662, 795

(56) References Cited

U.S. PATENT DOCUMENTS

| | | | |
|---|---|---|---|
| 4,733,944 A | 3/1988 | Fahlen et al. | |
| 4,916,504 A | * 4/1990 | Nakahara | .................... 257/69 |
| 5,095,386 A | 3/1992 | Scheibengraber | |

(List continued on next page.)

FOREIGN PATENT DOCUMENTS

| | | |
|---|---|---|
| EP | 0 905 540 A2 | 3/1999 |
| JP | 0 5-17525 A | 7/1993 |
| JP | 06-244104 A | 9/1994 |
| JP | 10-242073 A | 9/1998 |
| JP | 10-244392 A | 9/1998 |
| JP | 10-253916 A | 9/1998 |
| JP | 10-270379 A | 10/1998 |
| JP | 10-293267 A | 11/1998 |
| JP | 10-294288 A | 11/1998 |
| JP | 11-109280 A | 4/1999 |
| JP | 11-186189 A | 7/1999 |

OTHER PUBLICATIONS

Kunigita et al., "A 2–inch Diagonal XGA Reflective Array with Low–Temperature Poly–Si TFTs", Display and Imaging, vol. 7, 1998, pp. 157–164.

Furue et al., "Characteristics and Driving Scheme of Polymer–Stabilized Monostable FLCD Exhibiting Fast Response Time and High Contrast Ratio with Gray–Scale Capability", SID 98 Digest, pp. 782–785.

Yoshida et al., "A Full–Color Thresholdless Antiferroelectric LCD Exhibiting Wide Viewing Angle with Fast Response Time", SID 97 Digest, pp. 841–844.

Inui et al., "Thresholdless Antiferroelectricity in liquid crystals and its application to displays", J. Mater Chem., 1996, 6(4), pp. 671–673.

Primary Examiner—John F. Niebling
Assistant Examiner—Stanetta Isaac
(74) Attorney, Agent, or Firm—Jeffrey L. Costellia; Nixon Peabody LLP

(57) ABSTRACT

There is provided a beam homogenizer which can unify the energy distribution of a linear laser beam in a longitudinal direction. In the beam homogenizer including cylindrical lens groups for dividing a beam, and a cylindrical lens and a cylindrical lens group for condensing the divided beams, the phases, in the longitudinal direction, of linear beams passing through individual cylindrical lenses of the cylindrical lens group for condensing the divided beams are shifted, and then, the beams are synthesized, so that the intensity of interference fringes of the linear beam on a surface to be irradiated is made uniform.

42 Claims, 33 Drawing Sheets

U.S. PATENT DOCUMENTS

| | | |
|---|---|---|
| 5,153,773 A | 10/1992 | Muraki et al. |
| 5,307,207 A | 4/1994 | Ichihara |
| 5,414,559 A | 5/1995 | Burghardt et al. |
| 5,534,970 A | 7/1996 | Nakashima et al. |
| 5,594,569 A | 1/1997 | Konuma et al. |
| 5,796,521 A | 8/1998 | Kahlert et al. |
| 5,844,727 A | 12/1998 | Partlo |
| 5,879,977 A | 3/1999 | Zhang et al. |
| 5,897,799 A | 4/1999 | Yamazaki et al. |
| 5,900,980 A | 5/1999 | Yamazaki et al. |
| 5,959,779 A | 9/1999 | Yamazaki et al. |
| 6,002,523 A | 12/1999 | Tanaka |
| 6,104,535 A | 8/2000 | Tanaka |
| 6,137,633 A | 10/2000 | Tanaka |
| 6,160,827 A | 12/2000 | Tanaka |
| 6,172,820 B1 * | 1/2001 | Kuwahara .................. 359/719 |
| 6,176,926 B1 | 1/2001 | Tanaka |
| 6,212,012 B1 | 4/2001 | Tanaka |
| 6,249,385 B1 | 6/2001 | Yamazaki et al. |
| 6,304,385 B1 | 10/2001 | Tanaka |
| 6,310,727 B1 | 10/2001 | Tanaka |
| 2001/0052513 A1 | 12/2001 | Tanabe |
| 2001/0053030 A1 * | 12/2001 | Tanaka |

* cited by examiner $\Delta D = D/2$
$(\Delta D = D/(n'-1))$ $\Delta D = d/3$
$\Delta D = d/(n'-1))$

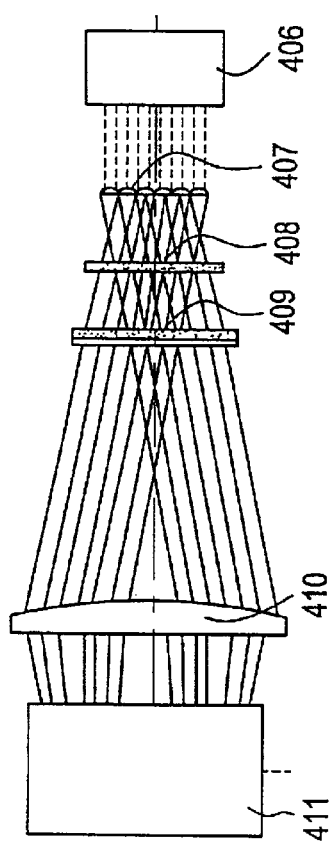
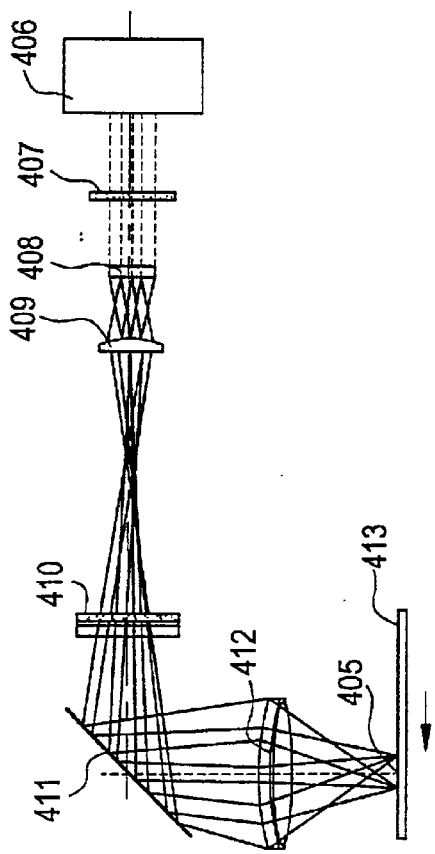

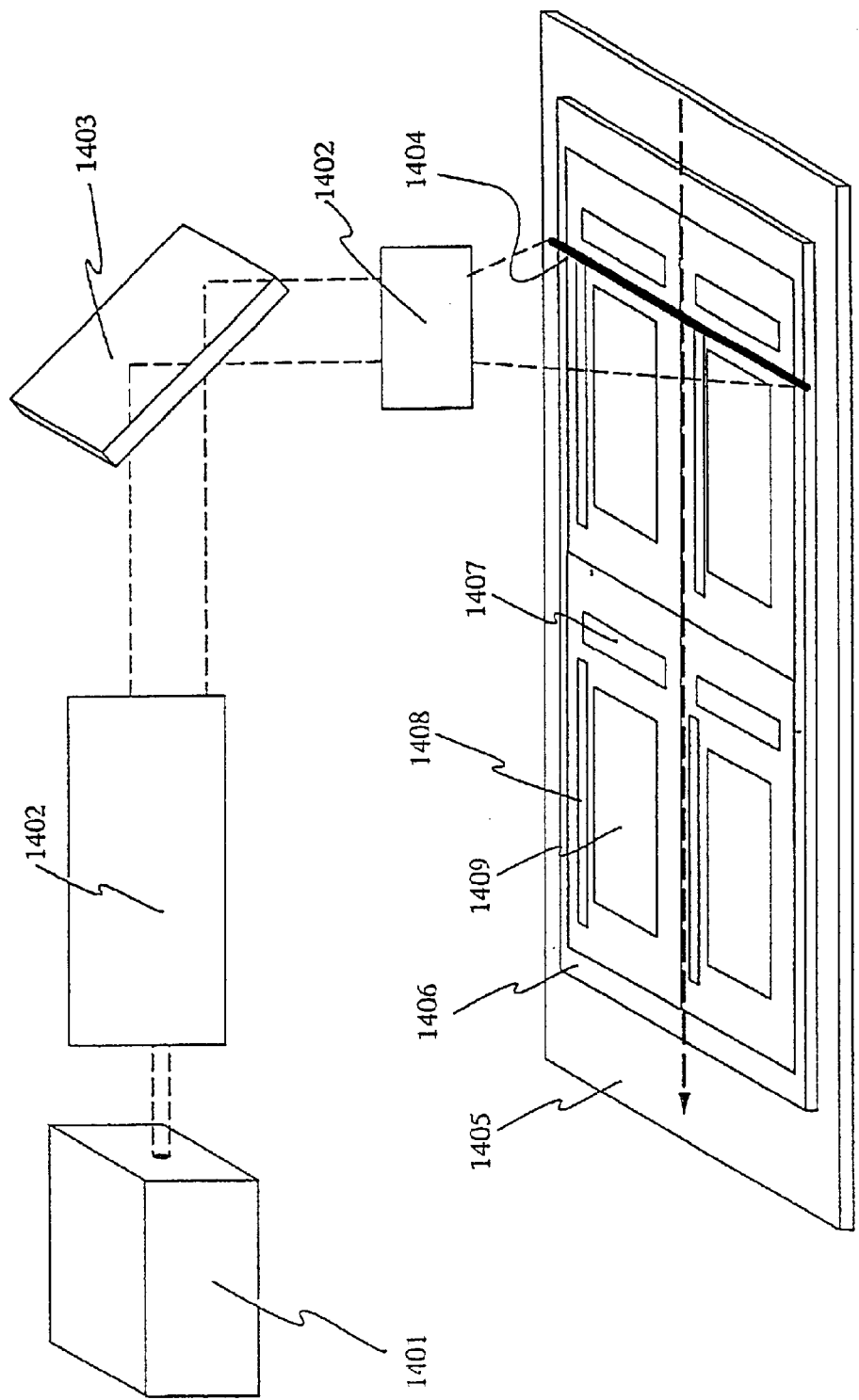

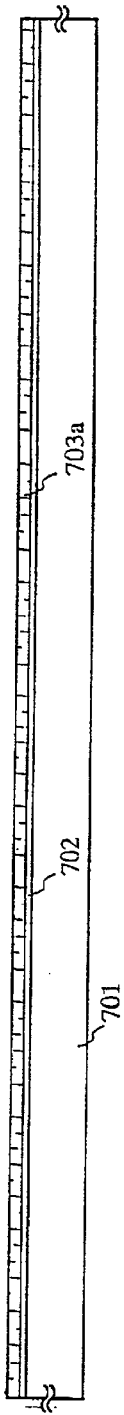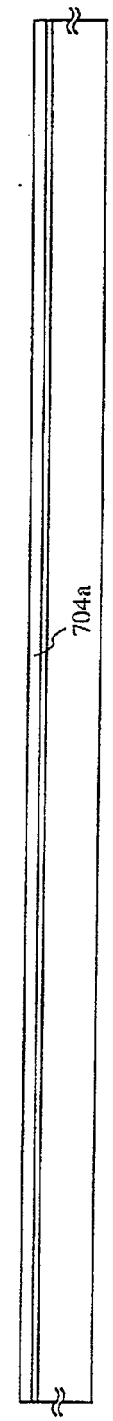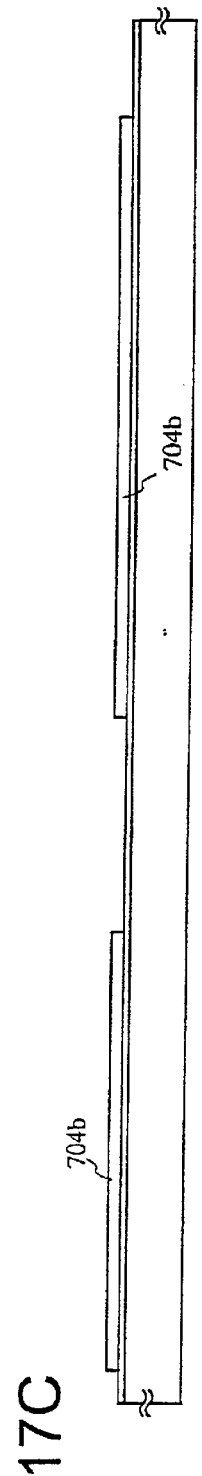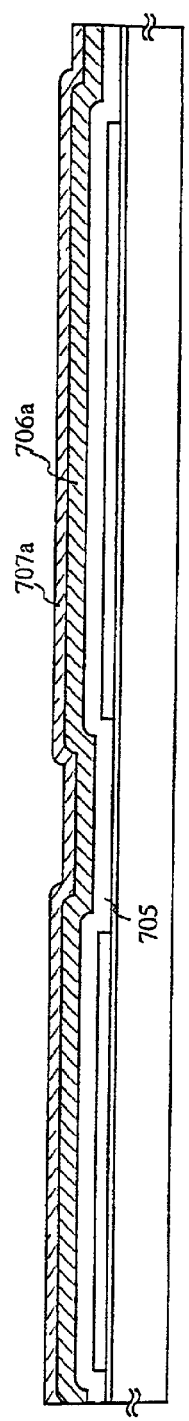
FIG. 17A  FIG. 17B  FIG. 17C  FIG. 17D

SCANNING DIRECTION

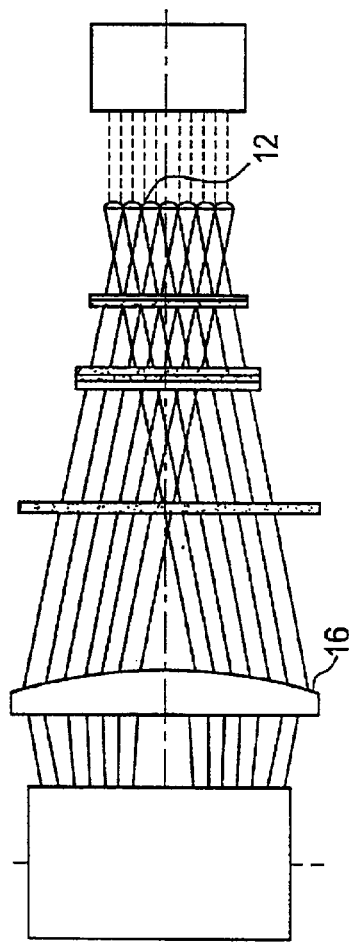
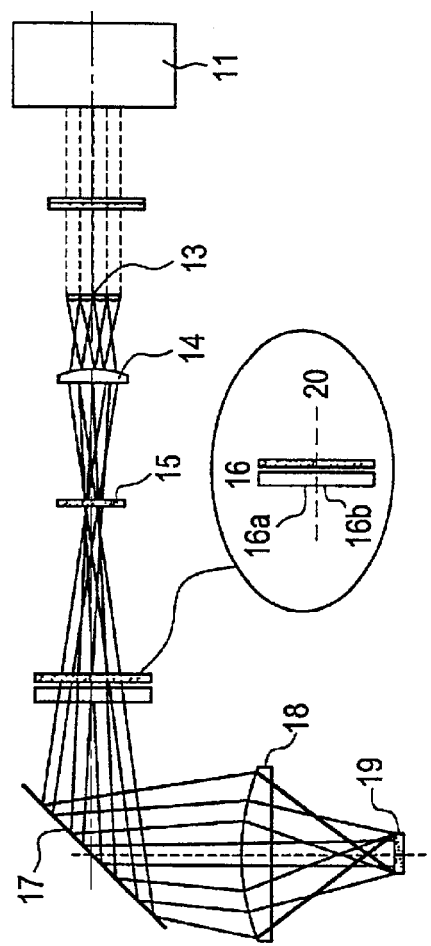
FIG. 25A
FIG. 25B

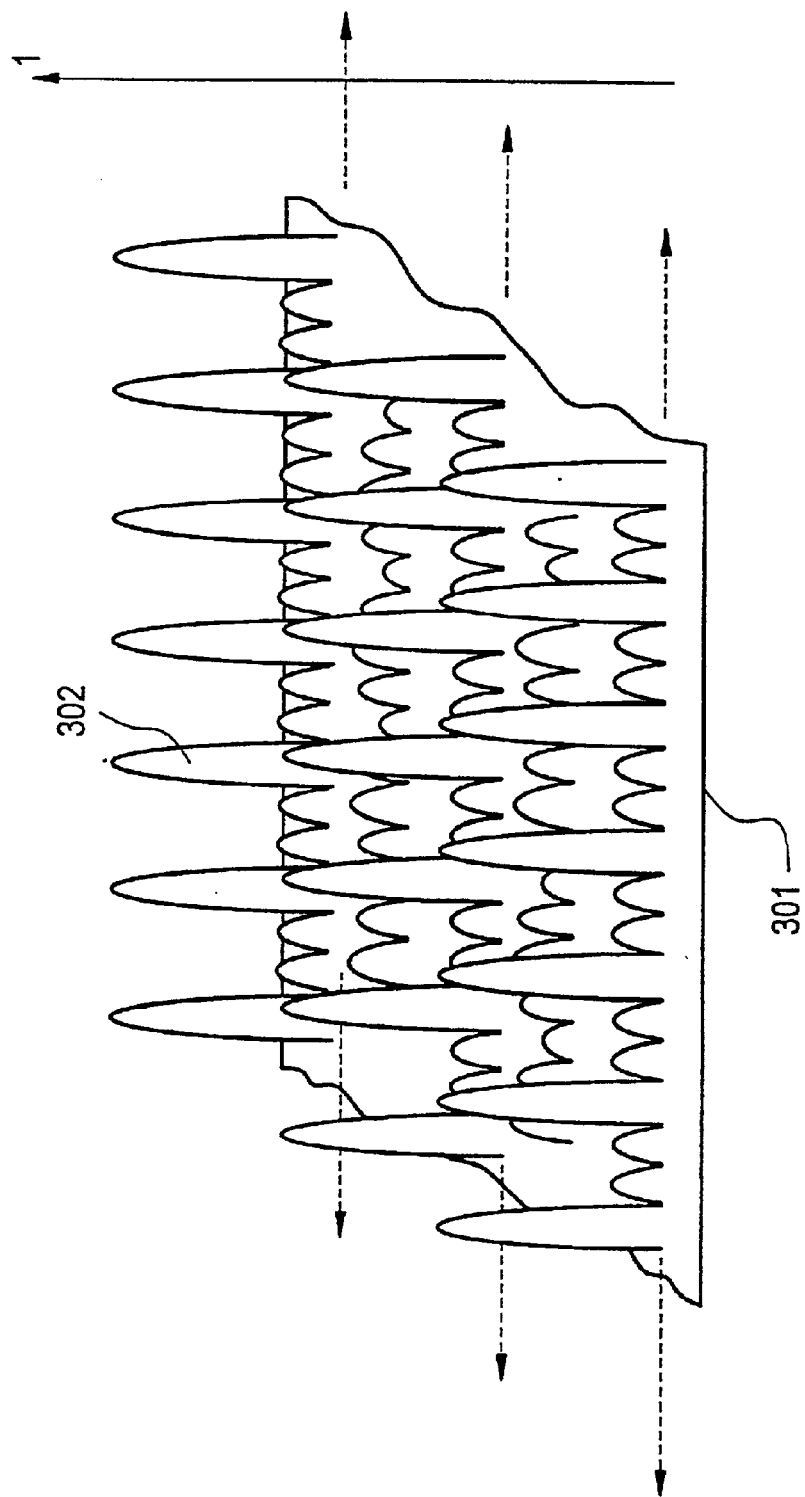

METHOD OF USING BEAM HOMOGENIZER AND LASER IRRADIATION APPARATUS

BACKGROUND OF THE INVENTION

1. Field of the Invention

The present invention relates to a technique for uniformly irradiating a laser beam to a large area. In addition, the invention relates to its application.

2. Description of the Related Art

In recent years, a wide research has been made on a technique for carrying out a laser annealing to an amorphous semiconductor film or a crystalline semiconductor film (semiconductor film having crystallinity, such as polycrystal or microcrystal, not single crystal), that is, a non-single crystal semiconductor film formed on an insulating substrate of glass or the like to crystallize it or to improve its crystallinity. A silicon film is often used as the above semiconductor film.

As compared with a quartz substrate which has been hitherto often used, a glass substrate has such merits that it is inexpensive and is rich in workability, and a large substrate can be easily formed. This is the reason why the foregoing research has been carried out. Besides, the reason why a laser is preferably used for crystallization is that the melting point of the glass substrate is low. The laser can give high energy to only a non-single crystal film without greatly changing the temperature of the substrate.

Since a crystalline silicon film formed by the laser annealing has a high mobility, a thin film transistor (TFT) is formed by using this crystalline silicon film. For example, it is actively used for a monolithic liquid crystal electro-optical device in which TFTs for pixel driving and for driver circuits are formed on one glass substrate. Since the crystalline silicon film is made of a number of crystal grains, it is called a polycrystal silicon film or polycrystal semiconductor film.

A method in which a pulse laser beam of an excimer laser or the like having high output is processed by an optical system so that a rectangular spot of several cm or a linear beam of several mm in width×not less than 10 cm in length is formed on a surface to be irradiated, and the laser beam is scanned (irradiation position of the laser beam is relatively moved with respect to the irradiated surface) to carry out the laser annealing, is superior in mass productivity and is excellent in technology. Thus, this method is used by choice.

Particularly, when a linear laser beam is used, unlike the case of using a spot-like laser beam which requires back-and-forth and right-and-left scanning, laser irradiation to the whole surface to be irradiated can be made by scanning in only the direction perpendicular to the line direction of the linear laser. Thus, high mass productivity can be obtained. The reason why scanning is made in the direction perpendicular to the line direction is that it is the most effective scanning direction. Because of this high mass productivity, at present, in the laser annealing, it has become the mainstream to use the linear laser beam obtained by processing the excimer laser beam through a suitable optical system.

Recently, a continuous-wave laser, such as an Ar laser, having a higher output has been developed. There is also a report that an Ar laser was used for annealing of a semiconductor film and an excellent result was obtained. In this case, since the output of the Ar laser is not sufficient, an irradiation surface has a spot shape.

As a laser widely used for crystallization, an excimer laser is known as a gas laser, and a ND:YAG laser, Nd:YVO$_4$ laser, or argon laser is known as a solid laser.

Since the continuous-wave argon laser has a wavelength of about 500 nm, the absorption coefficient of the argon laser to a silicon film is about $10^5$/cm. On the other hand, since the excimer laser is ultraviolet light of 400 nm or less, the absorption coefficient is about $10^6$/cm which is higher than the argon laser by one digit. Thus, in the argon laser, the intensity is decreased to 1/e (e is a natural logarithm) at the point when the light travels 100 nm through the silicon film, while in the excimer laser, the intensity is decreased to 1/e at the point when the light travels 10 nm through the silicon film.

In general, in the field of a TFT, it is considered to be suitable that the thickness of a polycrystal silicon film is about 50 nm. If the silicon film has a thickness more than 50 nm, there is a tendency that off characteristics become deteriorated, and if less than 50 nm, the reliability is influenced. In the case where the argon laser light is irradiated to the silicon film having a thickness of 50 nm, more than half of the laser light transmits the silicon film and is absorbed by the glass substrate, so that the glass substrate is heated more than needed. Actually, when a silicon oxide film having a thickness of 200 nm and a silicon film having a thickness of 50 nm were sequentially formed on a Coming 1737 substrate and crystallization was attempted, the glass was deformed before the silicon film was sufficiently crystallized.

On the other hand, in the case of irradiation of the excimer laser, almost all energy is absorbed by the silicon film having a thickness of 50 nm, so that almost all laser light can be used for crystallization of the silicon film. Like this, the merit of using the excimer laser for crystallization of the silicon film is that the absorption coefficient of the excimer laser to the silicon film is high.

FIG. 24A is a top view of a silicon film, which is irradiated with a conventional pulse oscillation excimer laser while being scanned, seen from the above. FIG. 24B is a sectional view of the silicon film cut along a section (surface perpendicular to the silicon film containing a line E–F) parallel to the scanning direction of the pulse oscillation excimer laser. FIG. 24C is a sectional view of the silicon film cut along a surface (surface perpendicular to the silicon film containing a line G–H) perpendicular to the section and perpendicular to the silicon film.

As is understood from FIG. 24B, irradiation traces of the pulse laser produce undulations of the same order as the thickness of the silicon film. On the other hand, although the undulations shown in FIG. 24C are vary small as compared with the undulations of FIG. 24B, periodic undulations appear. These are due to the interference of linear beams shaped by a beam homogenizer as described later.

An optical system serving to homogenize an energy distribution (light intensity) in a linear beam is called a beam homogenizer. FIGS. 25A and 25B show an example of the beam homogenizer.

On an optical path, cylindrical lens groups (also called a multi-cylindrical lens or cylindrical lens array) 12 and 13, a cylindrical lens 14, a slit 15, a cylindrical lens 16, and a mirror 17 are sequentially disposed from an outgoing side of a laser apparatus 11 as an optical source of an excimer laser. A cylindrical lens 18 is disposed on an optical path in the reflecting direction of the mirror 17.

The cylindrical lens 12 divides a beam into plural beams in a predetermined one direction (direction perpendicular to the paper surface of the side view), and the beams divided in this direction are synthesized in the cylindrical lens 16. On the other hand, the cylindrical lens group 13 also divides a beam into plural beams in a predetermined one direction (direction parallel to the paper surface of the side view), and the beams separated in the dividing direction of the cylindrical lens group 13 are synthesized in the cylindrical lens 14.

Thus, the laser beam emitted from the oscillator is divided two-dimensionally by the cylindrical lens groups 12 and 13, and is inputted on the cylindrical lens 14. Some of the plural beams are synthesized in the predetermined direction (direction perpendicular to the paper surface of the side view) so that plural beams divided in the one direction (direction parallel to the paper surface) are formed and pass through the slit 15. The beams are condensed by the cylindrical lens 16 so that they become again one beam. The condensed beam is reflected by the mirror 17, is condensed by the cylindrical lens 18, and is irradiated as a linear beam 19 (direction perpendicular to the paper surface of the side view is a longitudinal direction).

In the homogenizer of FIGS. 25A and 25B, the dividing directions of the beam in the cylindrical lens groups 12 and 13 cross at right angles, and the condensing directions of the beam in the cylindrical lenses 14 and 16 cross at right angles. The intensity distribution of the linear laser beam 19 in the longitudinal direction is unified by the combination of the cylindrical lens group 12 and the cylindrical lens 16. The intensity distribution of the linear laser beam 19 in the width direction is unified by the combination of the cylindrical lens group 13 and the cylindrical lens 14. That is, the beam is divided two-dimensionally and is again synthesized, so that the energy of the linear beam is unified.

Thus, it appears that as the number of beams divided by the cylindrical lens groups 12 and 13 becomes large, the distribution of energy becomes uniform. However, irrespective of the fineness of division, stripe patterns of irradiation traces of the linear laser beam were formed on the silicon film. As shown in FIG. 24A, the countless stripe patterns appear to be orthogonal to the longitudinal direction of the linear laser beam (scanning direction of the linear beam, direction of GH), and peaks appear periodically on the silicon film as shown in FIG. 24C. It is expected that the cause of the stripe patterns is either one of the beam before it is incident on the beam homogenizer and the optical system of the beam homogenizer.

The present inventor carried out a simple experiment to find the cause of the stripe patterns. An examination was made on the change of the stripe patterns caused by rotating a laser beam before the rectangular laser beam was incident on the beam homogenizer. The result was that the stripe patterns did not change at all. It has been found that the cause of the stripe patterns is not the beam before it is incident on the beam homogenizer but the beam homogenizer. In the beam homogenizer, since a beam with a single wavelength and equal phases (since a laser obtains the intensity by equalizing the phases, the phases of light are naturally equalized) is divided and is again superimposed to unify the energy, it is permissible to explain that the stripe patterns are optical interference fringes when light is superimposed.

SUMMARY OF THE INVENTION

An object of the present invention is to solve the foregoing problem of interference of beams having equal phases, such as laser light, and to unify the energy distribution of the linear laser light in the longitudinal direction.

A beam homogenizer of the invention comprises a first dividing optical lens for dividing one beam into (2n+1) beams in a first direction, a second dividing optical lens for dividing one beam into N(n−1) beams in a second direction perpendicular to the first direction, a first synthesizing lens for condensing light in the second direction and for synthesizing the plurality of beams divided in the second direction, and a second synthesizing lens for condensing light in the first direction and for synthesizing the plurality of beams divided in the first direction, wherein the second synthesizing lens includes (n'−1) cylindrical lenses, wherein images obtained by orthogonal projection of respective principal points of the (n'−1) cylindrical lenses onto a plane orthogonal to the second direction become (n'−1) points arranged with an interval of d/(n'−1) on a same line, wherein the character d designates an interval of peaks of interference fringes formed on an irradiation surface by the beam passing through one cylindrical lens of the second synthesizing lens, and wherein the character N designates a natural number, the character n designates an integer not less than 3, and the character n' designates an integer satisfying $3 \leq n' \leq n$.

When the phases of the plurality of linear laser beams in the longitudinal direction are shifted by a predetermined size and are synthesized, the intensity of the interference fringes on the irradiated surface of the linear beams can be made uniform, as shown in FIGS. 28A–28C and 29A–29D explained later.

When a mirror is inserted in the beam homogenizer of the invention, since the direction of an optical path is changed, the dividing direction of the beam by the cylindrical lens or the condensing direction is also changed. However, in the invention, the change of direction by the mirror is neglected, and the case including no mirror is assumed.

According to the invention, in the second synthesizing lens, the phases of the plurality of beams are shifted, and the plurality of beams are condensed so that they are irradiated to the same region. Thus, in the second synthesizing lens, the principal points of the respective cylindrical lenses are shifted by d/(n'−1) in the direction perpendicular to the optical axis.

The first dividing lens of the invention includes a cylindrical lens group in which (2n+1) cylindrical lenses with optical axes parallel to each other are coupled into a column shape (array shape). Moreover, here, although a beam is divided into an odd number (2n+1) beams in the first dividing cylindrical lens group, it may be divided into an even number (2n) beams. In this case, 2n cylindrical lenses with optical axes parallel to each other may be coupled into a column shape.

The second dividing lens of the invention may be constructed by a cylindrical lens group in which N(n−1) cylindrical lenses with optical axes parallel to each other are coupled in a column shape. The first synthesizing lens may use a cylindrical lens.

The homogenizer of the invention shows remarkable effects in the case where coherent beams are linearly shaped, and the light intensity of the linear beam in the longitudinal direction can be smoothed. As a light source of the coherent light, a laser apparatus such as a gas laser or solid laser is used. A continuous-wave argon laser apparatus or pulse oscillation type excimer laser apparatus may be used.

As the gas laser, an excimer laser may be named. Although the excimer laser is widely recognized as a pulse oscillation type laser, a continuous-wave excimer laser oscillation apparatus has been developed recently. In order to make continuous light emission, a microwave is used to accelerate excitation of an oscillation gas.

By irradiating the microwave of the order of giga hertz to the oscillation gas to promote a rate determining reaction of oscillation, it has become possible to make continuous light emission of the excimer laser. The excimer laser having a high absorption coefficient to a silicon film becomes more and more important for crystallization of a semiconductor film when a continuous-wave one is put into practical use. When the continuous-wave excimer laser is used, irradiation traces of a pulse laser can be eliminated, so that the effect of laser irradiation processing can be greatly made uniform.

As the excimer laser, for example, a KrF laser (wavelength 248 nm), XeCl excimer laser (wavelength 308 nm), XeF laser (wavelength 351 nm, 353 nm), ArF excimer laser (wavelength 193 nm), XeF laser (wavelength 483 nm), or the like may be used.

As the solid laser, a pulse oscillation type Nd:YAG laser or Nd:YVO$_4$ laser may be used. Especially when a pulse oscillation laser apparatus of laser diode excitation system is used, a high output and high pulse oscillation frequency can be obtained. Although the basic frequency of the Nd:YAG laser or Nd:YVO$_4$ laser is 1064 nm, not only the basic frequency but also either one of the second harmonic (532 nm), third harmonic (354.7 nm), and fourth harmonic (266 nm) may be used.

BRIEF DESCRIPTION OF THE DRAWINGS

FIG. 13 is a view showing an optical system for forming a linear laser of Embodiment 4;

FIG. 16 is a view showing a state of laser irradiation to a multiple substrate of Embodiment 6;

FIGS. 17A to 17D are views showing fabricating steps of an AM-LCD of Embodiment 7;

FIGS. 25A and 25B are structural views of a beam homogenizer;

FIG. 26 is a view showing an intensity distribution of a linear beam;

DETAILED DESCRIPTION OF THE INVENTION

[Process Leading to the Invention]

Figure 1A:
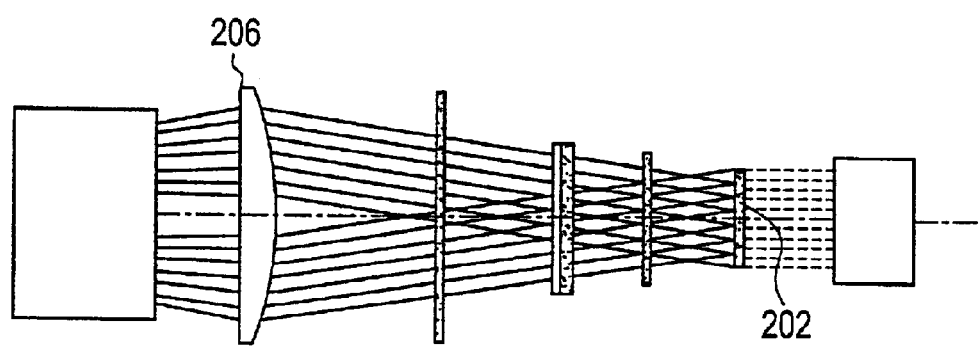
FIGS. 1A and 1B are structural views of a beam homogenizer of the present invention.

First, the process leading to the invention will be described.

FIG. 26 schematically shows the state of light interference fringes of the linear laser beam 19 formed by the beam homogenizer of FIGS. 25A and 25B. In FIG. 26, the vertical axis indicates laser intensity I. As shown in the drawing, a peak 302 in laser intensity periodically appears in a linear laser beam 301. This peak 302 is the interference fringe.

The occurrence of the peak 302 is caused from the fact that when the beams divided by the cylindrical lens groups 12 and 13 of the beam homogenizer are synthesized, the beams interfere with each other and standing waves are formed in the beams. That is, it appears that since the divided laser beams are superimposed at the same region of the irradiated surface, the large peak 302 occurs periodically.

As shown in FIG. 26, in the beam homogenizer of FIG. 25, three waves are formed per period in the longitudinal direction of the linear laser beam 19. The number n of waves (which can be said to be the number of bright lines of the interference fringes in one period) and the number s of lenses of the cylindrical lens group 12 satisfy the following equation.

$$n=(s-1)\div 2 \quad (s \text{ is an odd number})$$

$$n=s\div 2 \quad (s \text{ is an even number})$$

In the beam homogenizer of FIG. 25, the number of lenses of the cylindrical lens group 12 is s=7 (odd number), and the number of waves is n=3.

Figure 27A:
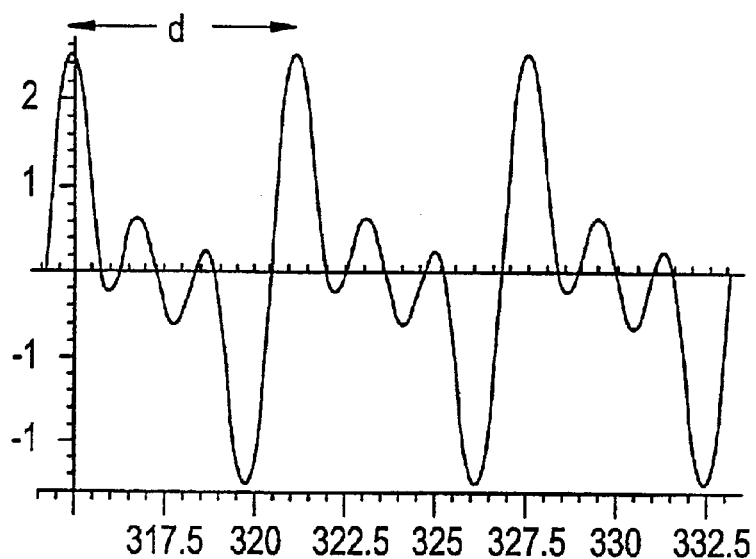
FIGS. 27A and 27B are views showing simulation results of the intensity distribution of linear beam in the longitudinal direction.
Figure 27B:
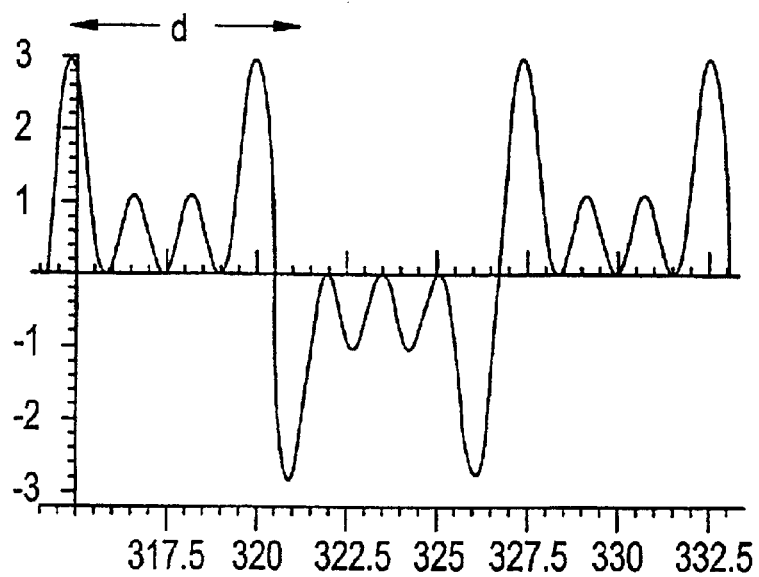

The present inventor calculated the relation between the shape of the wave of the linear beam in the longitudinal direction at some time of the linear laser beam and the number s of lenses through a computer. FIGS. 27A and 27B show the calculation results. FIG. 27A shows a case of S=7 and n=3, and FIG. 27B shows a case of s=8 and n=4.

In FIGS. 27A and 27B, the horizontal axis indicates the phase (position) of a linear laser beam in the longitudinal direction, and the vertical axis indicates the amplitude of a wave. The square of the amplitude (value of the vertical axis) becomes the intensity of light (degree of strengthening of light beams with the same phase). Reference character d designates a length of one period and designates an interval between brightest lines of the interference fringes. The interference of the wave of FIG. 27A corresponds to FIG. 26, and the character d becomes an interval of the peaks 302 having the highest intensity.

Figure 24A:
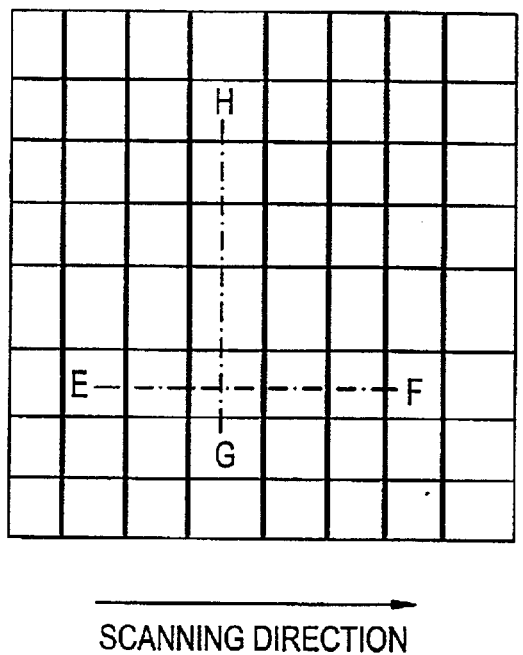
FIGS. 24A to 24C are schematic views of a silicon film irradiated with a conventional linear beam.
Figure 24B:

FIGS. 27A and 27B show the results of computer simulation, and in an actual linear laser beam, the contrast in the light intensity does not become clear as in the simulation. It is inferred that this is caused by a subtle shift of an optical system, a material of an optical member, a working error, dispersion of energy due to thermal conduction in a semiconductor film, and the like. The difference in the magnitude of the intensity of the actual laser light is as shown in FIG. 24B.

In FIGS. 25A and 25B, the cylindrical lens 16 is divided into two portions by a broken line 20, and when an optical axis (principal point) is shifted in the direction perpendicular to the paper surface in the side view, a beam passing through a cylindrical lens 16a of an upper half of the cylindrical lens 16 and a beam passing through a cylindrical lens 16b of a lower half thereof are superimposed on each other while being shifted suitably on the irradiated surface, so that the pattern of the interference fringes is changed. That is, the intensity (energy) distribution of the linear laser beam in the longitudinal direction is changed. When this phenomenon is skillfully used, from the principle of superposition of waves, the light intensity can be smoothed by optimizing the shift distance of the divided cylindrical lenses 16a and 16b.

Figure 28A:
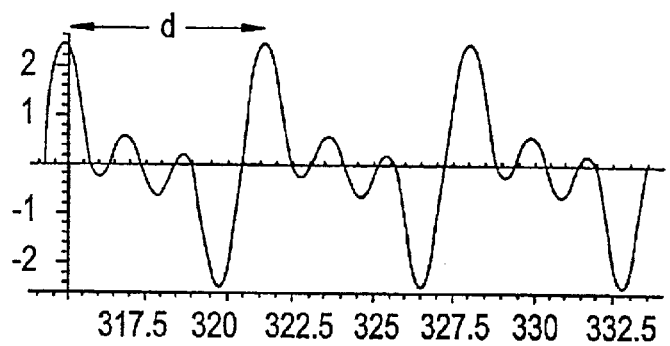
FIGS. 28A to 28C are views showing simulation results of the intensity distribution of linear beam in the longitudinal direction.
Figure 28B:
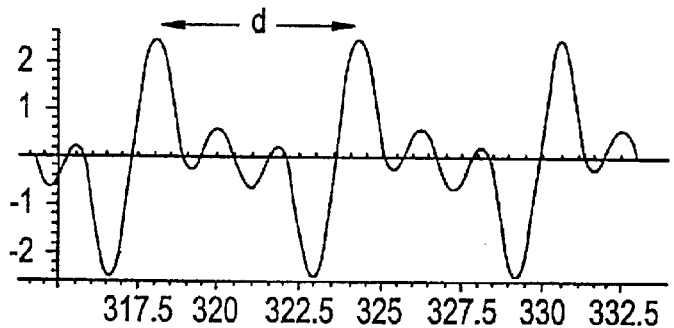
Figure 28C:
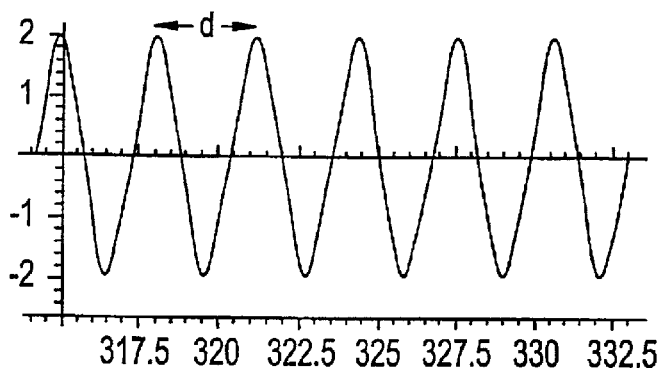

The present invention uses this phenomenon to design a beam homogenizer. For that purpose, parameters of the beam homogenizer were changed and the change of the waveform of the linear laser beam was simulated by a computer. FIGS. 28A to 28C and FIGS. 29A to 29D show the results of the simulation. Similarly to FIG. 27, the graphs of FIGS. 28A to 28C and FIGS. 29A to 29D show the relation between the phase of the linear laser beam at some time in the longitudinal direction and the light intensity. FIGS. 28A to 28C show a case where the number s of lenses of the cylindrical lens group 12 of the beam homogenizer of FIG. 25 is 7, and FIGS. 29A to 29D show a case where the number s of lenses is 9.

Hereinafter, with reference to FIGS. 28A to 28C, the case of s=7 will be considered. In the case of s=7, it has been found that in order to smooth the intensity distribution in the longitudinal direction, it is appropriate that waves with phases shifted by half a period (d/2) are superimposed on each other.

The wave shown in FIG. 28B is a wave a phase of which is shifted from that of FIG. 28A by a half period. When the wave of FIG. 28A and the wave of FIG. 28B are superimposed on each other, the pattern of the waveform shown in FIG. 28C is obtained.

In the wave of FIG. 28C, the variation in the amplitude is smoothed, and the period d' of the wave is smaller than the period d of the wave of FIG. 28A. When the value of the square of the amplitude of the wave of FIG. 28A is compared with that of FIG. 28C, it is understood that the variation of the intensity of light at a position in the longitudinal direction in FIG. 28C becomes small and is smoothed.

Next, the case of s=9 will be considered with reference to FIGS. 29A to 29D. In the case of s=9, it has been found that in order to smooth the intensity of the linear beam in the longitudinal direction most effectively, three waves with phases shifted by ⅓ period (d/3) from each other are superimposed on each other.

Figure 29A:
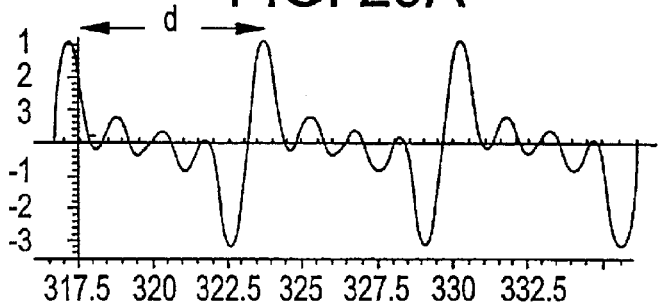
FIGS. 29A to 29D are views showing simulation results of the intensity distribution of linear beam in the longitudinal direction.
Figure 29B:
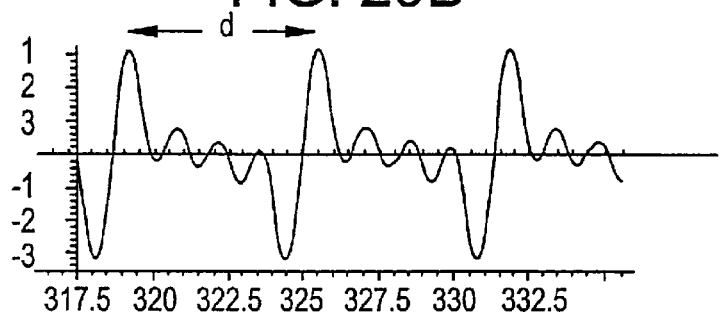
Figure 29C:
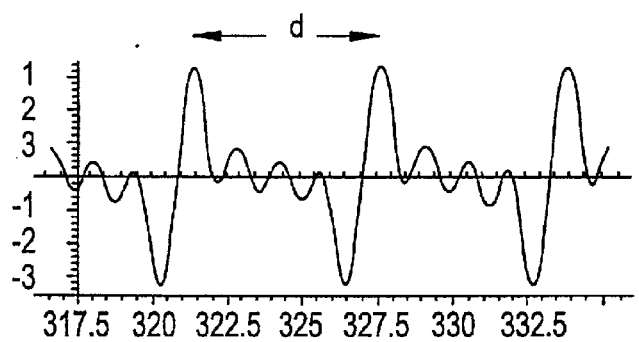
Figure 29D:
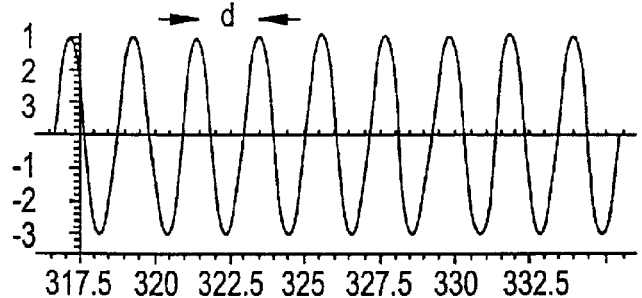

FIGS. 29B and 29C show waves obtained by sequentially shifting the phase of the wave of FIG. 29A by ⅓ period. FIG. 29D shows a synthesized wave of these waves shown in FIGS. 29A to 29C.

Similarly to the synthesized wave of FIG. 28C, in the wave of FIG. 29D, the variation in the amplitude is smoothed, and the period d' of the wave is smaller than period d of the wave of FIG. 29A. When the value of the square of the amplitude of the wave of FIG. 29A is compared with that of 29D, it is understood that in the wave of FIG. 29D, the variation in the intensity of light at a position in the longitudinal direction becomes small and is smoothed. Further, in the wave of FIG. 29D, the energy distribution in the longitudinal direction is smoothed more than FIG. 28C.

It is understood that in order to form the waveform such as FIG. 28C or 29D, it is appropriate that just the relation of FIG. 28A and FIG. 28B, M beams with phases (positions) shifted by d/M (d is a period, M is a natural number) at the identical time are superimposed on each other.

In the conventional beam homogenizer shown in FIG. 25, the laser beam formed after passing through the combination of the cylindrical lens group 12 and the cylindrical lens 16 is divided by the cylindrical lens group 13.

Thus, when the phases of the laser beams divided by the cylindrical lens group 13 are shifted and are superimposed to the same irradiation position, it is possible to form a linear laser beam with a uniform energy distribution in the longitudinal direction as shown in FIG. 28C or 29D.

In FIG. 25, with respect to the beam passing through the cylindrical lens 16a obtained by dividing the cylindrical lens 16 into the two portions and the beam passing through the cylindrical lens 16b, when the positions of the cylindrical lenses 16a and 16b are shifted from each other, just the relation of the wave of FIG. 28A and the wave of FIG. 28B, the phase can be shifted in the longitudinal direction (direction perpendicular to the paper surface of the side view) of the linear beam 19. Thus, by optimizing the shift of the phase, in the beam obtained by superimposing these beams on each other, it becomes possible to smooth the intensity distribution in the longitudinal direction.

The invention disclosed in the present specification provides an optimum combination of parameters of a beam homogenizer in order to optimize the shift of phases.

[Embodiment Mode of the Invention]

Next, embodiment mode of the invention will be described below with reference to the drawings.

Figure 1B:
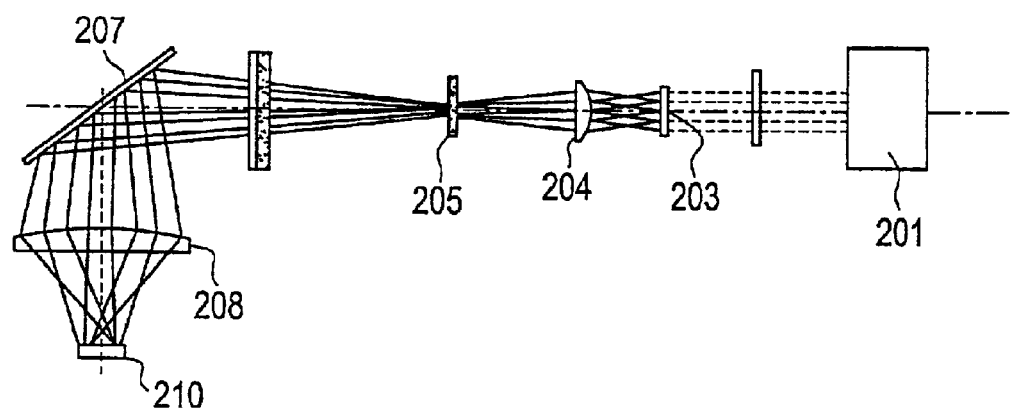
Figure 2:
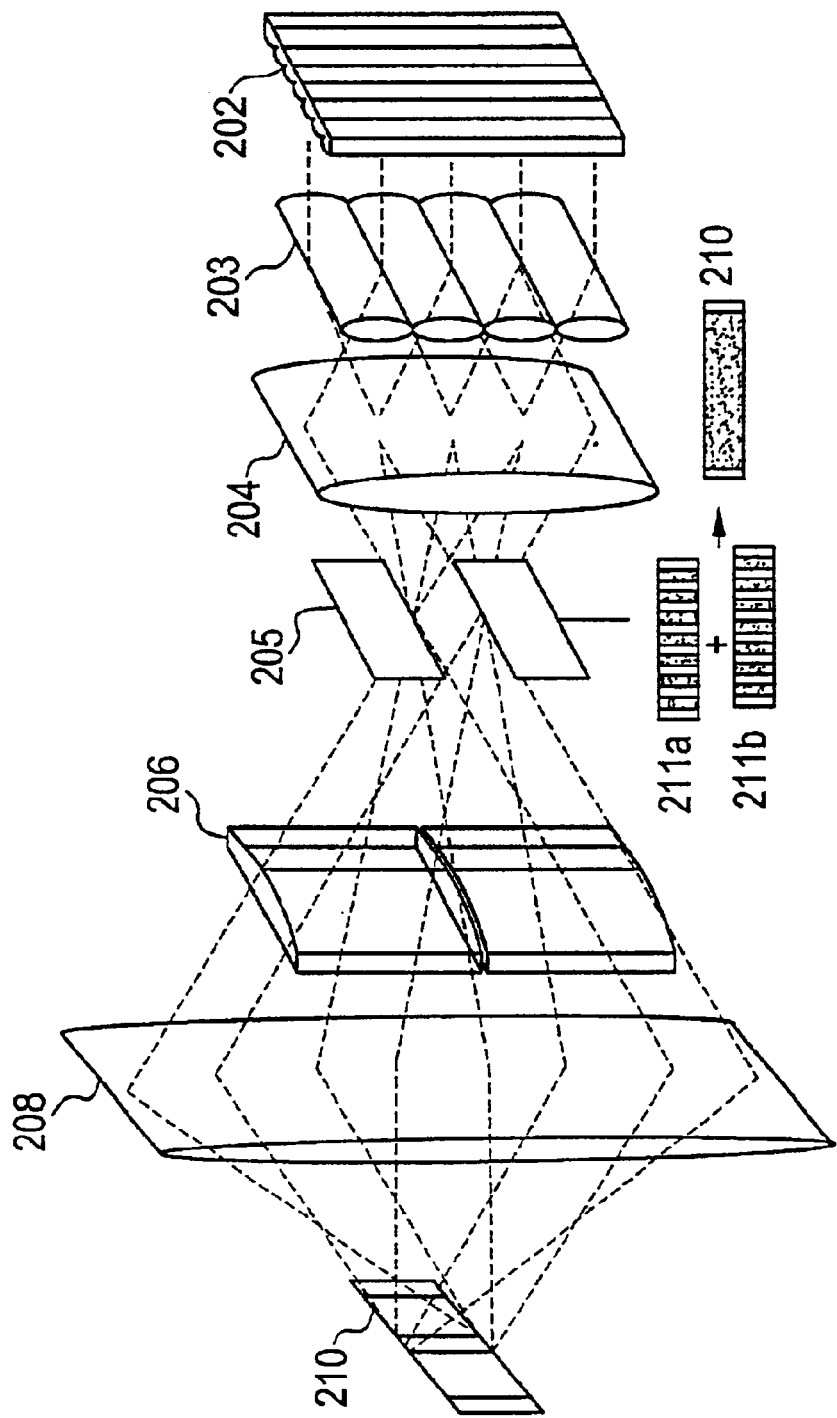
FIG. 2 is a structural view of the beam homogenizer of the present invention.

FIGS. 1A and 1B and FIG. 2 show an optical system of a beam homogenizer of this embodiment mode. In this embodiment mode, a cylindrical lens is used for each lens of the beam homogenizer. FIG. 1A is a top view, FIG. 1B is a side view, and FIG. 2 is a perspective view.

From an outgoing side of a laser generating means 201, cylindrical lens groups 202 and 203 for dividing a beam, a cylindrical lens 204 and a cylindrical lens group 206 for superimposing divided beams, are sequentially disposed. Further, between the cylindrical lens 204 and the cylindrical lens group 206, a slit 205 is disposed on an optical path. At a transmission side of the synthesizing cylindrical lens group 206, a mirror 207 and a cylindrical lens 208 are sequentially disposed on the optical path. Incidentally, for convenience of explanation, the mirror 207 is omitted in FIG. 2.

The cylindrical lens group 202 is composed of (2n+1) cylindrical lenses with optical axes parallel to each other, and the direction in which one beam is divided into (2n+1) beams is made a direction (first direction) perpendicular to the paper surface of the side view.

The cylindrical lens group 203 is composed of N(n−1) cylindrical lenses, and the direction in which one incident beam is divided into N(n−1) beams is made a direction (second direction) perpendicular to the paper surface of the top view.

The synthesizing cylindrical lens 204 is paired with the dividing cylindrical lens group 203, and is a lens for condensing beams divided in the direction perpendicular to the paper surface of the top view. The generatrices of the cylindrical lenses constituting the cylindrical lens group 203 and the cylindrical lens 204 are parallel to each other.

The synthesizing cylindrical lens group 206 is composed of (n'−1) cylindrical lenses with optical axes parallel to each other, is paired with the cylindrical lens group 202, and is a lens for condensing beams divided in the direction perpendicular to the paper surface of the side view. The generatrices of the cylindrical lenses constituting the cylindrical lens groups 202 and 206 are parallel to each other.

FIGS. 1A and 1B and FIG. 2 show the optical system in a case of N=2, n=3, and n'=3. The number (2n+1) of lenses of the cylindrical lens group 202 becomes 7, the number N(n−1) of lenses of the cylindrical lens group 203 becomes 4, and the number of lenses (n'−1) of the cylindrical lens group 206 becomes 2.

Figure 3A:
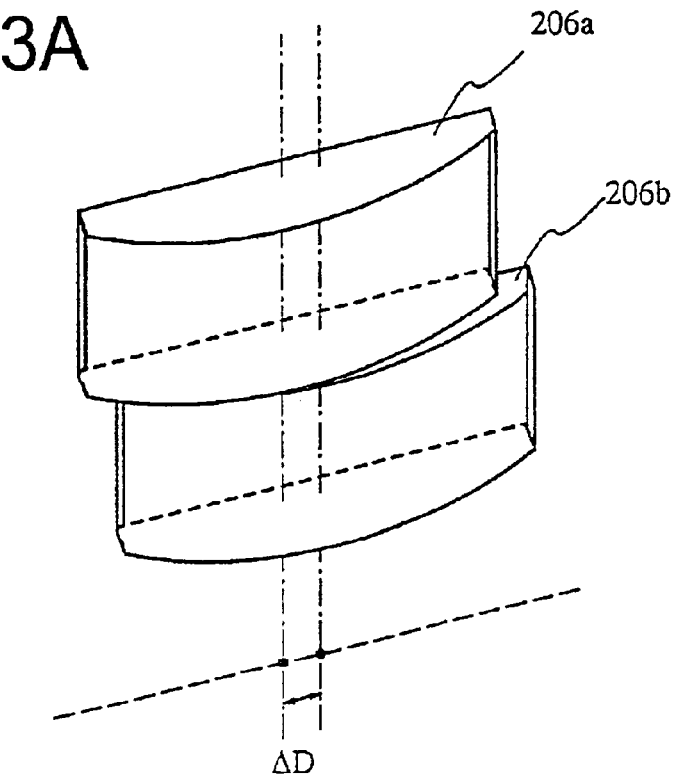
FIGS. 3A and 3b are structural views of a cylindrical lens group of the present invention.
Figure 3B:
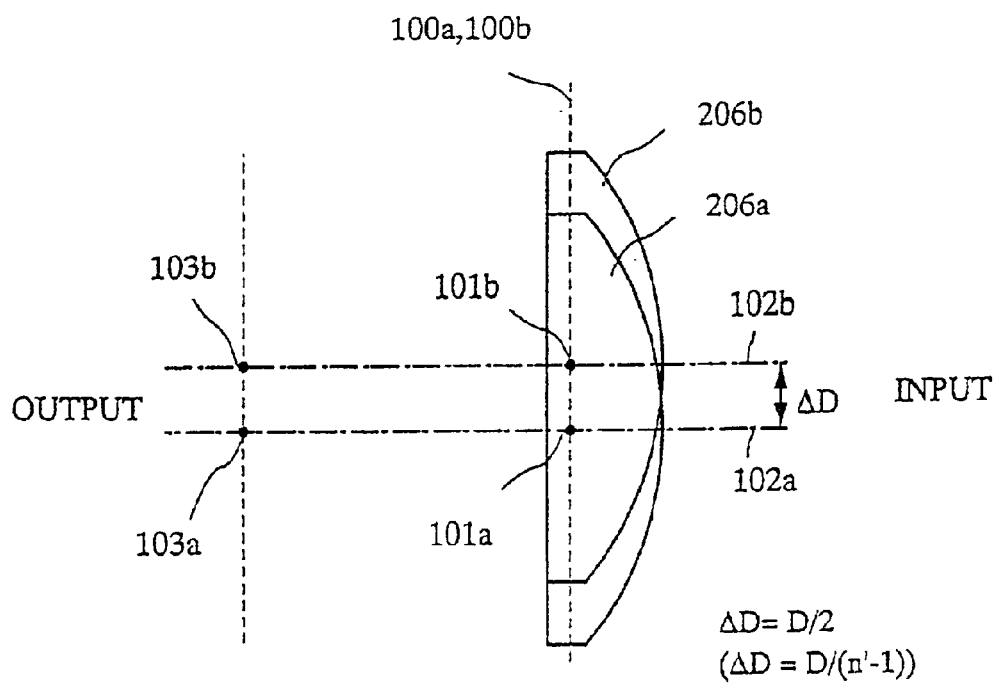

The structure of the cylindrical lens group 206 is shown in FIGS. 3A and 3B. FIG. 3A is a perspective view and FIG. 3B is a top view. As shown in FIGS. 3A and 3B, the cylindrical lens group 206 is composed of cylindrical lenses 206a and 206b, and the principal points of the lenses 206a and 206b are shifted from each other by a predetermined length $\Delta D = d/2$.

More specifically, as shown in FIG. 3B, principal planes 100a and 100b of the respective cylindrical lenses 206a and 206b make the same plane, and images of the principal points 101a and 101b of the respective lenses obtained by orthogonal projection onto the plane perpendicular to the plane (or generatrices of the respective lenses) made of these principal planes are on the same line and become points arranged with an interval $\Delta D$. The images of the orthogonal projection correspond to the principal points 101a and 101b on the paper surface. Alternatively, the structure of the cylindrical lens group 206 is such that images of rear focal points 103a and 103b of the respective lenses obtained by orthogonal projection onto the plane perpendicular to the plane (or generatrices of the respective lenses) made of the principal planes are on the same line and become points with an interval $\Delta D$. Alternatively, images of optical axes 102a and 102b of the respective lenses obtained by orthogonal projection onto the plane perpendicular to the plane made of the principal planes are parallel lines with an interval $\Delta D$.

Incidentally, in FIGS. 3A and 3B, although both the cylindrical lenses 206a and 206b are made such lenses that only one principal plane (principal point) exists in a lens, strictly speaking, two principal planes exist. However, in the present specification, it is assumed that either one of the image side principal plane and the object side principal plane is considered.

The character d is a period of a wave in the longitudinal direction as explained in FIGS. 27A to 29D, and is a period of interference fringes which beams passing through the cylindrical lenses (206a or 206b) constituting the cylindrical lens group 206 form on the irradiated surface.

In order to measure the period d of the interference fringes, in the cylindrical lens group 206, only one cylindrical lens 206a is made unchanged, and a linear laser beam is directly observed in the state where light does not pass through the other cylindrical lens 206b, and the period is measured. Besides, the period can be indirectly measured through an annealing effect by the linear laser beam. For example, as is explained by use of FIGS. 24A–24C, vertical stripes appear on a silicon film irradiated with a linear laser beam, and an interval of the vertical stripes may be measured. Besides, as described later, it is also possible to obtain the period through a simple calculation equation.

Hereinafter, in the cylindrical lens group 206, a method of obtaining the optimum value of the shift $\Delta D$ of the cylindrical lens will be described.

In this embodiment mode, since the number (2n+1) of lenses of the cylindrical lens group 202 is 7 and n=3, the number of cylindrical lens of the cylindrical lens group 203 is N(n−1), integer times as large as (n−1), that is, an even number. At this time, $\Delta D$ is made $d/2$.

The effect of this embodiment mode will be described with reference to FIG. 2. A laser beam from the laser generating apparatus 201 is divided into seven beams at the cylindrical lens group 202. Here, for simplicity, one beam is considered. The beam passing through the cylindrical lens group 202 is divided into four beams at the cylindrical lens group 203. The four beams are condensed at the cylindrical lens 204 so as to be synthesized into one beam, and is shaped into a linear shape by the slit 205, and is incident on the cylindrical lens group 206.

At the cylindrical lens group 206, two beams phases of which in the longitudinal direction of the slit 205 are shifted by $\Delta D(d/2)$ are outgoing. They are condensed by the cylindrical lens 208 and are irradiated as the linear beam 210.

Figure 24C:
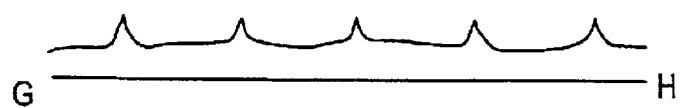

Here, among the beams irradiated to the irradiation surface, it is assumed that a linear beam passing through the cylindrical lens 206a is designated by 211a, and a linear beam passing through the cylindrical lens 206b is designated by 211b. The interference fringes of the linear beams 211a and 211b are schematically shown by white and black shading. Black indicates bright lines. When the linear beam 211a or 211b having such strong interference fringes is irradiated while being scanned in the width direction, as shown in FIGS. 24A to 24C, the stripe pattern due to the difference in the light intensity of the linear beam appears.

In this embodiment mode of the invention, the linear beams 211a and 211b are shifted in the longitudinal direction by $d/2$ so that the portion (black portion) having high intensity and the portion (white portion) having low intensity overlap with each other. As a result, the interference fringes are eliminated or are made obscure like the linear beam 210.

Here, in the case where the number of lenses of the cylindrical lens group 202 is nine, since n is equal to 4, if the number of lenses of the cylindrical lens group 203 is a value integer times as large as 3 (corresponding to n−1), for example, 6, the energy distribution of the linear beam 210 in the longitudinal direction can be made uniform. In this case, since energy can be made more uniform when the number of lenses of the cylindrical lens group 206 is 3 rather than 2, it is appropriate that instead of the cylindrical lens group 206, a cylindrical lens group 220 made of three cylindrical lenses as shown in FIG. 4 is used.

Figure 4:
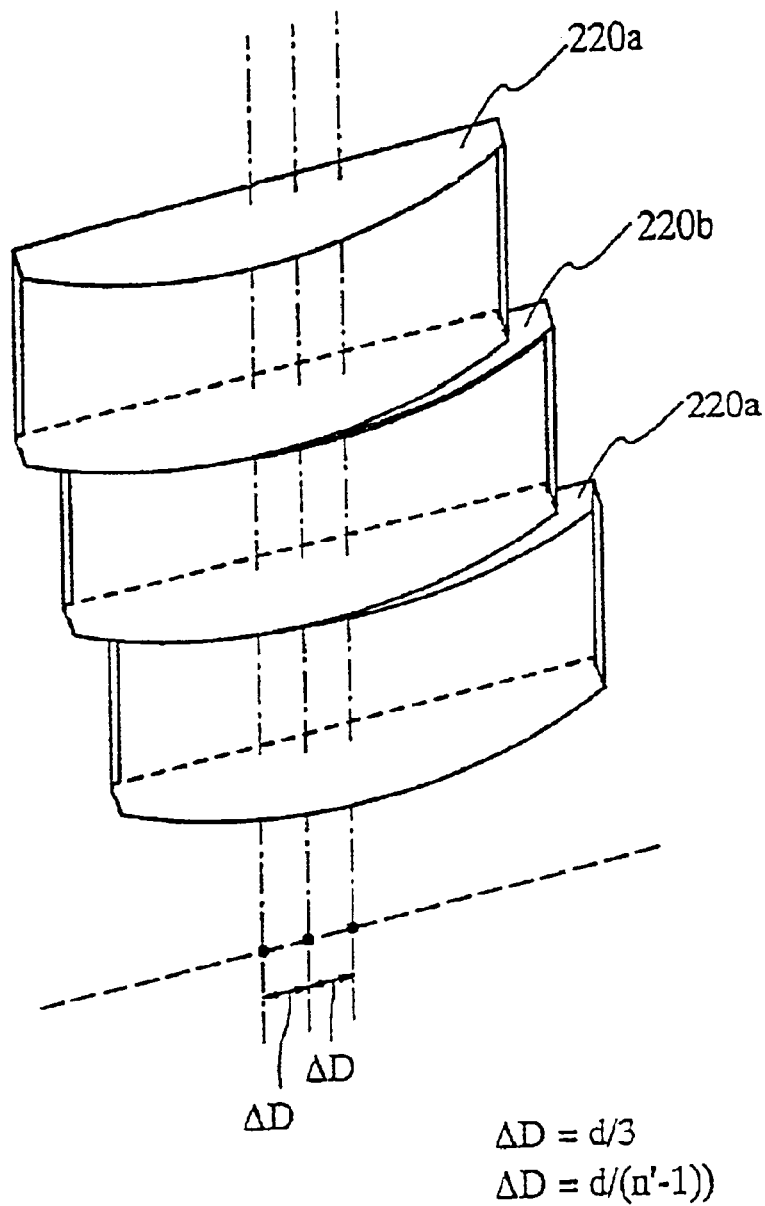
FIG. 4 is a structural view of a cylindrical lens group of the present invention.

As shown in FIG. 4, in the cylindrical lens group 220, it is appropriate that the interval of points obtained by orthogonal projection of principal points of the cylindrical lenses 220a, 220b, and 220c is made d/3.

However, when three cylindrical lenses are combined, the structure becomes complicated so that the cost becomes high, and further, the alignment of the optical system becomes more difficult. Thus, the cylindrical lens group may be constructed by two cylindrical lenses.

From the above consideration and calculation, in the case where the number of cylindrical lenses of the cylindrical lens group 202 is an odd number, the number of lenses of the cylindrical lens group 206 is made (n'−1), and the principal points of the (n'−1) cylindrical lenses are sequentially shifted by d/(n'−1). Here, n' is an integer satisfying $3 \leq n' \leq n$, and the number of lenses of the cylindrical lens group 203 is N(n'−1) (N is a natural number), that is, a value integer times as large as the number of lenses of the cylindrical lens group 206.

By doing so, the phases of the laser beams divided by the cylindrical lens group 203 are shifted and are superimposed, so that the light intensity of the linear beam in the longitudinal direction can be made uniform.

The structure of the beam homogenizer shown in FIGS. 1A and 1B and FIG. 2 is a basic one, and other optical systems may be arranged. Besides, a part of the optical members may be replaced by another optical member having a similar function. Besides, the optical system shown in the drawings may be used as a part of the whole.

Figure 7:
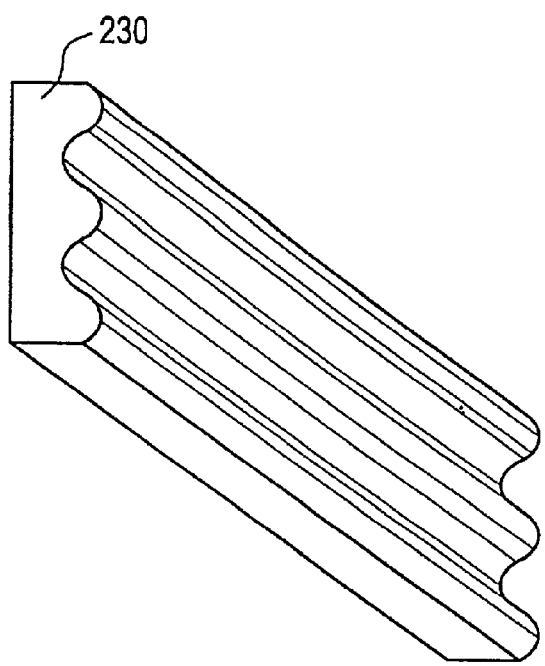
FIG. 7 is a view showing a modified example of a cylindrical lens group of the present invention.

For example, although the cylindrical lens group 202 and the cylindrical lens group 203 shown in FIGS. 1A and 1B are lens arrays made of convex lenses, concave lens groups or convex and concave mixed lens arrays may be used. For example, a cylindrical lens array in which concave and convex lenses are combined, as shown in FIG. 7, may be used.

Figure 8:
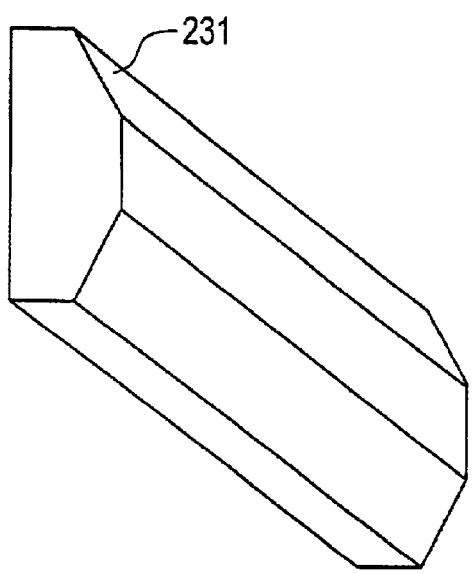
FIG. 8 is a view showing a modified example of a cylindrical lens group of the present invention.
Figure 9:
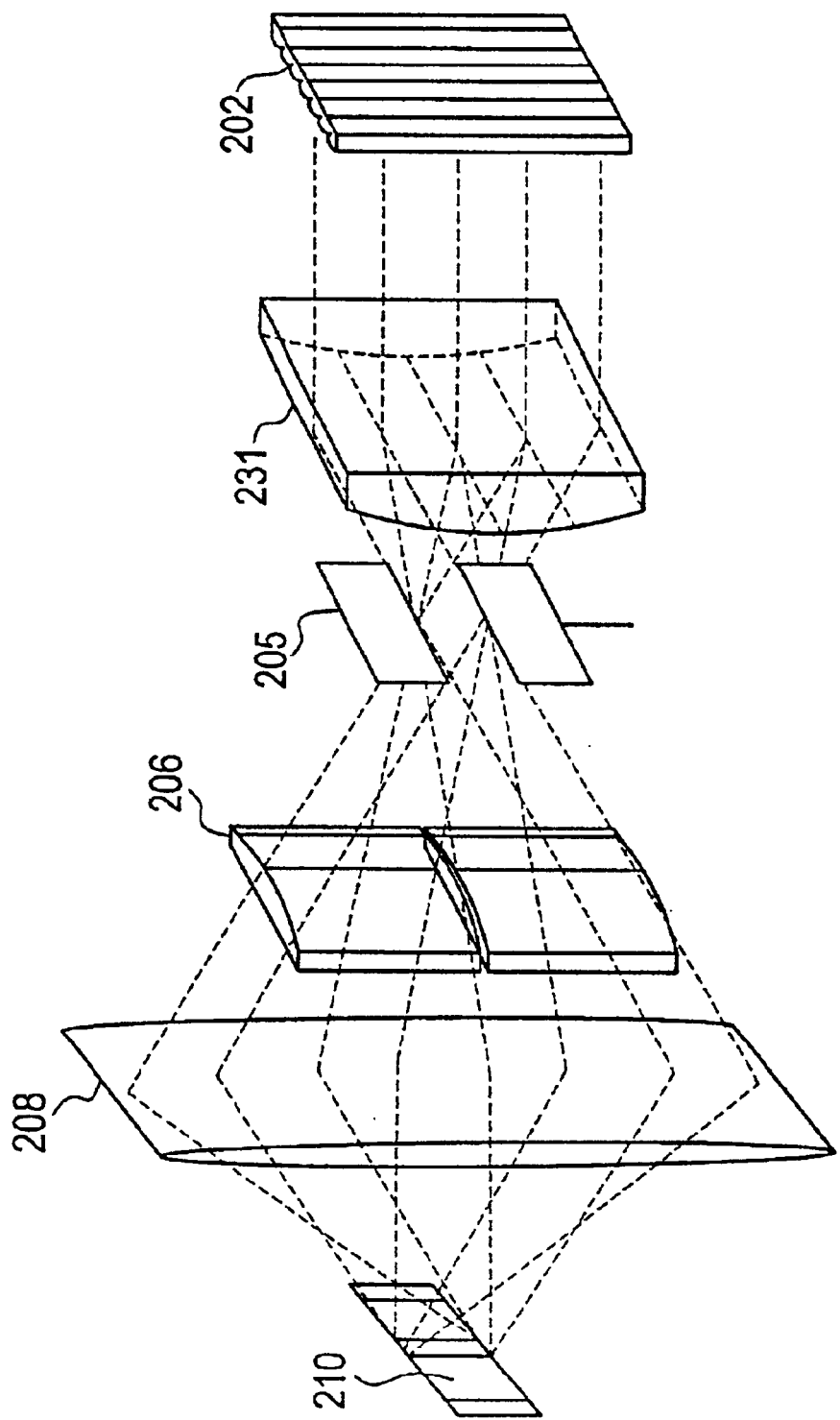
FIG. 9 is a structural view of a beam homogenizer using a multiphase lens of the present invention;.

Besides, the cylindrical lens group 203 and the cylindrical lens 204 may be replaced by a multiphase lens 231 shown in FIG. 8. FIG. 9 shows an optical system in the case the replacement is made. In FIG. 9, the same reference numerals as those of FIGS. 1A and 1B designate the same members.

However, in the case where lens groups which are not congruent with each other, as typified by concave convex mixed lenses, is used, it is preferable to construct such a lens group, that angles of expansion, after processing, of parallel beams processed by those lenses are the same.

Otherwise, when the divided beams are recombined, the respective beams are superimposed on each other with different sizes and shapes, so that the contour of the beam becomes unclear.

The embodiment mode of the invention becomes especially effective in the case where a rectangular laser beam in which its aspect ratio is not very large, is processed into a linear laser beam having an aspect ratio of 100 or more.

Besides, the number of lenses of the cylindrical lens group 202 can also be made an even number (2n). Other conditions may be the same as the case of an odd number (2n+1).

However, when the number of lenses of the cylindrical lens group 202 is an odd number, a more remarkable effect can be obtained. Incidentally, even if the number of lenses of the cylindrical lens group 202 is an even number, if an odd number of beams are incident on the cylindrical lens group 203, it is needless to say that the cylindrical lens group 202 can be regarded as being constructed by an odd number of lenses.

When the number of lenses of the cylindrical lens group 202 is an odd number, the waveform of the linear beam in the longitudinal direction on the irradiation surface can be made a sine wave as shown in FIG. 28C or FIG. 29D, and the energy in the longitudinal direction can be made more uniform.

In the case where the number of lenses of the cylindrical lens group 202 is two or three, even in the conventional homogenizer as shown in FIGS. 25A and 25B, it is possible to make a sine wave. However, since the dividing number of the beams is small, it is hard to obtain a beam with uniform energy on the irradiation surface. Thus, in the invention, it is preferable to make the number of lenses of the cylindrical lens group at least 6.

When the number of lenses of the cylindrical lens group 202 is an even number, it is impossible to obtain a beam with dispersed light intensity as compared with the case of an odd number. However, as compared with the conventional optical system using a cylindrical lens not divided, a remarkable effect in smoothing of energy is obtained.

Incidentally, since the period d is defined by the period of the interference fringes as shown in FIG. 27A or 27B, the value can be obtained by measuring the period of the interference fringes as described above. However, the period d can also be obtained through calculation.

It can be calculated through an equation of $d = \lambda\ f/L$ by using a wavelength $\lambda$ of laser light generated by the laser apparatus 201, a focal distance f of one cylindrical lens of the cylindrical lens group 206, and a width L of a cylindrical lens constituting the cylindrical lens group 202.

As is apparent from the above explanation, it is preferable that the period d of the interference fringes is constant in the linear laser beam. That is, it is preferable that the interference fringes appear at a constant period as shown in FIG. 27A or 27B along the longitudinal direction of the linear beam.

However, in the beam homogenizer of FIG. 1, except for some particular case, the period of the interference fringes of the linear beam 210 do not become uniform. This is because the linear beam 210 is made of spherical waves linearly synthesized (see FIG. 10A. When the spherical wave is cut by a line, an interval between portions with the same phase is not constant). If it is desired to make an interval of peaks of interference almost constant, it is appropriate that plane waves are linearly synthesized (when the plane wave is obliquely cut by a line, an interval of portions with the same phase becomes constant). An optical system for forming such a light wave is shown in FIG. 10B.

Figure 10A:
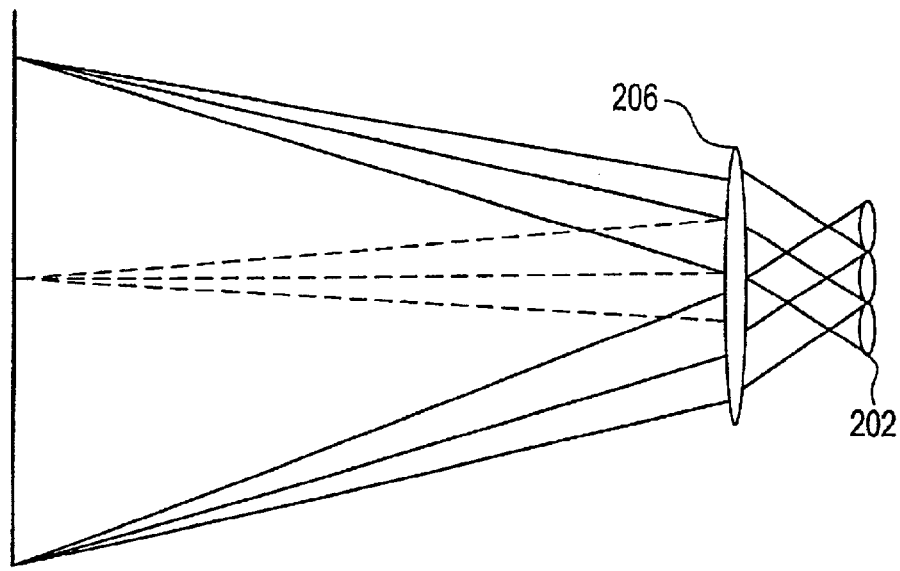
FIGS. 10A and 10B are views showing a difference between an optical arrangement for forming a plane wave and an optical arrangement for forming a spherical wave of the present invention.
Figure 10B:
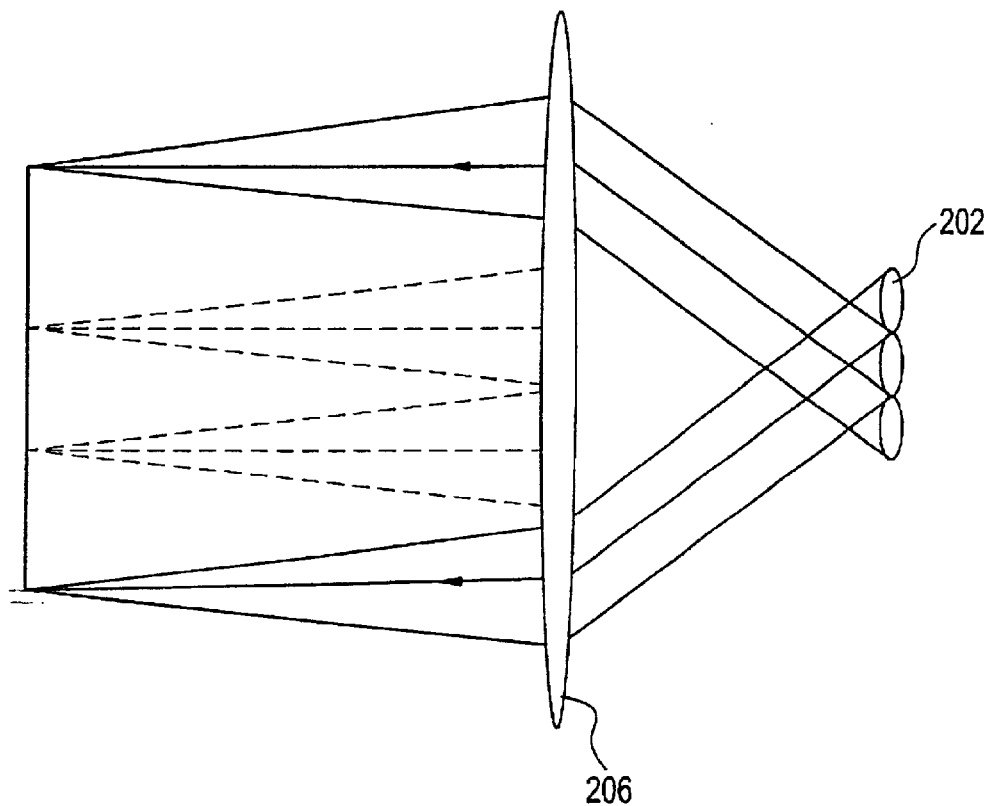

The different point between FIG. 10B and FIG. 10A is that whether all of the laser beams divided by the cylindrical lens group 202 at the beam incident side are processed into parallel light beams by the subsequent cylindrical lens group 206.

The optical system as shown in FIG. 10B can be easily obtained by suitably selecting the distance between the front dividing cylindrical lens group 202 and the rear synthesizing cylindrical lens group 206. By making the state of FIG. 10B, any beams divided by the cylindrical lens group can be processed into plane waves by the cylindrical lens group 206. When the beam processed by this optical system is used, the interval of the vertical stripes becomes almost constant. The optical system of such arrangement is most suitable for the present invention.

However, even in the linear beam made of synthetic spherical waves, since the radius of curvature of the spherical wave is sufficiently large, it can be substantially regarded as a parallel light beam, so that the invention can be applied. However, in the case where the spherical waves are synthesized, the period d of the interference fringes is defined as an average value of the whole linear beam.

As described above, when the invention disclosed in the present specification is used, the energy distribution of the linear laser beam in the longitudinal direction is remarkably made uniform. Particularly, in the case where the number of lenses constituting the cylindrical lens group 202 is an odd number, since the waveform of the linear laser beam in the longitudinal direction can be shaped into a sine state (see FIGS. 28C and 29D), the invention can most effectively function.

However, it is very difficult to make the energy distribution in the longitudinal direction completely constant. There is also a case where the variation of the energy distribution is more emphasized according to irradiation conditions of the laser beam.

At such a time, when the scanning direction of the laser beam is finely adjusted, the improvement can be made. The fine adjustment is carried out by performing laser processing while the linear laser beam is scanned in the direction shifted by an angle y in a plane from the direction perpendicular to the linear direction of the beam and containing the surface formed by the linear laser beam. This angle y can be found in the range of $|\tan y| \leq 0.1$ (however, $|\tan y| \neq 0$).

When a laser annealing of a semiconductor film is carried out through the optical system of the invention to form a polycrystal semiconductor film, and for example, a device such as a TFT liquid crystal display is fabricated using the film, fluctuation in characteristics of individual TFTs can be suppressed and a high quality device can be obtained. Besides, the laser annealing of the invention can be used for not only semiconductor crystallization but also activation of an impurity, such as phosphorus or boron, doped to control the conductivity of a semiconductor film.

When the invention disclosed in the present specification is used for the laser annealing at the fabrication of a semiconductor integrated circuit, characteristics of components formed on the same substrate can be unified, and the circuit having high performance can be obtained.

Next, preferred embodiments of the invention will be described with reference to the drawings.

[Embodiment 1]

In fabricating steps of this embodiment, first, a method of fabricating films to be irradiated with a laser will be described. The films to be irradiated with the laser are three kinds of amorphous silicon films in the present specification. The present invention is effective for any film.

Any of the three kinds of amorphous silicon films are films formed by a plasma CVD method on a silicon oxide film with a thickness of 200 nm as an base film on a Corning 1737 glass substrate of 127 mm square as a substrate. The thickness of each of the amorphous silicon films is made 50 nm. This amorphous silicon film will be hereinafter referred to as a starting film.

(Fabricating Procedure of Film A)

The starting film is subjected to heat annealing at 450° C. for one hour. This step is for reducing the hydrogen concentration in the amorphous silicon film. If the concentration of hydrogen in the film is excessively high, the film can not resist the laser energy, so that this step is required. It is suitable that the density of hydrogen in the film is of the order of $10^{20}$ atoms/cm$^3$. This film will be referred to as a non-single crystal silicon film A.

(Fabricating Procedure of Film B)

A nickel acetate solution of 10 ppm is applied onto the starting film by a spin coating method to form a nickel acetate layer. It is more preferable to add a surfactant to the nickel acetate solution. Since the nickel acetate layer is very thin, although it is not always film-like, a problem does not occur in the subsequent steps.

Next, the film is subjected to thermal annealing at 600° C. for 4 hours. Then, the amorphous silicon film is crystallized, so that a crystalline silicon film B of a non-single crystal silicon film is formed. At this time, nickel as a catalytic element functions as a nucleus of crystal growth, so that crystallization is accelerated. By the function of nickel, crystallization can be made at a low temperature for a short time such as 600° C. and 4 hours. The details are disclosed in Japanese Patent Laid-Open No. Hei. 6-244104.

It is preferable that the concentration of the catalytic element is $1 \times 10^{15}$ to $1 \times 10^{19}$ atoms/cm$^3$. When the concentration is as high as $1 \times 10^{19}$ atoms/cm$^3$ or more, metallic properties appear in the crystalline silicon film, and the semiconductor characteristics are lost. In this embodiment, the concentration of the catalytic element in the crystalline silicon film is $1 \times 10^{17}$ to $5 \times 10^{18}$ atoms/cm$^3$ as the minimum value in the film. These values are obtained by analysis and measurement with secondary ion mass spectroscopy (SIMS).

(Fabricating Procedure of Film C)

A silicon oxide film with a thickness of 70 nm is formed on the starting film. A plasma CVD method is used as a film formation method.

Next, a part of the silicon oxide film is completely opened by a photolitho patterning step.

Further, for the purpose of forming a thin oxide film on the opening portion, irradiation of UV light is carried out in an oxygen atmosphere for 5 minutes. This thin oxide film is formed to improve wettability of the opening portion to a subsequently introduced nickel solution.

Next, a nickel acetate solution of 100 ppm is applied to the film by a spin coating method, so that nickel acetate enters the opening portion. It is more preferable to add a surfactant into the nickel acetate solution.

Next, thermal annealing at 600° C. for 8 hours is carried out, so that crystals grow from the nickel introduced portion in the lateral direction. At this time, the role of nickel is the same as in the film B. In the condition at this time, the distance of crystal growth is about 40 μm.

In this way, the amorphous silicon film is crystallized, so that a crystalline silicon film C as a non-single crystal silicon film is formed. Thereafter, the silicon oxide film on the crystalline silicon film is peeled and removed by using buffered hydrofluoric acid.

The non-single crystal silicon films A, B, and C obtained in this way are crystallized.

Next, in order to further improve the crystallinity, a laser annealing using an excimer laser is carried out.

Figure 5:
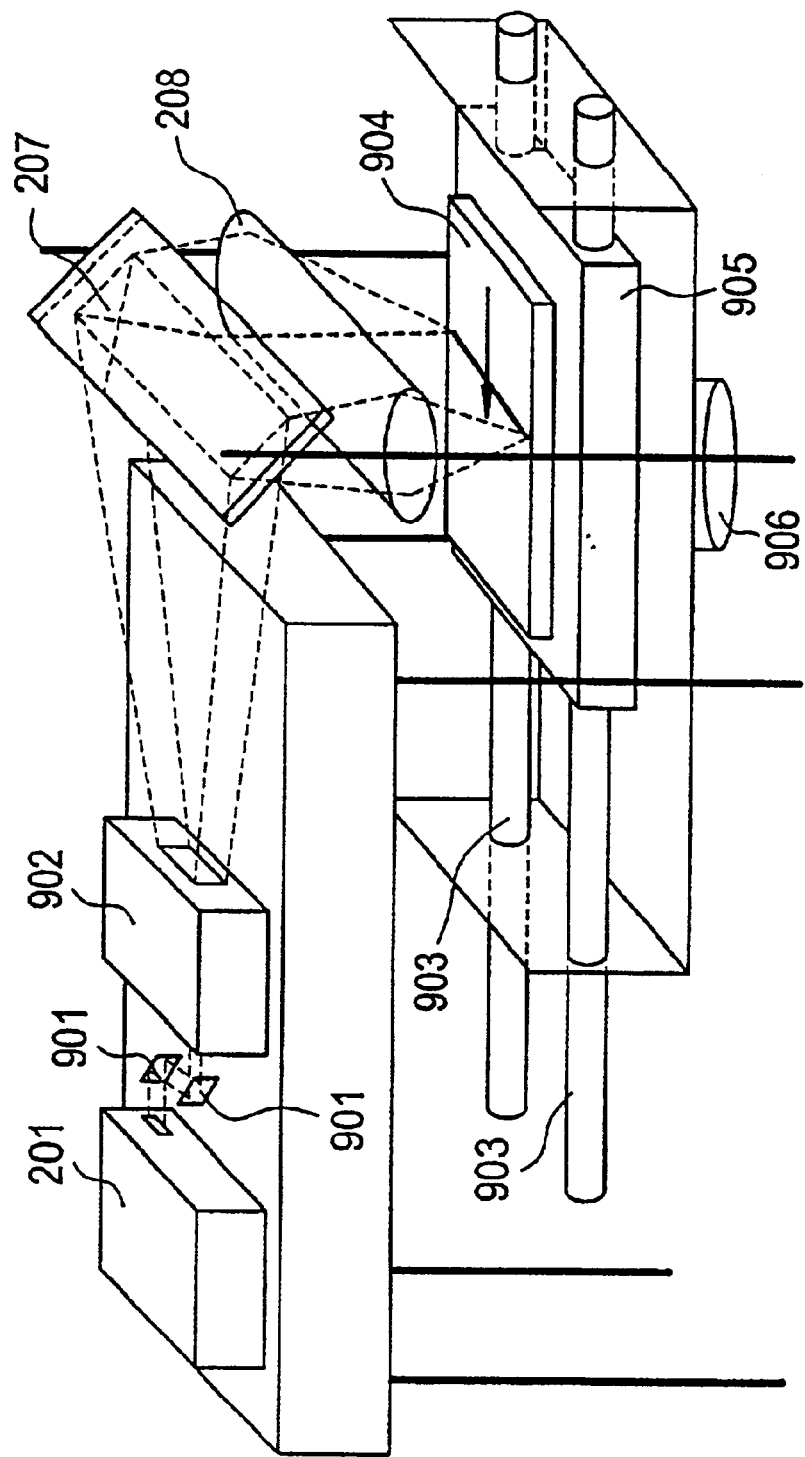
FIG. 5 is a view showing a laser irradiation system of Embodiment 1.

FIG. 5 shows a laser irradiation system in this embodiment. FIG. 5 shows the outline of the laser irradiation system.

In FIG. 5, the laser irradiation system has such a function that a pulse laser beam is emitted from a laser apparatus 201, the traveling direction of the laser beam is adjusted by two pairs of reflecting mirrors 901, and then, its sectional shape is processed into a linear shape by a beam homogenizer 902 of the invention, and the thus obtained pulse laser beam is reflected by a mirror 207, condensed by a cylindrical lens 208, and irradiated onto a substrate 904 to be treated. A beam expander which can suppress an expanding angle of the laser beam and can adjust the size of the beam may be inserted between the two pairs of reflecting mirrors 901.

The optical system 902 is an optical system on the optical path from the cylindrical lens group 202 to the cylindrical lens group 206 shown in FIG. 1. The mirror 207 and the cylindrical lens 208 are also based on the structure shown in FIG. 1. As any linear laser beam used in the invention, what is based on the optical system shown in FIG. 1 is used. The role of a lens group of a type as in FIG. 1 will be described below.

In the beam homogenizer used for this embodiment, since the number of lenses of the cylindrical lens group 202 is made 7 (corresponding to 2n+1), in the structure shown in FIG. 1, the number of lenses of the cylindrical lens group 206 becomes 2 (corresponding to n−1).

FIGS. 3A and 3B are structural views of the cylindrical lens group 206. Hereinafter, a method of determining the interval ΔD between the principal points of the cylindrical lenses 206a and 206b constituting the cylindrical lens group 206 will be described. In the case of this embodiment, a period of optical interference fringes distributed in the linear laser beam formed through one lens 206a arbitrarily selected in the cylindrical lens group 206 and lenses other than the cylindrical lens group 206 in FIG. 1 was 0.1 mm. This value corresponds to the parameter d used in the invention.

As described above, when the distance calculated from the equation of $d/(n-1)$ is made the distance of a shift of the principal points of the cylindrical lenses 206a and 206b, the energy distribution of the linear beam in the longitudinal direction can be made most uniform.

Here, the values of d and n are substituted for the equation. In this embodiment, since n=3, the obtained distance becomes 0.05 mm. From the principle of superposition of waves, it is needless to say that even if the distance is changed to 0.15 mm, 0.25 mm, 0.3 mm, ••• by an interval of 0.1 mm, the same effect is obtained. However, as this interval is made wide, the effective length of the linear beam in the longitudinal direction becomes short.

That is, when the principal points of the cylindrical lenses 206a and 206b are shifted in the direction perpendicular to the optical axis, both ends of the linear laser beam 210 in the longitudinal direction become blur correspondingly to the shifted distance (see FIG. 2. White portions at both ends indicate the blurred portions). Since it is easy to make both ends of the linear laser beam in the longitudinal direction element regions, the slight blur does not influence the processing at all. On the other hand, since both ends in the width direction are not blurred at all, even if the element region is irradiated therewith, a bad influence does not occur.

Since n is equal to 3 in this embodiment, by this, the division number of the laser beam in the vertical direction (width direction of the linear beam) is determined by a multiple of (3−1). In the case of this embodiment, N was made 4, and division into 8 parts was made. The division number of the laser beam in the horizontal direction (longitudinal direction of the linear beam) is (2×3+1)=7. The beam emitted from the laser apparatus 201 is divided into 8 parts in the vertical direction (width direction of the linear laser beam) and 7 parts in the horizontal direction (longitudinal direction of the linear laser beam).

The linear laser beam 210 is one obtained by synthesizing 56 (=7×8) divided beams. By doing so, the energy distribution of the beam is smoothed.

Although the ratio of horizon and vertical lengths of the beam can be changed from the structure of the lens group, the beam shape easily formed is restricted by the combination of the size of the lens and its focal distance. Incidentally, in this optical system, the length of the long side of the beam can not be changed.

As the laser oscillation apparatus 201, here, one oscillating a XeCl excimer laser beam (wavelength 308 nm) is used. In addition, a KrF excimer laser (wavelength 248 nm) or the like may be used.

The substrate 904 to be treated is disposed on a stage 905. The stage 905 can be moved in a one-axial direction by a moving mechanism 903. In actual processing, the stage 905 is moved in parallel to the vertical direction (including a plane containing the linear laser beam) to the line width direction of the linear laser beam.

Figure 6:
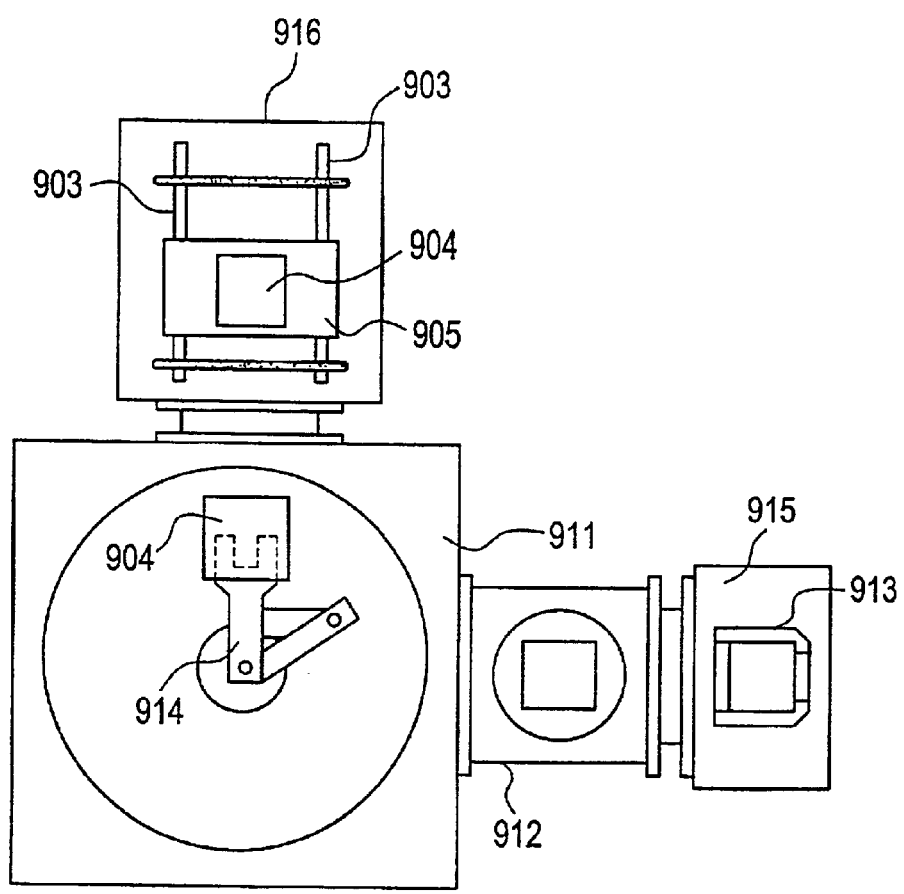
FIG. 6 is a top view of a laser annealing apparatus of Embodiment 1.

FIG. 6 is a structural view of a laser annealing apparatus provided with the laser irradiation apparatus of FIG. 5. A cassette 913 containing a plurality of substrates 904 to be treated, for example, 20 substrates is disposed in a load/unload chamber 915. A substrate is moved from the cassette 913 into an alignment chamber 912 by a robot arm 914.

In the alignment chamber 912, an alignment mechanism for correcting the positional relation between the treated substrate 904 and the robot arm 914 is provided. The alignment chamber 912 is coupled with the load/unload chamber 915.

The substrate is transferred into a substrate transfer chamber 911 by the robot arm 914, and further, is transferred into a laser irradiation chamber 916 by the robot arm 914.

In FIG. 5, a linear laser beam irradiated onto the treated substrate 904 is made 0.4 mm in width×135 mm in length. The energy density of the laser beam on the surface to be irradiated is within the range of 100 mJ/cm$^2$ to 500 mJ/cm$^2$, and is made, for example, 300 mJ/cm$^2$. The irradiation is made while the stage 905 is being moved in one direction at a speed of 1.2 mm/s, so that the linear laser beam is scanned. The oscillation frequency of the laser is made 30 Hz, and when attention is paid to one point of the irradiated object, laser beams of 10 shots are irradiated. The number of the shots is suitably selected from the range of 5 shots to 50 shots.

After the laser irradiation is ended, the substrate 904 to be treated is pulled back by the robot arm 914 into the substrate transfer chamber 912.

The substrate 904 to be treated is transferred into the load/unload chamber 915 by the robot arm 914, and is contained in the cassette 913.

With this, the laser annealing step is ended. By repeating the above step in this way, a plurality of substrates can be continuously treated one by one.

In this embodiment, although the linear laser beam is used, even when any beam shape from a linear shape to a square shape is used, the effect of the present invention is obtained.

When a TFT having an active layer of the semiconductor film which has been subjected to the foregoing laser annealing is fabricated, both N-channel and P-channel TFTs can be fabricated.

Besides, it is also possible to obtain a structure in which N-channel and P-channel TFTs are combined. Besides, it is also possible to integrate a number of TFTs to construct an electronic circuit.

The above can be said for a semiconductor film which has been subjected to a laser annealing through an optical system shown in other embodiments. In the case where a liquid crystal display constructed by TFTs is fabricated by using a semiconductor film subjected to the laser annealing through the optical system of the invention, a high quality display with less fluctuation in characteristics of the respective TFTs can be obtained.

[Embodiment 2]

In the case where the stripe pattern does not disappear well in the embodiment 1, the arrangement of the optical system is not suitable, or the way of superposition of the linear laser beams is unsuitable. In this case, the scanning direction of the substrate is finely adjusted by a scanning direction changing apparatus 906, and the scanning direction in which the interference fringes are less noticeable is selected.

That is, it is appropriate that laser light is made to be scanned and irradiated with a slight angle to the width direction of the linear laser beam.

[Embodiment 3]

In the embodiment 1, the pitch d of the interference fringes when the arrangement of the optical system shown in FIG. 1 is adopted can be easily obtained through calculation. In this embodiment, the calculation method will be described with reference to FIGS. 11 and 12.

First, such a state is supposed that the divided lenses of the cylindrical lens group 206 are not shifted from each other. For convenience, the cylindrical lens group 206 in this state will be referred to as a cylindrical lens 1206.

Figure 11:
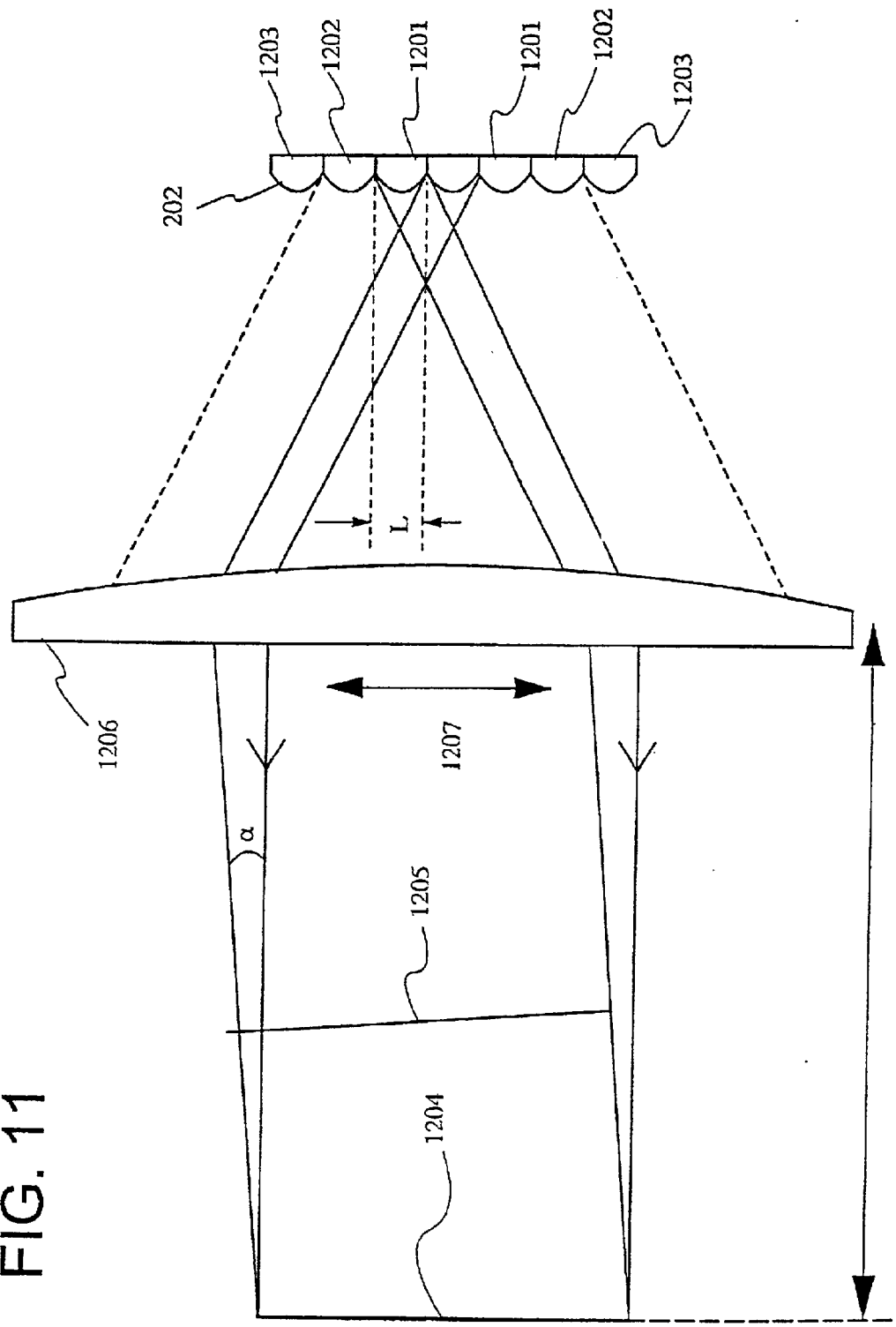
FIG. 11 is a view showing parameters necessary for obtaining a pitch d of interference fringes through calculation of Embodiment 3.

The optical system shown in FIG. 11 may be regarded as showing the sections of the cylindrical lens group 202 shown in FIG. 1 and the cylindrical lens 1206.

In the case where the arrangement of the optical system of FIG. 11 is adopted, beams synthesized by the cylindrical lens 1206 may be said plane waves, respectively.

In this case, a light flux of laser light incident on the cylindrical lens 1206 through two lenses 1201 adjacent to the center lens, among the lenses constituting the cylindrical lens group 202, crosses an irradiation surface 1204 at an angle $\alpha$.

Figure 12:
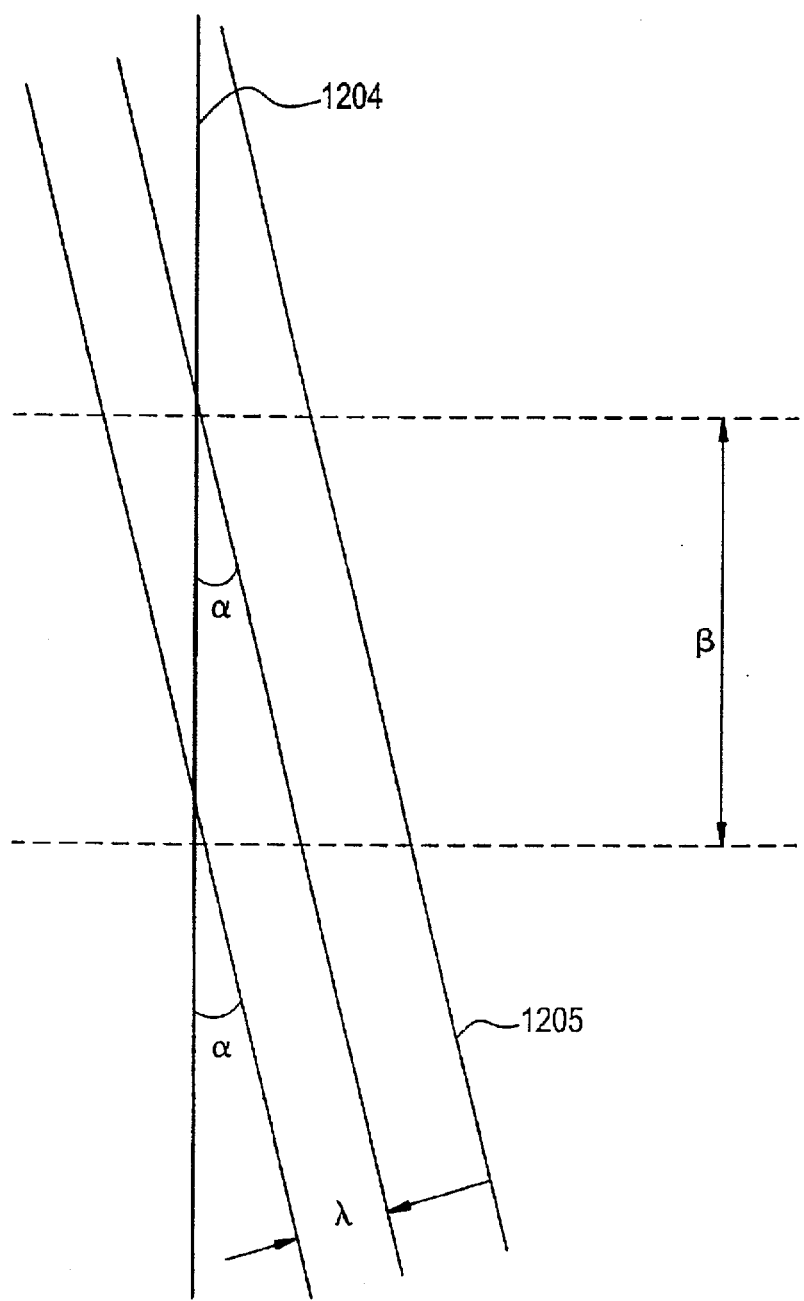
FIG. 12 is a view showing parameters necessary for obtaining the pitch d of the interference fringes through calculation of Embodiment 3.

Here, since a wavefront 1205 of the laser is linear, lines drawn at an interval of wavelength $\lambda$ of the wavefront cuts the irradiation surface 1204 at an interval $\beta$ (see FIG. 12).

The relational expression between the angle $\alpha$ and the interval $\beta$ can be expressed by using the wavelength $\lambda$. That is, it is possible to express the relation as $\beta = \lambda / \sin \alpha$.

The two lenses 1201 form a standing wave with an interval $\beta$ at the irradiation surface 1204. Besides, two lenses 1202 form a standing wave with an interval of $\beta/2$ at the irradiation surface 1204. Further, two lenses 1203 form a standing wave with an interval of $\beta/3$ at the irradiation surface 1204. These standing waves are synthesized at the irradiation surface 1204, and a standing wave as shown in FIG. 28C or FIG. 29D is formed. Thus, as shown in FIGS. 28A to 28C or FIGS. 29A to 29D, the interval $\beta$ coincidents with the period d of the wave in the longitudinal direction. This can be understood through a simple calculation.

Besides, even when the position of the cylindrical lens 1206 is moved along the direction (direction perpendicular to the optical axis) parallel with the principal plane of the lens 1206 indicated by an arrow 1207, the period d is not changed, which can also be understood through a simple calculation. This indicates that when the cylindrical lens 1206 is returned into the state of the cylindrical lens group 206, even if the divided cylindrical lens 1206 is moved in the direction shown by the arrow 1207, the essence of the invention is not influenced at all.

Besides, in this case, when a focal distance of the cylindrical lens 1206 is made f, and a width of one lens of the cylindrical lens group 202 is made L, tan $\alpha = L/f$ is established.

Since an angle of a is sufficiently small, tan $\alpha \approx \sin \alpha$ is established. Thus, $\beta \approx \lambda f / L$ is established. As described above, in general, since $\beta = d$, $d \approx \lambda f / L$.

Thus, if the focal distance f of the cylindrical lens 1206, the width L of one lens of the cylindrical lens group 202, and the wavelength $\lambda$ of the laser light are known, even if the period d of the interference fringes of the linear laser is not actually measured, it can be obtained through the calculation.

Incidentally, in the case where the optical system of arrangement shown in FIG. 10A is adopted, a beam passing through the cylindrical lens group 206 becomes a spherical wave, and the foregoing formula is not completely established. In this case, the pitch d is calculated through a numerical calculation using a calculator.

Also in this case, if the sum of the focal distance f of the cylindrical lens group 206 and the focal distance of the cylindrical lens group 202 is close to an interval between the cylindrical lens group 206 and the cylindrical lens group 202, the pitch d obtained by the foregoing formula can be used.

[Embodiment 4]

In the foregoing embodiment, although the pulse oscillation type excimer laser is used, in this embodiment, a continuous-wave excimer laser is used. In the case of the continuous-wave type, as compared with the pulse oscillation type, since a scanning speed of linear laser becomes slow, heat of laser light is apt to be conducted to a substrate. Thus, it is desirable that a quartz substrate having a high distortion point temperature is used as the substrate. The quartz substrate is not deformed or transformed at all even if it is heated up to the melting point temperature of a silicon film. Thus, a beam size can be widened.

In this embodiment, a description will be made on an example in which a continuous-wave excimer laser of 1000 W is processed into a linear beam (size of 125 mm×0.4 mm) and is used. FIG. 13 shows a structure of a beam homogenizer of this embodiment. The beam homogenizer of FIG. 13 corresponds to that of FIG. 1 in which the slit 205 is omitted. A cylindrical lens group 407 corresponds to the cylindrical lens group 202, a cylindrical lens group 408 corresponds to the cylindrical lens group 203, a cylindrical lens 409 corresponds to the cylindrical lens 204, and a cylindrical lens group 410 corresponds to the cylindrical lens group 206.

All of the above optical members are made of quartz. Quartz was used since its transmissivity in the wavelength range of the excimer laser was sufficiently high. Besides, a suitable coating was applied to the surface of the optical system correspondingly to the wavelength (248 nm in this specification) of the excimer laser used. By this, it was possible to obtain a transmissivity of 99% or more with a single lens. Besides, the durability of the lens was also increased.

Incidentally, any of the above lenses had a curvature in the width direction and was a spherical lens. The material of the lens was synthetic quartz, and AR coat processing was applied so that a transmissivity of 99% or more was obtained for a wavelength of 248 nm of transmitted light.

Similarly to the embodiment 1, the combination of the cylindrical lens group 407 and the cylindrical lens group 410 has a function to unify the distribution of the intensity of the linear laser beam in the longitudinal direction, and the combination of the cylindrical lens group 408 and the cylindrical lens 409 has a function to unify the distribution of the intensity of the linear laser beam in the width direction.

By the combination of the cylindrical lens group 408 and the cylindrical lens 409, a beam with a beam width w is temporarily formed. It is possible to obtain a thinner (thinner than the beam width w) linear laser beam by arranging a doublet cylindrical lens 412 through the mirror 411.

The apparatus shown in FIG. 13 has a function to irradiate the laser light emitted from the laser apparatus 406 through the optical system indicated by the cylindrical lenses 407, 408, 409, 410, and 412 as a linear beam 405. A stage 413 is a one-axis stage operating in one direction. This is scanned, and a substrate put on the stage 413 is irradiated with the laser.

Incidentally, although the laser beam emitted from the laser apparatus 406 is originally a circular beam having a diameter of 0.3 mm, this is expanded into an ellipse of roughly 10×35 mm by using not-shown two pairs of beam expanders. The reference numeral 411 designates the mirror.

When the section of the energy distribution of the linear laser beam formed by the optical system of FIG. 13 is seen in the width direction, a rectangular distribution was shown. That is, it was possible to obtain the linear laser beam having very high uniformity as to the energy density.

At this time, in the cylindrical lens group 407, 7 cylindrical lenses, each having a focal distance of 41 mm, a width of 5 mm, a length of 30 mm, and a center thickness of 5 mm, were used. In the cylindrical lens group 408, 4 cylindrical lenses, each having a focal distance of 250 mm, a width of 2 mm, a length of 60 mm, and a center thickness of 5 mm, were used. In the cylindrical lens 409, a cylindrical lens having a focal distance of 200 mm, a width of 30 mm, a length of 120 mm, and a center thickness of 10 mm was used. In the cylindrical lens group 410, 2 cylindrical lenses, each having a focal distance of 1022 mm, a width of 180 mm, a length of 20 mm, and a center thickness of 35 mm, were used.

In the doublet cylindrical lens 412, 2 cylindrical lenses are used each having a width of 90 mm, a length of 160 mm, and a center thickness of 16 mm, were paired, and a synthetic focal distance was made 220 mm.

The cylindrical lens group 407 was disposed at a distance of 2100 mm from the irradiation surface to the laser apparatus along the optical path. The cylindrical lens group 408 was disposed at a distance of 1980 mm from the irradiation surface to the laser apparatus 406 along the optical path. The cylindrical lens 409 was disposed at a distance of 1580 mm from the irradiation surface to the laser apparatus 406 along the optical path.

The cylindrical lens 410 was disposed at a distance of 1020 mm from the irradiation surface to the laser apparatus 406 along the optical path of the laser. The doublet cylindrical lens 412 was disposed at a distance of 275 mm from the irradiation surface to the laser apparatus along the optical path. The above numerical values were rough standards, and depended on the preparation precision of the lens, or the like.

Figure 14:
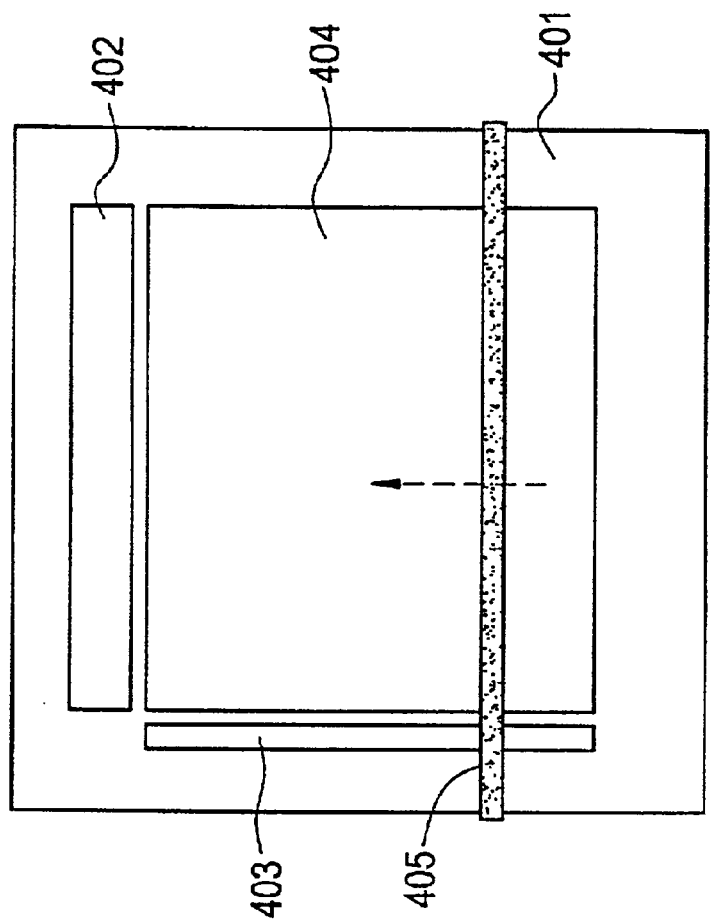
FIG. 14 is a view showing a scanning method of the linear laser of Embodiment 4.

The linear continuous-wave excimer laser beam processed into the above size is scanned by a method as shown in FIG. 14, so that the whole surface of a silicon film is crystallized. Since the long side of the linear laser beam is longer than the length of the short side of the silicon film, the whole surface of the substrate can be crystallized by carrying out scanning once. In FIG. 14, reference numeral 401 designates a substrate; 402, a source driver region; 403, a gate driver region; and 404, a pixel. As is understood from FIG. 14, by merely scanning the linear laser beam 405 once in one direction, the whole silicon film is crystallized.

Although the speed of scanning may be suitably determined by an operator, the standard is selected within the range of 0.5 to 100 mm/s. At this time, it is necessary to make the one-axial stage 413 to run in advance until a scanning speed reaches a desired speed.

[Embodiment 5]

In the case where liquid crystal panels are mass produced, a method in which a plurality of panels are formed on one substrate, and then, the substrate is cut, is generally used.

In this embodiment, a description will be made on an example in which a continuous-wave excimer laser oscillation apparatus is made a light source and a multiple substrate as set forth above is irradiated with a linear laser beam. In this embodiment, the size of the multiple substrate is made 600 mm×720 mm.

Although various methods are conceivable as a method of irradiating the multiple substrate with a linear laser beam, in this embodiment, a typical one is taken up and will be described.

Figure 15:
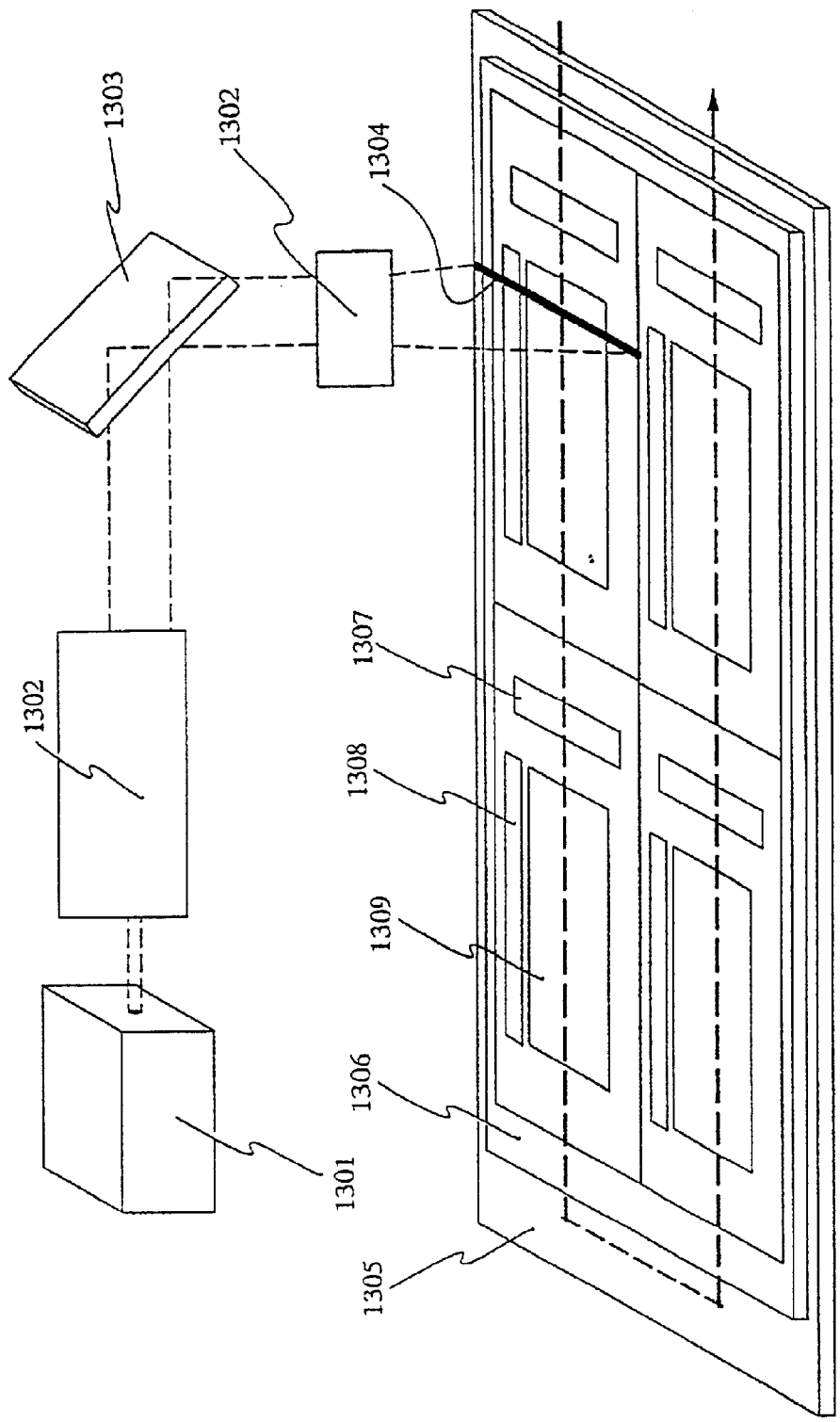
FIG. 15 is a view showing a state of laser irradiation to a multiple substrate of Embodiment 5.

A method used in this embodiment is shown in FIG. 15. A laser light emitted from a continuous-wave excimer laser oscillation apparatus 1301 is made a linear laser beam 1304 at an irradiation surface (substrate 1306) through an optical system 1302 and a mirror 1303. As the optical system 1302, one shown in the previous embodiment, for example, one shown in FIG. 13 is used.

In this embodiment, 5×6, that is, 30 liquid crystal panels of 3.5 inches are formed on the substrate 1306. Since the size of the multiple substrate is 600 mm×720 mm, a region occupied by one panel becomes a square of 120 mm×120 mm. In FIG. 15, only 4 liquid crystal panels are shown for simplicity. In one of them, a region 1307 which becomes a source driver, a region 1308 which becomes a gate driver, and a region 1309 which becomes a pixel are shown.

Since the length of the linear laser beam formed by the optical system shown in FIG. 13 is 125 mm, it is longer than the length of one side of the region (square of 120 mm) occupied by one panel. Thus, only by scanning the linear laser beam once in one direction, the region for one column of panels can be treated. Since panels of 6 rows and 5 columns are arranged on the multiple substrate 1306, the whole surface of the substrate can be irradiated with laser by carrying out scanning 5 times. The scanning of the substrate is carried out by moving an XY stage 1305 movable in two orthogonal directions. The scanning direction of the substrate is made, for example, the direction indicated by an arrow of a dotted line in FIG. 15.

[Embodiment 6]

In this embodiment, a description will be made on another example in which a multiple substrate is irradiated with a linear laser beam from an optical source of a continuous-wave excimer laser oscillation apparatus. In this embodiment, the size of the multiple substrate is made 600 mm×720 mm.

A method used in this embodiment is shown in FIG. 16. A laser light emitted from a continuous-wave excimer laser oscillation apparatus 1401 becomes a linear laser beam 1404 at an irradiation surface (substrate 1406) through an optical system 1402 and a mirror 1403. As the optical system 1402, one shown in the previous embodiment, for example, one shown in FIG. 13 is used.

In this embodiment, 10×12, that is, 120 liquid crystal panels of 2.6 inches are formed on the substrate 1406. Since the size of the multiple substrate is 600 mm×720 mm, a region occupied by one panel becomes a square of 60 mm×60 mm. In FIG. 16, for simplicity, only 4 liquid crystal panels are shown. In one of them, a region 1407 which becomes a source driver, a region 1408 which becomes a gate driver, and a region 1409 which becomes a pixel are shown.

Since the length of the linear laser beam formed by the optical system shown in FIG. 13 is 125 mm, it is longer than the length of one side when the above four panels are arranged by 2 rows and 2 columns (square of 120 mm). Thus, by only scanning the linear laser beam once in one direction, a region for panels of two columns can be treated.

Since the panels of 12 rows and 10 columns are arranged on the multiple substrate 1406, the whole surface of the substrate can be irradiated with laser by carrying out scanning 5 times. The scanning of the substrate is carried out by moving an XY stage 1405 movable in two orthogonal directions. The scanning direction of the substrate is made, for example, a direction indicated by an arrow of a dotted line in FIG. 16.

As the length of the linear laser beam becomes long, or the panel becomes small, the number of columns of panels which can be subjected to laser irradiation by one scan of the linear laser beam increases. According to the length of the linear laser beam and the panel size, three columns of panels or more can be subjected to laser irradiation by one scan of the linear laser beam.

In the above embodiment, although the description has been made on the example in which the excimer laser is used, it is possible to use a pulse oscillation type YAG laser or $YVO_4$ laser, and particularly when a laser apparatus of a laser diode excitation type is used, a high output and a high pulse oscillation frequency can be obtained.

[Embodiment 7]

In this embodiment, a description will be made on an example in which a TFT (thin film transistor) is fabricated by using a crystalline silicon film obtained in the embodiment 1. The steps of this embodiment are shown in FIGS. 17A to 19C.

First, as a substrate, a quartz substrate 701 is prepared. The reason why the quartz substrate is used is that a continuous-wave excimer laser is used as means for crystallization. A silicon oxide film (also called a base film) 702 having a thickness of 200 nm and an amorphous silicon film 703a having a thickness of 55 nm were continuously formed thereon without exposing to the air (FIG. 17A). By doing so, it is possible to prevent an impurity contained in the air, such as boron, from being adsorbed to a lower surface of the amorphous silicon film 703a.

Incidentally, in this embodiment, although the amorphous silicon film is used as an amorphous semiconductor film, another semiconductor film may be used. An amorphous silicon germanium film may be used. Besides, as means for forming the under film and the semiconductor film, a PCVD method, LPCVD method, sputtering method, or the like may be used. Thereafter, when the concentration of hydrogen is high, a heat treatment for reducing the hydrogen concentration may be carried out.

Next, the amorphous silicon film 703a is crystallized. The crystallization is carried out by using the laser irradiation method shown in the embodiment 4. In this way, crystallization is made by carrying out the laser irradiation, so that a region 704a made of a crystalline silicon (polysilicon) film is formed (FIG. 17B).

As another method, there is a method of using a pulse oscillation type YAG laser or $YVO_4$ laser. Particularly, when a laser apparatus of a laser diode excitation type is used, a high output and a high pulse oscillation frequency can be obtained. As laser annealing for crystallization, either one of the second harmonic (532 nm), third harmonic (354.7 nm), and fourth harmonic (266 nm) of the solid laser is used, and for example, a laser pulse oscillation frequency is made 1 to 20000 Hz (preferably 10 to 10000 Hz), and a laser energy density is made 200 to 600 $mJ/cm^2$ (typically 300 to 500 $mJ/cm^2$). Then, a linear beam is irradiated to the whole surface of the substrate, and an overlap ratio of the linear beam at this time is made 80 to 90%. When the second harmonic is used, heat is uniformly conducted also to the inside of the semiconductor layer, so that crystallization becomes possible even if the irradiation energy range is slightly fluctuated. By this, a working margin can be secured, so that fluctuation in crystallization is reduced. Besides, since the pulse frequency is high, the throughput is improved.

Then, the formed crystalline silicon (polysilicon) film is patterned, so that a semiconductor layer 704b of a TFT is formed (FIG. 17C).

Incidentally, before or after the semiconductor layer 704b is formed, an impurity element (phosphorus or boron) for controlling a threshold voltage of the TFT may be added to the crystalline silicon film. This step may be carried out for only an NTFT or PTFT, or both.

Next, an insulating film 705 is formed by a sputtering method or plasma CVD method, and a first conductive film 706a and a second conductive film 706b are formed in a laminated manner by the sputtering method (FIG. 17D).

This insulating film 705 is an insulating film which comes to function as a gate insulating film of the TFT, and the film thickness is made 50 to 200 nm. In this embodiment, a silicon oxide film having a thickness of 100 nm is formed by the sputtering method using silicon oxide as a target. Besides, not only the silicon oxide film but also a laminate structure in which a silicon nitride film is provided on the silicon oxide film may be formed, or a silicon nitride oxide film in which nitrogen is added to the silicon oxide film may be formed.

Incidentally, although this embodiment shows the example in which after laser crystallization of the amorphous silicon film is carried out, patterning is made and the gate insulating film is formed, the sequence of the steps is not particularly limited. For example, such steps may be adopted that after the amorphous silicon film and the gate insulating film are continuously formed by the sputtering method, laser crystallization is carried out and patterning is made. In the case where the films are continuously formed by the sputtering method, excellent interface characteristics can be obtained.

As the first conductive film 706a, a conductive material containing an element selected from Ta, Ti, Mo, and W as its main ingredient is used. The thickness of the first conductive film 706a may be made 5 to 50 nm, preferably 10 to 25 nm. On the other hand, as the second conductive film 707a, a conductive material containing Al, Cu, or Si as its main ingredient is used. The thickness of the second conductive film 707a may be made 100 to 1000 nm, preferably 200 to 400 nm. The second conductive film 707a is provided to lower the wiring resistance of a gate wiring line or gate bus line.

Figure 18A:
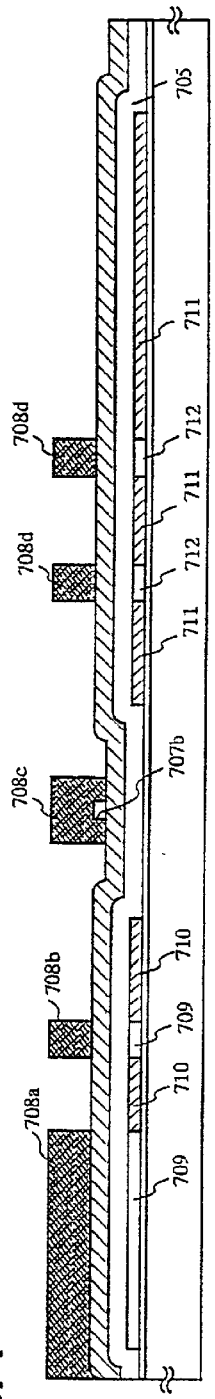
FIGS. 18A to 18D are views showing fabricating steps of the AM-LCD of Embodiment 7.

Next, unnecessary portions of the second conductive film 707a are removed by patterning, and after an electrode 707b which becomes a part of the gate bus line is formed in a wiring line portion, resist masks 708a to 708d are formed. The masks are formed so that the resist mask 708a covers the PTFT, and the resist mask 708b covers a channel formation region of the NTFT of a driver circuit. Besides, the masks are formed so that the resist mask 708c covers an electrode 707b, and the resist mask 708d covers a channel formation region of a pixel matrix circuit. Thereafter, an impurity element to impart an n-type is added using the resist masks 708a to 708d as masks, so that impurity regions 710 and 711 are formed (FIG. 18A).

In this embodiment, phosphorus is used as the impurity element to give the n-type, and an ion doping method using phosphine ($PH_3$) is used. In this step, in order to add phosphorus through the gate insulating film 705 and the first conductive film 706a into the semiconductor layer 704b under them, an acceleration voltage is set as high as 80 keV. It is preferable that the concentration of phosphorus added to the semiconductor layers 704b is made a value within the range of $1\times10^{16}$ to $1\times10^{19}$ atoms/cm$^3$, and here, it is made $1\times10^{18}$ atoms/cm$^3$. Then, the regions 710 and 711 where phosphorus is added to the semiconductor layers are formed. A part of the regions formed here and added with phosphorus functions as an LDD region. A part of regions (regions 709 and 712 of the crystalline silicon film) which was covered with the masks and was not added with phosphorus functions as a channel formation region.

As the adding step of phosphorus, an ion implantation method in which mass separation is carried out may be used, or a plasma doping method in which mass separation is not carried out may be used. Conditions such as an acceleration voltage or dose amount may be suitably set by an operator.

Figure 18B:
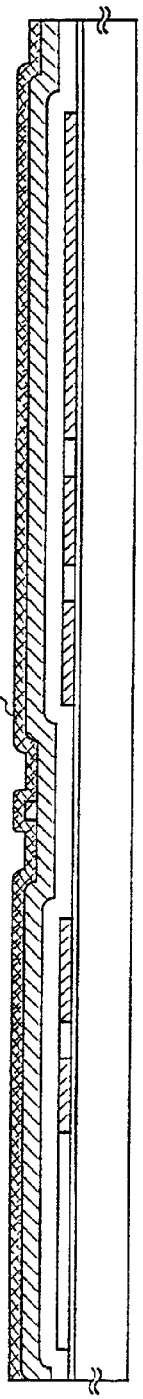

Next, after the resist masks 708a to 708d are removed, if necessary, an activation treatment is carried out. Then, a third conductive film 713a is formed by the sputtering method (FIG. 18B). As the third conductive film 713a, a conductive material containing as the main ingredient an element selected from Ta, Ti, Mo, and W is used. The thickness of the third conductive film 713a is made 100 to 1000 nm, preferably 200 to 500 nm.

Figure 18C:
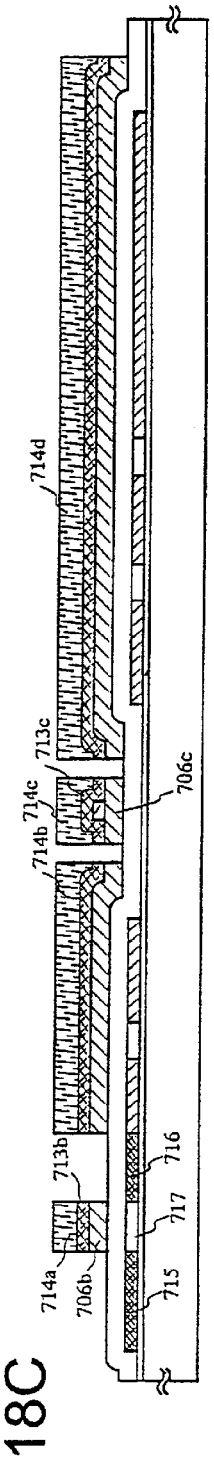

Next, resist masks 714a to 714d are newly formed and patterning is carried out, so that gate electrodes 706b and 713b of the PTFT, and wiring lines 706c and 713c are formed. Thereafter, an impurity element to impart a p-type is added while the masks 714a to 714d are used as they are, so that a source region and a drain region of the PTFT are formed (FIG. 18C). Here, boron is used as the impurity element, and is added by the ion doping method using diborane ($B_2H_6$). Also here, the acceleration voltage is made 80 keV, and boron is added at a concentration of $2\times10^{20}$ atoms/cm$^3$.

Figure 18D:
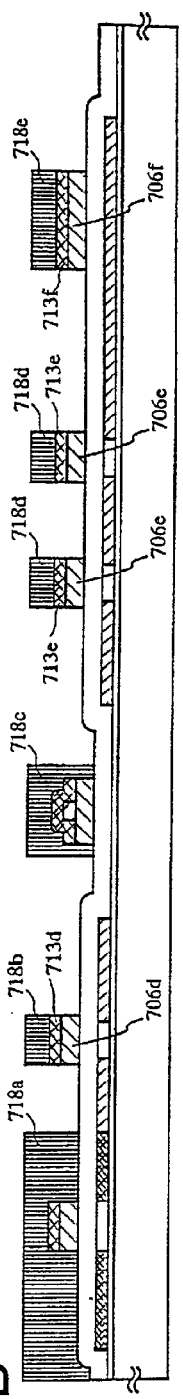

Next, the resist masks 714a to 714d are removed, and resist masks 718a to 718e are newly formed, and then, etching is carried out while the resist masks 718a to 718e are used as masks, so that gate wiring lines 706d and 713d of the NTFT, gate wiring lines 706e and 713e of the TFT of the pixel matrix circuit, and upper wiring lines 706f and 713f of a holding capacitance are formed (FIG. 18D).

Figure 19A:
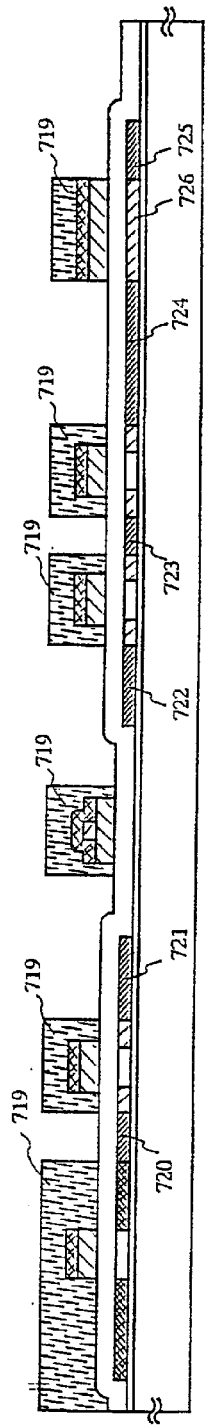
FIGS. 19A to 19C are views showing fabricating steps of the AM-LCD of Embodiment 7.

Next, the resist masks 718a to 718e are removed, and a resist mask 719 is newly formed, and then, an impurity element to give the n-type is added to the source region and drain region of the NTFT so that impurity regions 720 to 725 are formed (FIG. 19A). Here, an ion doping method using phosphine ($PH_3$) is carried out. The concentration of phosphorus added to the impurity regions 720 to 725 is high as compared with the previous step of adding the impurity element to give the n-type, and it is preferable that the concentration is made $1\times10^{19}$ to $1\times10^{21}$ atoms/cm$^3$, and here, it is made $1\times10^{21}$ atoms/cm$^3$.

Figure 19B:
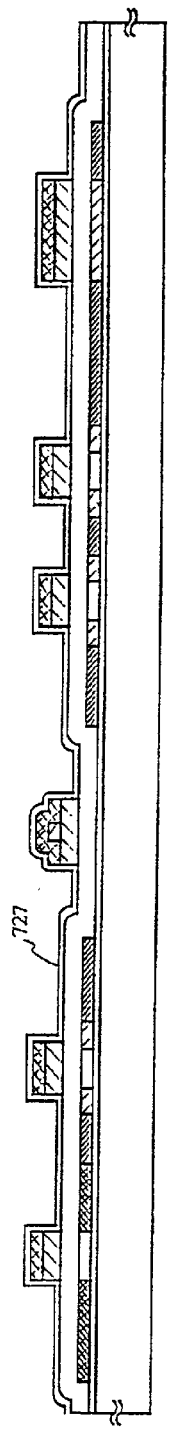

Thereafter, after the resist mask 719 is removed, a protecting film 727 made of a silicon nitride film having a thickness of 50 nm is formed, so that a state of FIG. 19B is obtained.

Next, an activation treatment for activating the added impurity element to give the n-type or p-type is carried out. This step may be carried out by a thermal annealing method using an electronic heating furnace, the foregoing laser annealing method using the excimer laser, YAG laser, or YVO$_4$ laser, or a rapid thermal annealing method (RTA method) using a halogen lamp. In the case of thermal treatment, a heat treatment at 300 to 700° C., preferably 350 to 550° C., in this embodiment, 450° C. and for two hours is carried out in a nitrogen atmosphere.

In the case where the YAG laser or YVO$_4$ laser is used, either one of the fundamental harmonic (1064 nm), second harmonic (532 nm), third harmonic (354.7 nm), or fourth harmonic (266 nm) is used, and for example, a laser pulse oscillation frequency is made 1 to 20000 Hz (preferably 10 to 10000Hz), and a laser energy density is made 200 to 600 mJ/cm$^2$ (typically 300 to 500 mJ/cm$^2$). The linear beam is irradiated to the whole surface of the substrate, and the overlap ratio of the linear beam at this time is made 80 to 90%. Since the pulse frequency is high, the throughput is improved.

Next, after a first interlayer insulating film 730 is formed, contact holes are formed, and source electrodes and drain electrodes 731 to 735 and the like are formed by a well-known technique.

Thereafter, a passivation film 736 is formed. As the passivation film 736, a silicon nitride film, a silicon nitride oxide film, a silicon oxide nitride film, or a laminate film of the foregoing insulating film and a silicon oxide film may be used. In this embodiment, a silicon nitride film having a thickness of 300 nm is used as the passivation film.

Incidentally, in this embodiment, as a pretreatment for formation of the silicon nitride film, a plasma treatment using an ammonia gas is carried out, and then, the passivation film 736 is formed directly. Since hydrogen activated (excited) by plasma in this pretreatment is enclosed with the passivation film 736, hydrogen termination of the active layer (semiconductor layer) of the TFT can be facilitated.

Moreover, in addition to a gas containing hydrogen, when a nitrous oxide gas is added, the surface of the object to be treated is washed by produced moisture, and pollution especially by boron or the like contained in the air can be effectively prevented.

Figure 19C:
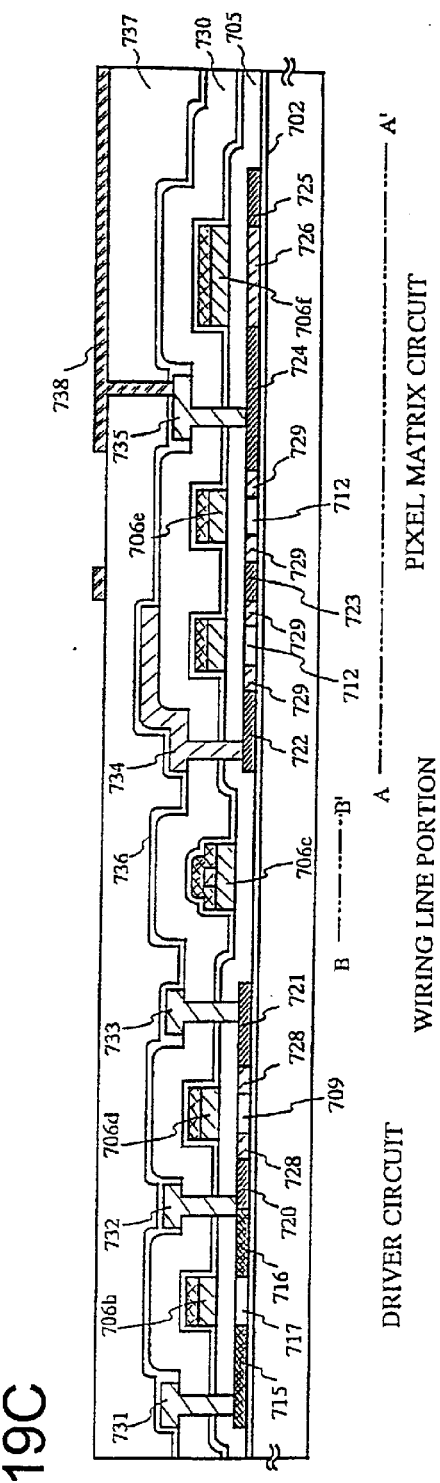

After the passivation film 736 is formed, an acryl film having a thickness of 1 μm is formed as a second interlayer insulating film 737, and then, patterning is carried out to form a contact hole, and a pixel electrode 738 made of an ITO film is formed. In this way, an AM-LCD having a structure as shown in FIG. 19C is completed.

Through the above steps, a channel formation region 709, impurity regions 720 and 721, and LDD regions 728 are formed in the NTFT of the driver circuit. The impurity region 720 becomes a source region and the impurity region 721 becomes a drain region. Besides, a channel formation region 712, impurity regions 722 to 725, and LDD regions 729 are formed in the NTFT of the pixel matrix circuit. Here, in the LDD regions 728 and 729, a region (GOLD region) which overlaps with the gate electrode, and a region (LDD region) which does not overlap with the gate electrode are respectively formed.

On the other hand, in the p-channel TFT, a channel formation region 717 and impurity regions 715 and 716 are formed. The impurity region 715 becomes a source region, and the impurity region 716 becomes a drain region.

In the case where, for example, a liquid crystal display is fabricated by using TFTs fabricated with a semiconductor film formed by the above method, one in which a stain by laser processing is not noticeable as compared with the prior art can be formed. This is because fluctuation in characteristics of TFTs, especially fluctuation in mobility of TFTs is suppressed by the present invention.

Figure 20A:
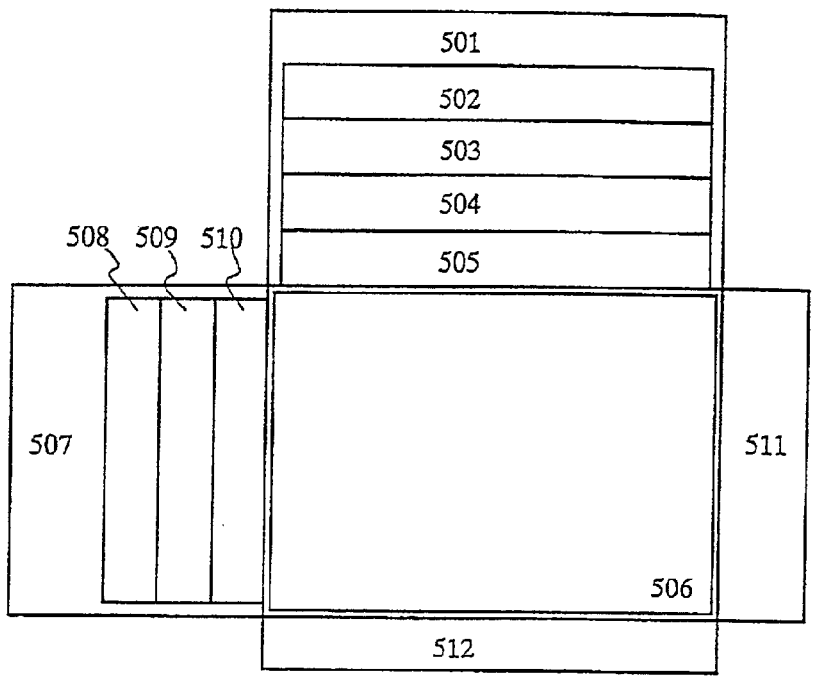
FIGS. 20A and 20B are a top view of a pixel matrix circuit and a view showing a circuit arrangement, respectively, of Embodiment 7.

FIG. 20A shows an example of a circuit structure of an active matrix type liquid crystal display device. The active matrix type liquid crystal display device of this embodiment includes a source signal line side driver circuit 501, a gate signal line side driver circuit (A) 507, a gate signal line side driver circuit (B) 511, a precharge circuit 512, and a pixel matrix circuit 506.

The source signal line side driver circuit 501 includes a shift register circuit 502, a level shifter circuit 503, a buffer circuit 504, and a sampling circuit 505.

The gate signal line side driver circuit (A) 507 includes a shift register circuit 508, a level shifter circuit 509, and a buffer circuit 510. The gate signal line side driver circuit (B) 511 also has the same structure.

In the invention, in view of a driving voltage of the NTFT, it is easy to make lengths of the LDD regions different from each other on the same substrate, and the optimum shapes for TFTs constituting the respective circuits can be formed in the same step.

Figure 20B:
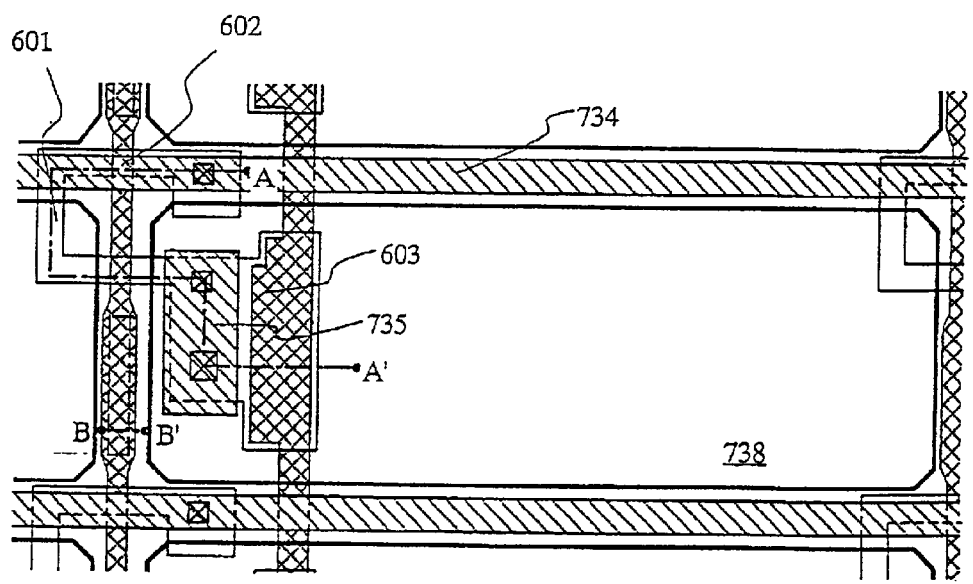

FIG. 20B is a top view of a pixel matrix circuit. Since a A-A' sectional structure of a TFT portion and a B-B' sectional structure of a wiring line portion correspond to FIG. 19C, some portions are designated by the same characters. In FIG. 20B, 601 designates a semiconductor layer; 602, a gate electrode; and 603, a capacitance line. In this embodiment, a gate electrode and a gate wiring line are formed of a first conductive layer and a third conductive layer, and a gate bus line has a cladding structure formed of a first conductive layer, a second conductive layer, and a third conductive layer.

Figure 21A:
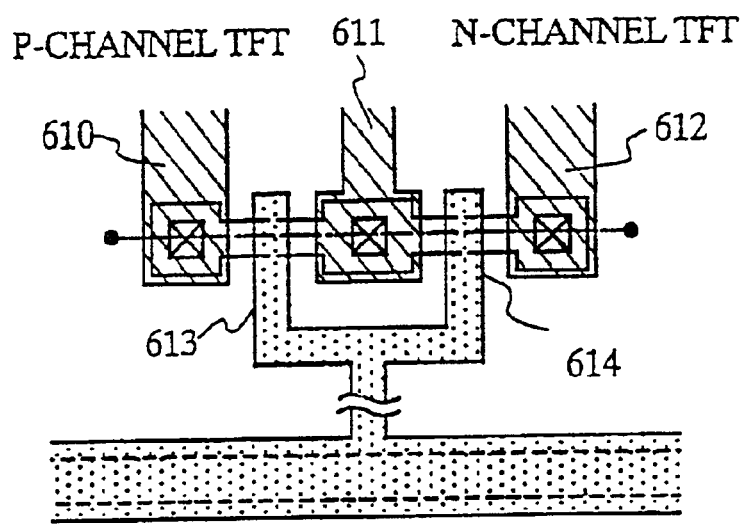
FIGS. 21A and 21B are top views of CMOS circuits of Embodiment 7.
Figure 21B:
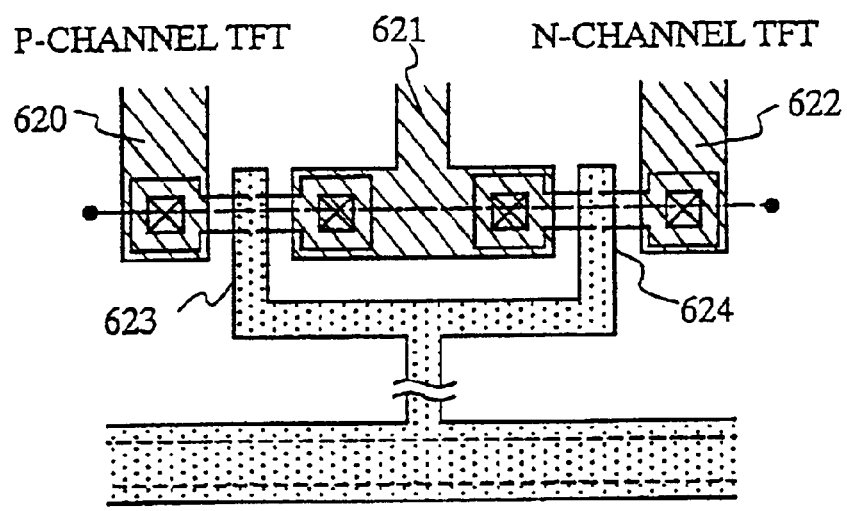

FIG. 21A is a top view of a CMOS circuit which becomes a part constituting a driver circuit, and corresponds to FIG. 19C. Reference numeral 610 designates a source electrode of a PTFT; 611, a drain electrode; 612, a source electrode of an NTFT; and 613 and 614, gate wiring lines. In this embodiment, although active layers of the NTFT and PTFT are in direct contact with each other, and the drain electrode is common to both, the invention is not particularly limited to this structure, but a structure as shown in FIG. 21B (structure where active layers are completely separated) may be adopted. In FIG. 21B, 620 designates a source electrode of a PTFT; 621, a drain electrode; 622, a source electrode of an NTFT; and 623 and 624, gate wiring lines.

In the embodiment, although the description has been made on the steps of fabricating the top gate type TFT, it is needless to say that the laser irradiation apparatus of the invention can be used for fabricating an inverted stagger type TFT.

The laser irradiation apparatus of the invention can be used for a laser annealing treatment to crystallize a silicon film or to improve its crystallinity, or for a laser activation treatment to activate a dopant added to an active layer.

[Embodiment 8]

The invention can also be used for the case where an interlayer insulating film is formed on a conventional MOS-FET and a TFT is formed thereon. That is, it is also possible to realize a three-dimensional semiconductor device in which a reflection type AM-LCD is formed on a semiconductor circuit.

The semiconductor circuit may be formed on an SOI substrate such as SIMOX, Smart-Cut (registered trademark of SOITEC INC.), or ELTRAN (registered trademark of Canon K.K.).

Incidentally, when this embodiment is put into practice, any structure of the embodiments 1 to 7 may be combined.

[Embodiment 9]

In this embodiment, a description will be made on a case where a TFT is formed on a substrate by the fabricating steps shown in the embodiment 7 and an AM-LCD is actually fabricated.

After the state of FIG. 19C is obtained, an oriented film having a thickness of 80 nm is formed on the pixel electrode 738. Next, an opposite substrate, which is obtained by forming a color filter, a transparent electrode (opposite electrode), and an oriented film on a glass substrate, is prepared, a rubbing treatment is carried out for each of the oriented films, and the substrate on which the TFTs are formed and the opposite substrate are bonded to each other using a seal material (sealing material). A liquid crystal material is held between them. Since this cell assembling step may be carried out by using well-known means, its detailed description is omitted.

As the liquid crystal material, for example, TN liquid crystal, PDLC, ferroelectric liquid crystal, antiferroelectric liquid crystal, a compound of ferroelectric liquid crystal and antiferroelectric liquid crystal may be named. For example, it is possible to use a liquid crystal disclosed in 1998 SID, "Characteristics and Driving Scheme of Polymer-Stabilized Monostable FLCD Exhibiting Fast Response Time and High Contrast Ratio with Gray-Scale Capability" by H. Furue et al.; 1997, SID.DIGEST, 841, "A Full-Color Thresholdless Antiferroelectric LCD Exhibiting Wide Viewing Angle with Fast Response Time" by T. Yoshida et al.; 1996, J. Mater. Chem. 6(4), 671–673, "Thresholdless antiferroelectricity in liquid crystals and its application to displays" by S. Inui et al.; or U.S. Pat. No. 5,594,569.

A liquid crystal exhibiting antiferroelectricity in some temperature range is called an antiferroelectric liquid crystal. In mixed liquid crystals including the antiferroelectric liquid crystal, there is a thresholdless antiferroelectric mixed liquid crystal exhibiting electro-optical response characteristics in which transmittance is continuously changed with respect to an electric field. Some thresholdless antiferroelectric mixed liquid crystal exhibits V-shaped electro-optical response characteristics, and a liquid crystal whose driving voltage is about ±2.5 V (cell thickness is about 1 $\mu$m to 2 $\mu$m) has also been found.

Figure 23:
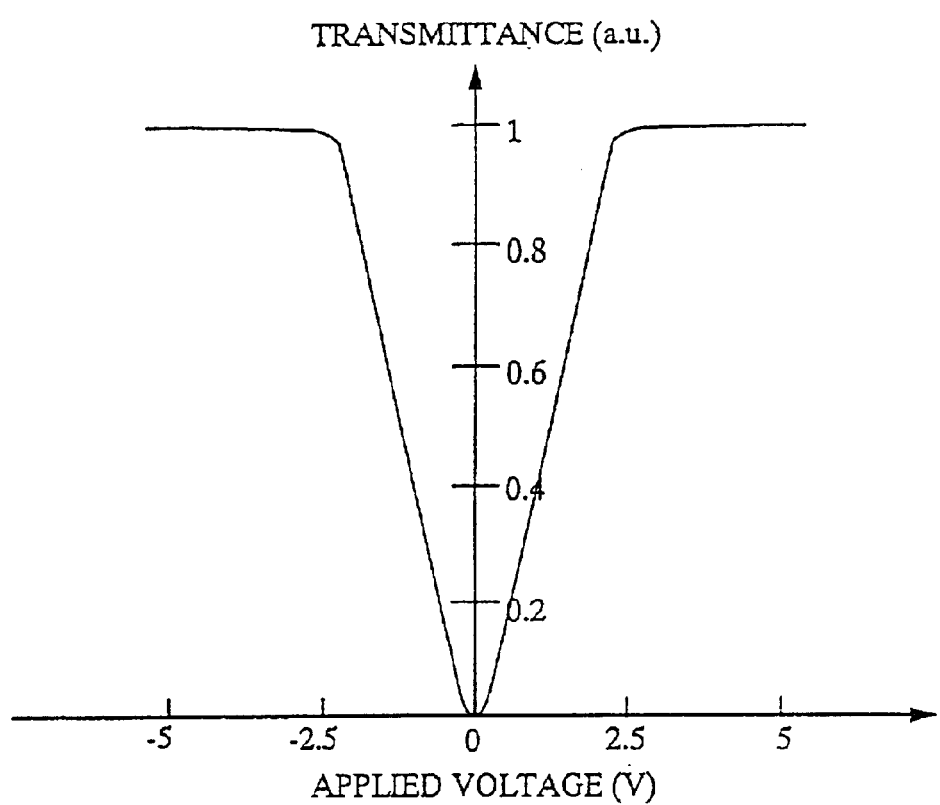
FIG. 23 is a view showing characteristics between applied voltage and light transmissivity in thresholdless antiferroelectric mixed liquid crystal exhibiting a V-shaped electrooptical response of Embodiment 9.

Here, FIG. 23 shows an example of characteristics of light transmittance of the thresholdless antiferroelectric mixed liquid crystal showing the V-shaped electro-optical response to applied voltage. The vertical axis of the graph shown in FIG. 23 indicates the transmittance (in arbitrary unit) and the horizontal axis indicates the applied voltage. Incidentally, the transmission axis of a polarizing plate of a liquid crystal display device at an incident side is set almost parallel to a perpendicular direction of a smectic layer of the thresholdless antiferroelectric mixed liquid crystal which is almost coincident with the rubbing direction of the liquid crystal display device. The transmission axis of the polarizing plate at an outgoing side is set almost perpendicular (crossed Nicols) to the transmission axis of the polarizing plate at the incident side.

As shown in FIG. 23, it is understood that when such a thresholdless antiferroelectric mixed liquid crystal is used, low voltage driving and gradation display become possible.

In the case where such a low voltage driving thresholdless antiferroelectric mixed liquid crystal is used for a liquid crystal display device having an analog driver, it becomes possible to suppress the power supply voltage of a sampling circuit of an image signal to, for example, about 5 V to 8 V. Thus, the operation power supply voltage of the driver can be lowered, and low power consumption and high reliability of the liquid crystal display device can be realized.

Also in the case where such a low voltage driving thresholdless antiferroelectric mixed liquid crystal is used for a liquid crystal display device having a digital driver, an output voltage of a D/A conversion circuit can be lowered, so that the operation power supply voltage of the D/A conversion circuit can be lowered and the operation power supply voltage of the driver can be made low. Thus, low power consumption and high reliability of the liquid crystal display device can be realized.

Thus, to use such a low voltage driving thresholdless antiferroelectric mixed liquid crystal is effective also in the case where a TFT having an LDD region (lightly doped drain region) with a relatively small width (for example, 0 nm to 500 nm or 0 nm to 200 nm) is used.

Besides, in general, the thresholdless antiferroelectric mixed liquid crystal has large spontaneous polarization, and the dielectric constant of the liquid crystal itself is high. Thus, in the case where the thresholdless antiferroelectric mixed liquid crystal is used for a liquid crystal display device, it becomes necessary to provide relatively large holding capacitance for a pixel. Thus, it is preferable to use the thresholdless antiferroelectric mixed liquid crystal having small spontaneous polarization. Besides, it is also permissible to design such that a driving method of the liquid crystal display device is made linear sequential driving, so that a writing period (pixel feed period) of a gradation voltage to a pixel is prolonged and small holding capacitance is compensated.

Incidentally, since low voltage driving can be realized by using such a thresholdless antiferroelectric mixed liquid crystal, low power consumption of the liquid crystal display device can be realized.

Incidentally, as long as a liquid crystal has electro-optical characteristics as shown in FIG. 23, any liquid crystal can be used as a display medium of a liquid crystal display device disclosed in the present specification.

Figure 22:
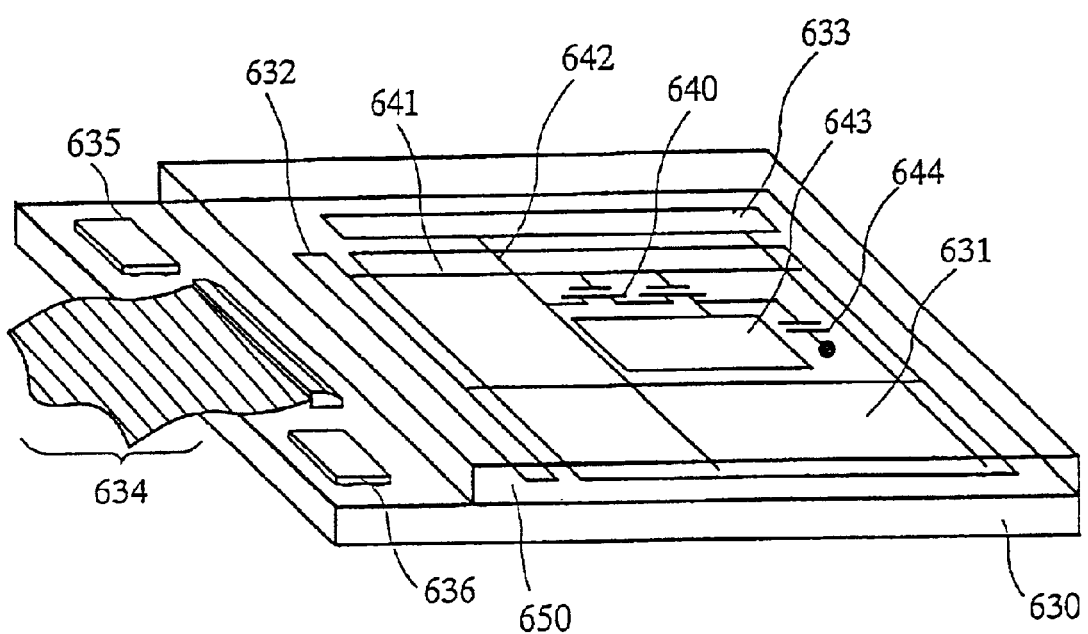
FIG. 22 is a view showing an outer appearance of an AM-LCD of Embodiment 9.

Next, FIG. 22 shows an outer appearance of an AM-LCD fabricated in the manner as described above. As shown in FIG. 22, an active matrix substrate is opposite to an opposite substrate, and a liquid crystal is held between these substrates. The active matrix substrate includes a pixel matrix circuit 631, a scanning line driver circuit 632, and a signal line driver circuit 633 formed on the active matrix substrate 630.

The scanning line driver circuit 632 and the signal line driver circuit 633 are connected to the pixel matrix circuit 631 through a scanning line 641 and a signal line 642, respectively. These driver circuits 632 and 633 are mainly constituted by CMOS circuits.

The scanning line 641 is formed for each row of the pixel matrix circuit 631, and the signal line 642 is formed for each column. A TFT 640 of the pixel matrix circuit is formed in the vicinity of a crossing portion of the scanning line 641 and the signal line 642. A gate electrode of the TFT 640 of the pixel matrix circuit is connected to the scanning line 641, and its source is connected to the signal line 642. Further, a pixel electrode 643 and a holding capacitance 644 are connected to its drain.

With respect to an opposite substrate 650, a transparent conductive film such as an ITO film is formed on the whole surface of the substrate. The transparent conductive film is an opposite electrode to the pixel electrode 643 of the pixel matrix circuit 631, and the liquid crystal material is driven by an electric field formed between the pixel electrode and the opposite electrode. On the opposite substrate 650, as the need arises, an oriented film, a black mask, or a color filter is formed.

IC chips 635 and 636 are attached to the substrate at the active matrix substrate side by using a surface to which an FPC 634 is attached. These IC chips 635 and 636 are constructed by forming circuits, such as a processing circuit of video signals, a timing pulse generating circuit, a γ-correction circuit, a memory circuit, or an operation circuit, on a silicon substrate.

Further, although the description has been made on the liquid crystal display device, as long as the display device is an active matrix type display device, the invention can also be applied to an EL (electroluminescence) display device or an EC (electrochromics) display device.

[Embodiment 10]

Figure 30A:
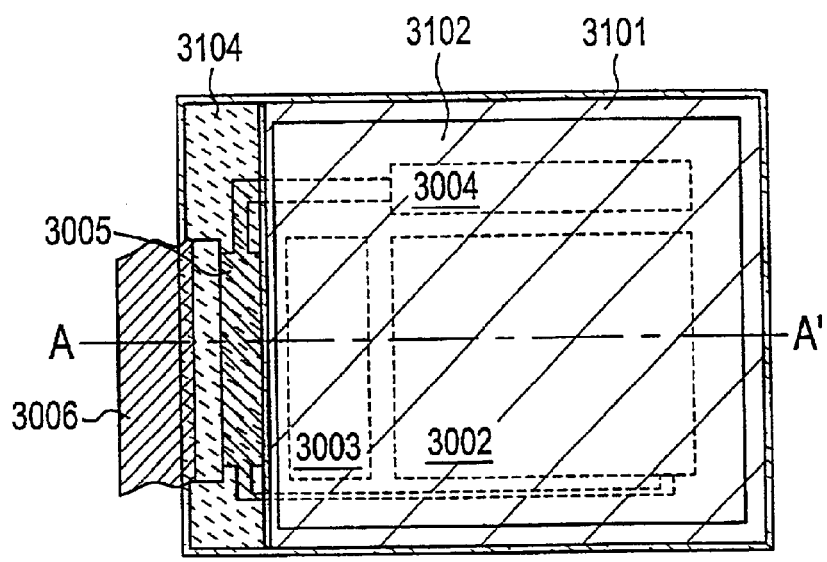
FIGS. 30A and 30B are a top view and a sectional view of an EL display device of Embodiment 10.

In this embodiment, a description will be made on an example in which an EL (electroluminescence) display device is fabricated by using the present invention. FIG. 30A is a top view of the EL display device of the invention and FIG. 30B is a sectional view thereof.

In FIG. 30A, reference numeral 3001 designates a substrate; 3002, a pixel portion; 3003, a source side driver circuit; and 3004, a gate side driver circuit. Each driver circuit leads to an FPC (Flexible Printed Circuit) 3006 through a wiring line 3005, and is connected to an external equipment.

At this time, a first sealing material 3101, a cover material 3102, a filler material 3103, and a second sealing material 3104 are provided so as to surround the pixel portion 3002, the source side driver circuit 3003, and the gate side driver circuit 3004.

Figure 30B:
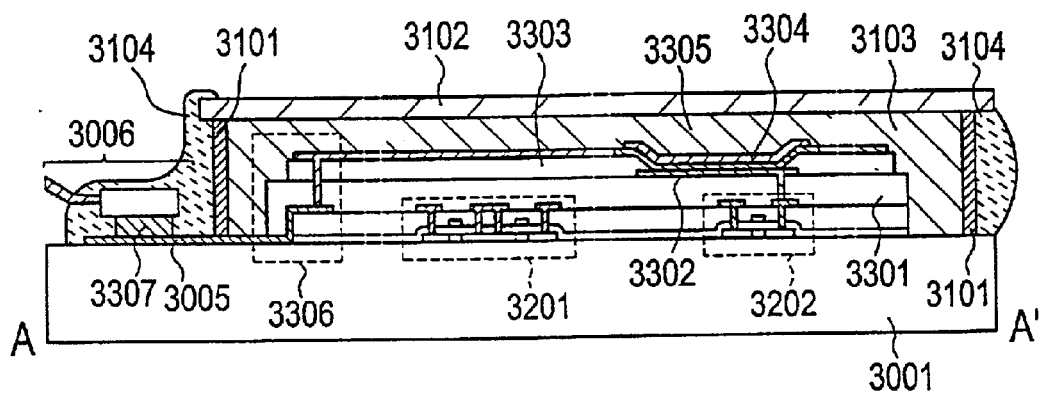

FIG. 30B is a sectional view taken along A–A' of FIG. 30A, and a driver TFT (here, an n-channel TFT and a p-channel TFT are shown) 3201 included in the source side driver circuit 3003 and a pixel TFT (here, a TFT for controlling current to an EL component is shown) 3202 included in the pixel portion 3002 are formed on the substrate 3001.

An interlayer insulating film (flattening film) 3301 made of resin material is formed on the driver TFT 3201 and the pixel TFT 3202, and a pixel electrode (cathode) 3302 electrically connected to the drain of the pixel TFT 3202 is formed thereon. As the pixel electrode 3302, a conductive film having light-shielding properties (conductive film typically containing aluminum, copper, or silver as its main ingredient, or a laminate film of the foregoing film and another conductive film) may be used. In this embodiment, aluminum alloy is used for the pixel electrode.

Then, an insulating film 3303 is formed over the pixel electrode 3302, and an opening portion is formed in the insulating film 3303 on the pixel electrode 3302. In this opening portion, an EL (electroluminescence) layer 3304 is formed on the pixel electrode 3302. As the EL layer 3304, a well-known organic EL material or inorganic EL material may be used. The organic EL material includes a low molecular based (monomer based) material and a high molecular based (polymer based) material, and either of them may be used.

The EL layer 3304 may be formed by a well-known technique. The structure of the EL layer may be made a laminate structure by freely combining a hole injection layer, a hole transport layer, a light emitting layer, an electron transport layer, or an electron injection layer, or may be made a single layer structure.

An anode 3305 made of a transparent conductive film is formed on the EL layer 3304. As the transparent conductive film, a compound of indium oxide and tin oxide or a compound of indium oxide and zinc oxide may be used. It is desirable to remove moisture and oxygen existing on the interface between the anode 3305 and the EL layer 3304 to the utmost degree. Thus, it is necessary to make such contrivance that both are continuously formed in vacuum, or the EL layer 3304 is formed in a nitrogen or rare gas atmosphere, and the anode 3305 is formed while the layer is made not to expose to oxygen or moisture. In this embodiment, a multi-chamber system (cluster tool system) film formation apparatus is used so that the film formation as described above is made possible.

The anode 3305 is electrically connected to the wiring line 3005 at a region designated by 3306. The wiring line 3005 is one for applying a predetermined voltage to the anode 3305, and is electrically connected to the FPC 3006 through a conductive material 3307.

In the manner as described above, the EL component composed of the pixel electrode (cathode) 3302, the EL layer 3304, and the anode 3305 is formed. This EL component is surrounded by the first sealing material 3101, and a cover material 3102 bonded to the substrate 3001 by the first sealing material 3101, and is sealed with the filler material 3103.

As the cover material 3102, a glass plate, FRP (Fiberglass-Reinforced Plastics) plate, PVF (Polyvinyl Fluoride) film, Mylar film, polyester film, or acryl film may be used. In the case of this embodiment, since the radiation direction of light from the EL component is directed to the cover material 3102, a translucent material is used.

However, in the case where the radiation direction of light from the EL component is directed to the opposite side of the cover material, it is not necessary to use a translucent material, but it is possible to use a metal plate (typically a stainless plate), a ceramic plate, or a sheet having such a structure that an aluminum foil is sandwiched between PVF films or Mylar films.

As the filler material 3103, a ultraviolet ray curing resin or thermosetting resin may be used, and PVD (Polyvinyl Chloride), acryl, polyimide, epoxy resin, silicone resin, PVB (Polyvinyl Butyral), or EVA (Ethylene Vinyl Acetate) may be used. When a hygroscopic material (preferably barium oxide) is provided in the inside of the filler material 3103, deterioration of the EL component can be suppressed. Incidentally, in this embodiment, a transparent material is used so that light from the EL component can pass through the filler material 3103.

A spacer may be included in the filler material 3103. At this time, when the spacer is made of barium oxide, it is possible to make the spacer itself have hygroscopicity. In the case where the spacer is provided, as a buffer layer for relieving the pressure from the spacer, it is also effective to provide a resin film on the anode 3305.

The wiring line 3005 is electrically connected to the FPC 3006 through the conductive material 3307. The wiring line 3005 transmits a signal sent to the pixel portion 3002, the source side driver circuit 3003, and the gate side driver circuit 3004 to the FPC 3006, and is electrically connected to an external equipment through the FPC 3006.

Besides, in this embodiment, a second sealing material 3104 is provided to cover an exposed portion of the first sealing material 3101 and a part of the FPC 3006, so that such a structure is taken in which the EL component is completely cut off from the outer air. In this way, the EL display device having the sectional structure of FIG. 30B is obtained.

[Embodiment 11]

Figure 31A:
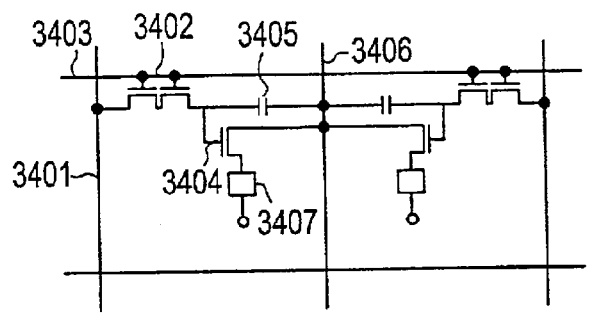
FIGS. 31A to 31C are equivalent circuit views of pixel portions of EL display devices of Embodiment 11.

In this embodiment, examples of a pixel structure which can be used for the pixel portion of the EL display device of the embodiment 10 will be described with reference to FIGS. 31A to 31C. Incidentally, in this embodiment, reference numeral 3401 designates a source wiring line of a switching TFT 3402; 3403, a gate wiring line of the switching TFT 3402; 3404, a current controlling TFT; 3405, a capacitor; 3406,3408, current supply lines; and 3407, an EL component. FIG. 31A shows an example in which the current supply line 3406 is made common to two pixels. That is, this structure is characterized in that two pixels are formed to become axisymmetric with respect to the current supply line 3406. In this case, since the number of power supply lines can be reduced, the pixel portion can be further made fine.

Figure 31B:
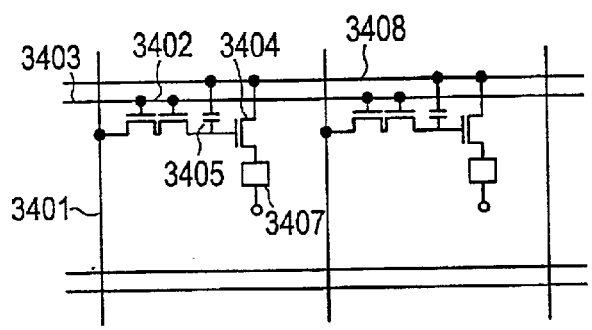

FIG. 31B shows a case where the current supply line 3408 is provided in parallel with the gate wiring line 3403. Although FIG. 31B shows a structure in which the current supply line 3408 does not overlap with the gate wiring line 3403, if both are wiring lines formed in different layers, they may be formed to overlap with each other through an insulating film. In this case, since an occupied area can be made common between the power supply line 3408 and the gate wiring line 3403, the pixel portion can be further made fine.

Figure 31C:
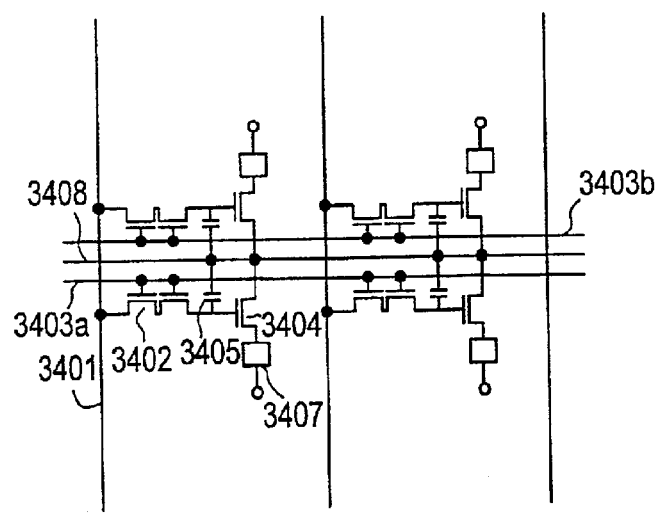

FIG. 31C shows a structure which is characterized in that the current supply line 3408 is provided in parallel with the gate wiring line 3403 similarly to the structure of FIG. 31B, and further, two pixels are formed to become axisymmetric with respect to the current supply line 3408. It is also effective to provide the current supply line 3408 so that it overlaps with either one of gate wiring lines 3403a or 3403b. In this case, since the number of power supply lines can be reduced, the pixel portion can be further made fine.

[Embodiment 12]

A CMOS circuit and a pixel matrix circuit formed through carrying out the present invention may be applied to various electro-optical devices (active matrix type liquid crystal displays, active matrix type EL displays, active matrix type EC displays). Namely, the present invention may be embodied in all the manufacturing processes for the electronic equipments that incorporate those electro-optical devices as display media.

As such an electronic equipment, a video camera, a digital camera, a projector (rear-type or front-type projector), a head mount display (goggle-type display), a navigation system for vehicles, a stereo for vehicles, a personal computer, and a portable information terminal (a mobile computer, a cellular phone, or an electronic book, etc.) may be enumerated. Examples of those are shown in FIGS. 32A to 34C.

Figure 32A:
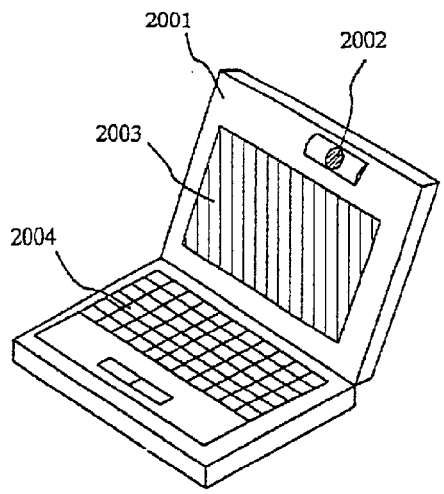
FIGS. 32A to 32F are explanatory views of electronic devices of Embodiment 12.

FIG. 32A shows a personal computer comprising a main body 2001, an image inputting unit 2002, a display unit 2003, and a key board 2004 and the like. The present invention is applicable to the image inputting unit 2002, the display unit 2003, and other signal control circuits.

Figure 32B:
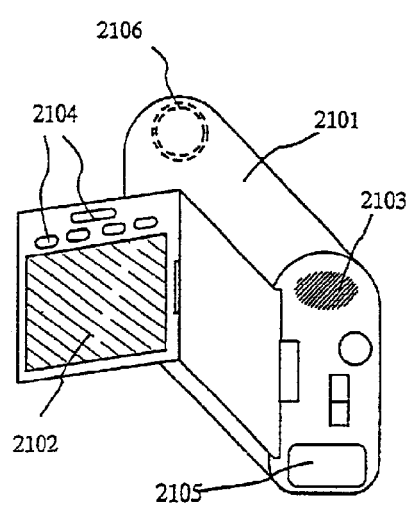

FIG. 32B shows a video camera comprising a main body 2101, a display unit 2102, a voice input unit 2103, operation switches 2104, a battery 2105, and an image receiving unit 2106 and the like. The present invention is applicable to the display unit 2102 and other signal control circuits.

Figure 32C:
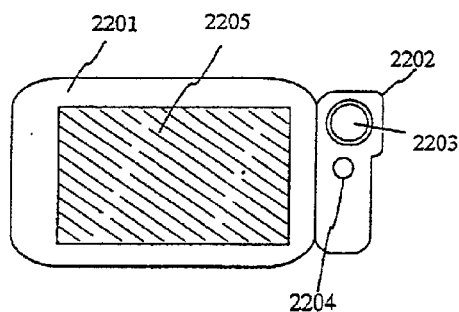

FIG. 32C shows a mobile computer comprising a main body 2201, a camera unit 2202, an image receiving unit 2203, an operation switch 2204, and a display unit 2205 and the like. The present invention is applicable to the display unit 2205 and other signal control circuits.

Figure 32D:
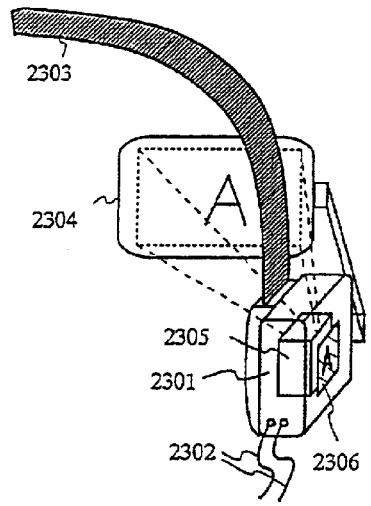

FIG. 32D shows a goggle-type display comprising a main body 2301, a display unit 2302 and arm portions 2303 and the like. The present invention is applicable to the display unit 2302 and other signal control circuits.

Figure 32E:
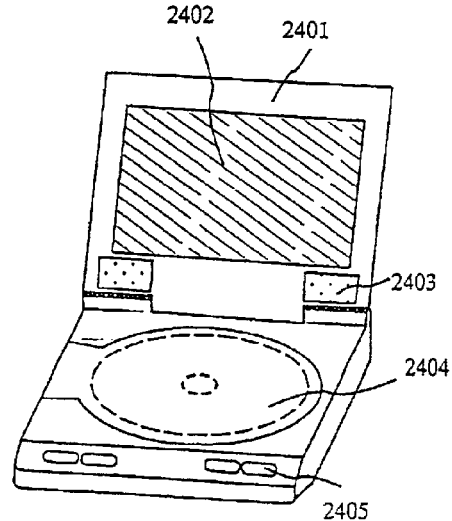

FIG. 32E shows a player that employs a recoding medium in which programs are recorded (hereinafter referred to as a recording medium), and comprises a main body 2401, a display unit 2402, a speaker unit 2403, a recording medium 2404, and an operation switch 2405 and the like. Incidentally, this player uses as the recoding medium a DVD (digital versatile disc), a CD and the like to serve as a tool for enjoying music or movies, for playing video games and for connecting to the Internet. The present invention is applicable to the display unit 2402 and other signal control circuits.

Figure 32F:
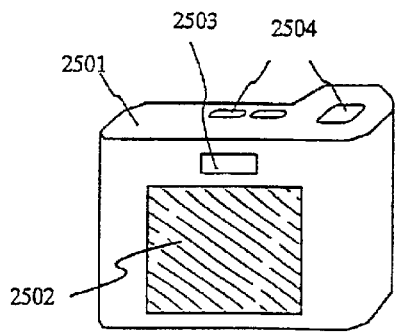

FIG. 32F shows a digital camera comprising a main body 2501, a display unit 2502, an eye piece section 2503, operation switches 2504, and an image receiving unit (not shown) and the like. The present invention is applicable to the display unit 2502 and other signal control circuits.

Figure 33A:
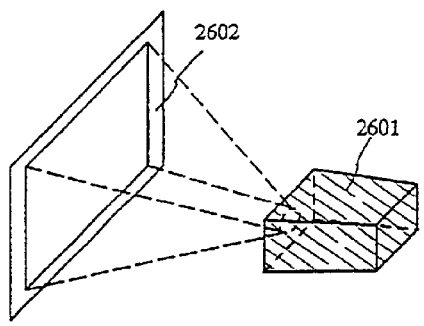
FIGS. 33A to 33D are explanatory views of a projector of Embodiment 12.

FIG. 33A shows a front-type projector comprising a projection device 2601, a screen 2602 and the like. The present invention is applicable to a liquid crystal display device 2808 that constitutes a part of the projection device 2601 and other signal control circuits.

Figure 33B:
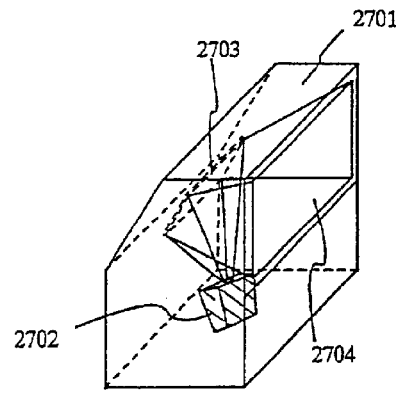

FIG. 33B shows a rear-type projector comprising a main body 2701, a projection device 2702, a mirror 2703, and a screen 2704 and the like. The present invention is applicable to the liquid crystal display device 2808 that constitutes a part of the projection device 2702 and other signal control circuits.

Figure 33C:
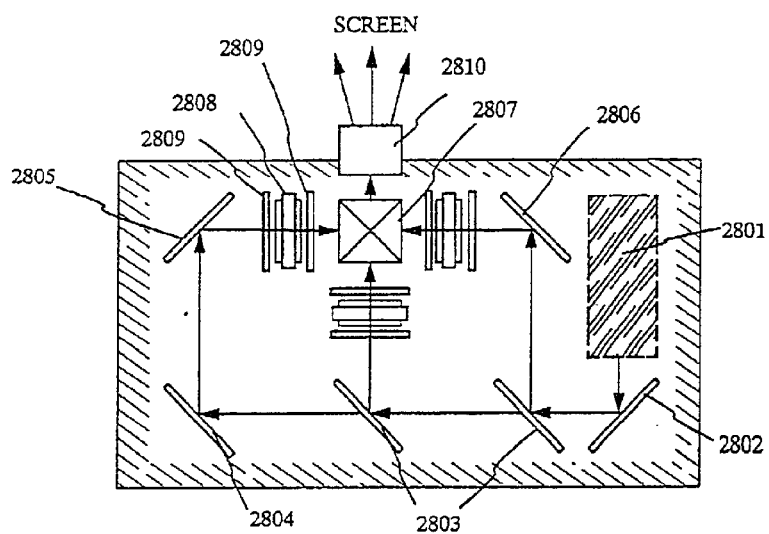

FIG. 33C is a diagram showing an example of the structure of the projection devices 2601 and 2702 in FIGS. 33A and 33B. The projection device 2601 or 2702 comprises a light source optical system 2801, mirrors 2802 and 2804 to 2806, dichroic mirrors 2803, a prism 2807, liquid crystal display devices 2808, phase difference plates 2809, and a projection optical system 2810. The projection optical system 2810 consists of an optical system including a projection lens. This embodiment shows an example of "three plate type", but not particularly limited thereto. For instance, the invention may be applied also to "single plate type". Further, in the light path indicated by an arrow in FIG. 33C, an optical system such as an optical lens, a film having a polarization function, a film for adjusting a phase difference and an IR film may be provided on discretion of a person who carries out the invention.

Figure 33D:
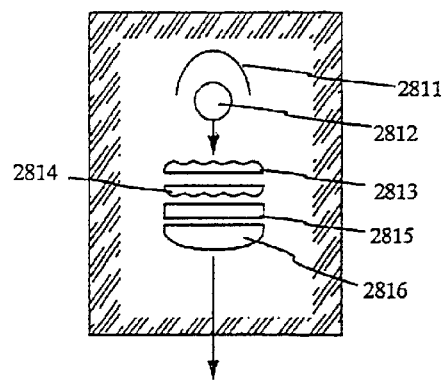

FIG. 33D is a diagram showing an example of the structure of the light source optical system 2801 in FIG. 33C. In this embodiment, the light source optical system 2801 comprises a reflector 2811, light source 2812, lens arrays 2813 and 2814, a polarization conversion element 2815, and a condenser lens 2816. The light source optical system shown in FIG. 33D is an example thereof, and is not particularly limited. For instance, on discretion of a person who carries out the invention, the light source optical system may be provided with an optical system such as an optical lens, a film having a polarization function, a film for adjusting the phase difference and an IR film.

However, the projector shown in FIGS. 33A–33D shows the case in which the electro-optical device of transmission type is employed and an application example using the electro-optical device of reflective type and the EL display device is not illustrated.

Figure 34A:
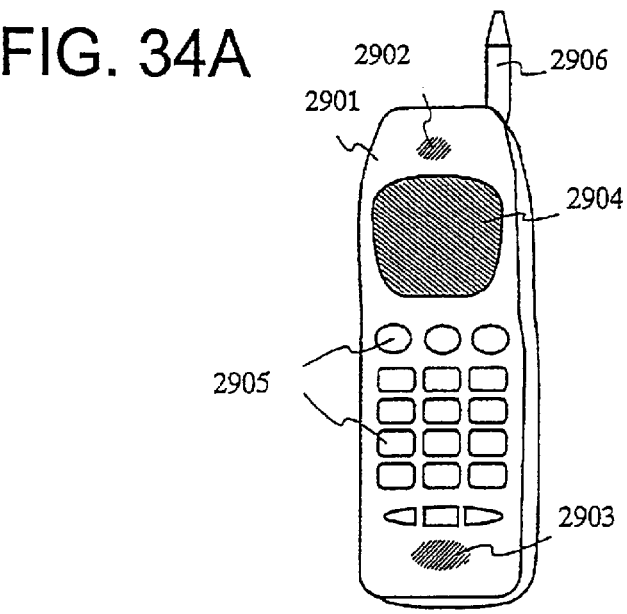
FIGS. 34A to 34C are explanatory views of electronic devices of Embodiment 12.

FIG. 34A is a cellular phone that is composed of a main body 2901, a voice output unit 2902, a voice input unit 2903, a display unit 2904, operation switches 2905, and an antenna 2906 and the like. The present invention can be applied to the voice output unit 2902, the voice input unit 2903 and the display unit 2904 and other signal control circuits.

Figure 34B:
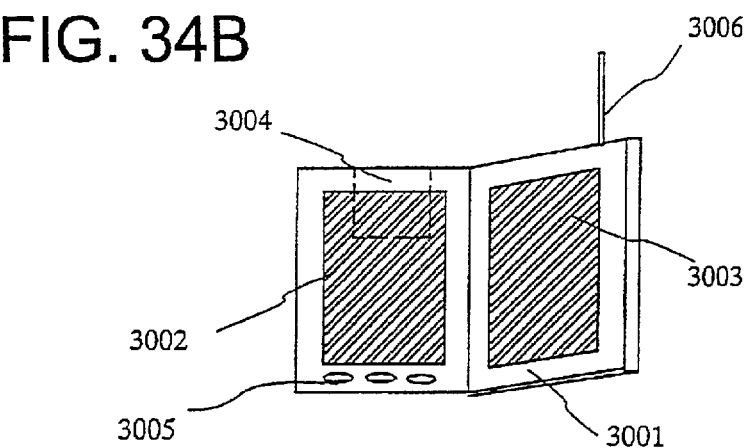

FIG. 34B shows a portable book (electronic book) that is comprised of a main body 3001, display units 3002 and 3003, a memory medium 3004, an operation switch 3005 and an antenna 3006 and the like. The present invention can be applied to the display units 3002 and 3003 and other signal circuits.

Figure 34C:
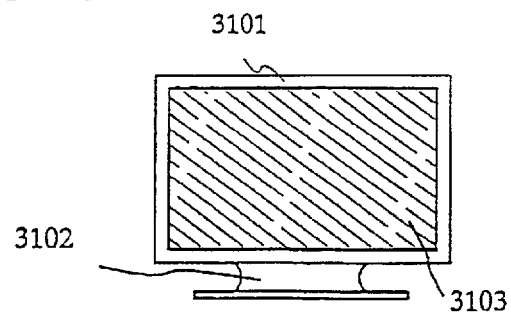

FIG. 34C shows a display that is comprised of a main body 3101, a support base 3102 and a display unit 3103 and the like. The present invention can be applied to the display unit 3103. The display according to the present invention is advantageous in the case where the display is particularly large-sized and in the case where the display is 10 inches or more in an opposite angle (particularly 30 inches or more).

According to the present invention, in a laser irradiation apparatus in which coherent light is processed into a linear beam, the light intensity of the linear beam at an irradiation surface is dispersed, and it is possible to improve the in-plane homogeneity of effect of laser annealing by the laser beam.

What is claimed is:

1. A method of manufacturing a semiconductor device, said method comprising the steps of:

forming a semiconductor film on an insulating surface;

irradiating the semiconductor film with a laser light generated by a laser irradiation apparatus;

said laser irradiation apparatus including:
 a first dividing optical lens;
 a second dividing optical lens;
 a first synthesizing lens;
 a second synthesizing lens comprising a plurality of cylindrical lenses;

said irradiating step including:

dividing one beam into a first plurality of beams in a first direction by the first dividing optical lens;

dividing one beam into a second plurality of beams in a second direction perpendicular to the first direction by the second dividing optical lens;

condensing and synthesizing the second plurality of beams divided in the second direction by the first synthesizing lens;

condensing and synthesizing the first plurality of beams divided in the first direction by the second synthesizing lens, wherein principal points of the plurality of cylindrical lenses are shifted from each other.

2. A method according to claim 1, further comprising the steps of:

forming a gate electrode adjacent to the semiconductor film with an insulating film interposed therebetween;

introducing an impurity into the semiconductor film to form at least a source region, a drain region and a channel region between the source and drain regions.

3. A method according to claim 1, said laser irradiation apparatus further including:

the first dividing optical lens for dividing the beam into (2n+1) beams in the first direction;

the second dividing optical lens for dividing the beam into N(n−1) beams in the second direction perpendicular to the first direction;

the second synthesizing lens including the (n'−1) cylindrical lenses, wherein images obtained by orthogonal projection of respective principal points of the (n'−1) cylindrical lenses onto a plane orthogonal to the second direction become (n'−1) points arranged with an interval of d/(n'−1) on a same line, wherein the character d designates an interval of peaks of interference fringes formed on an irradiation surface by the beam passing through one cylindrical lens of the second synthesizing lens, and wherein the character N designates a natural number, the character n designates an integer not less than 3, and the character n' designates an integer satisfying 3≦n'≦n.

4. A method according to claim 1, said laser irradiation apparatus further including:
   the first dividing optical lens for dividing the beam into 2n beams in the first direction;
   the second dividing optical lens for dividing the beam into N(n−1) beams in the second direction perpendicular to the first direction;
   the second synthesizing lens including the (n'−1) cylindrical lenses,
   wherein images obtained by orthogonal projection of respective principal points of the (n'−1) cylindrical lenses onto a plane orthogonal to the second direction become (n'−1) points arranged with an interval of d/(n'−1) on a same line,
   wherein the character d designates an interval of peaks of interference fringes formed on an irradiation surface by the beam passing through one cylindrical lens of the second synthesizing lens, and
   wherein the character N designates a natural number, the character n designates an integer not less than 3, and the character n' designates an integer satisfying 3≦n'≦n.

5. A method according to claim 1, said laser irradiation apparatus further comprising:
   a laser generating apparatus for generating a laser beam;
   a stage being movable in one direction.

6. A method according to claim 5, wherein the laser generating apparatus generates a continuous-wave excimer laser beam.

7. A method according to claim 1, wherein the semiconductor device is an active matrix type liquid crystal display device.

8. A method according to claim 1, wherein the semiconductor device is an electroluminescence display device.

9. A method according to claim 1, wherein the semiconductor device is one selected from the group consisting of a personal computer, a video camera, a mobile computer, a goggle-type display, a player employing a recoding medium, a digital camera, a front-type projector, a rear-type projector, a cellular phone, a portable book and display.

10. A method of manufacturing a semiconductor device, said method comprising the steps of:
   forming a semiconductor film on an insulating surface;
   irradiating the semiconductor film with a laser light generated by a laser irradiation apparatus;
   said laser irradiation apparatus including:
      a first cylindrical lens group including a plurality of first cylindrical lenses;
      a second cylindrical lens group including a plurality of second cylindrical lenses;
      a third cylindrical lens; and
      a third cylindrical lens group including a plurality of fourth cylindrical lenses,
   said irradiating step including:
   dividing one beam into a first plurality of beams in a first direction by the first cylindrical lens group;
   dividing one beam into a second plurality of beams in a second direction perpendicular to the first direction by the second cylindrical lens group;
   condensing and synthesizing the second plurality of beams divided in the second direction by the third synthesizing lens;
   condensing and synthesizing the first plurality of beams divided in the first direction by the third cylindrical lens group,
   wherein principal points of the fourth cylindrical lenses are shifted from each other.

11. A method according to claim 10, further comprising the steps of:
   forming a gate electrode adjacent to the semiconductor film with an insulating film interposed therebetween;
   introducing an impurity into the semiconductor film to form at least a source region, a drain region and a channel region between the source and drain regions.

12. A method according to claim 10, said laser irradiation apparatus further including:
   the first cylindrical lens group including the (2n+1) first cylindrical lenses;
   the second cylindrical lens group including the N(n−1) second cylindrical lenses;
   the third cylindrical lens group including the (n'−1) fourth cylindrical lenses,
   wherein the first cylindrical lens group, the second cylindrical lens group, the third cylindrical lens, and the third cylindrical lens group being sequentially arranged on an optical path,
   wherein principal planes of the (n'−1) fourth cylindrical lenses form a same plane in the third cylindrical lens group,
   wherein images obtained by orthogonal projection of respective principal points of the (n'−1) fourth cylindrical lenses onto a plane perpendicular to the plane are (n'−1) points arranged with an interval of d/(n'−1) on a same line,
   wherein the character d is expressed by d=λf/L when λ is a wavelength of an excimer laser, f is a focal distance of one cylindrical lens constituting the third cylindrical lens group, and L is a width of one cylindrical lens constituting the first cylindrical lens group, and
   wherein the character N designates a natural number, the character n designates an integer not less than 3, and the character n' designates an integer satisfying 3≦n'≦n.

13. A method according to claim 12,
   wherein a generatrix of the fourth cylindrical lens is parallel to a generatrix of the first cylindrical lens,
   wherein a generatrix of each of the second cylindrical lens and the third cylindrical lens is perpendicular to the generatrix of the first cylindrical lens, and
   wherein the generatrix of the second cylindrical lens is parallel to the generatrix of the third cylindrical lens.

14. A method according to claim 10, said laser irradiation apparatus further comprising:
   the first cylindrical lens group including the 2n first cylindrical lenses;
   the second cylindrical lens group including the N(n−1) second cylindrical lenses;
   the third cylindrical lens group including the (n'−1) fourth cylindrical lenses,
   wherein the first cylindrical lens group, the second cylindrical lens group, the third cylindrical lens, and the third cylindrical lens group being sequentially arranged on an optical path,
   wherein an optical axis of the second cylindrical lens is parallel to an optical axis of the third cylindrical lens,
   wherein principal planes of the (n'−1) fourth cylindrical lenses form a same plane in the third cylindrical lens group, wherein images obtained by orthogonal projection of respective principal points of the (n'−1) fourth cylindrical lenses onto a plane perpendicular to the plane are (n'−1) points arranged with an interval of d/(n'1) on a same line, wherein the character d is expressed by d=λf/L when λ is a wavelength of an excimer laser, f is a focal distance of one cylindrical lens constituting the third cylindrical lens group, and L is a width of one cylindrical lens constituting the first cylindrical lens group, and wherein the character N designates a natural number, the character n designates an integer not less than 3, and the character n' designates an integer satisfying 3≦n'≦n.

15. A method according to claim 14, wherein a generatrix of the fourth cylindrical lens is parallel to a generatrix of the first cylindrical lens, wherein a generatrix of each of the second cylindrical lens and the third cylindrical lens is perpendicular to the generatrix of the first cylindrical lens, and wherein the generatrix of the second cylindrical lens is parallel to the generatrix of the third cylindrical lens.

16. A method according to claim 10, said laser irradiation apparatus further comprising:

a laser generating apparatus for generating a laser beam;

a stage being movable in one direction.

17. A method according to claim 16, wherein the laser generating apparatus generates a continuous-wave excimer laser beam.

18. A method according to claim 10, wherein the semiconductor device is an active matrix type liquid crystal display device.

19. A method according to claim 10, wherein the semiconductor device is an electroluminescence display device.

20. A method according to claim 10, wherein the semiconductor device is one selected from the group consisting of a personal computer, a video camera, a mobile computer, a goggle-type display, a player employing a recoding medium, a digital camera, a front-type projector, a rear-type projector, a cellular phone, a portable book and display.

21. A method of manufacturing a semiconductor device comprising:

forming a semiconductor film irradiating said semiconductor film with a continuous-wave laser light formed by a laser apparatus for crystallizing said semiconductor film, said laser apparatus including:

a first lens group comprising a plurality of cylindrical lenses arranged in a first direction;

a second lens group comprising a plurality of cylindrical lenses arranged in a second direction orthogonal to said first direction;

a first cylindrical lens for condensing a first part of a laser beam in said first direction; and a second cylindrical lens for condensing a second part of the laser beam in said first direction, wherein an optical axis of the second cylindrical lens extends along a same direction as an optical axis of the first cylindrical lens, wherein a principal point of the first cylindrical lens and a principal point of the second cylindrical lens are deviated in the direction perpendicular to the optical axis of the first cylindrical lens and the optical axis of the second cylindrical lens.

22. The method according to claim 21, wherein said continuous-wave laser is an excimer laser.

23. A method of manufacturing a semiconductor device, said method comprising the steps of:

forming a semiconductor film on an insulating surface;

irradiating the semiconductor film with a continuous-wave laser light generated by a laser irradiation apparatus;

said laser irradiation apparatus including:
a first dividing optical lens;
a second dividing optical lens;
a first synthesizing lens;
a second synthesizing lens comprising at least first and second cylindrical lenses;

said irradiating step including:

dividing one beam into a first plurality of beams in a first direction by the first dividing optical lens;

dividing one beam into a second plurality of beams in a second direction perpendicular to the first direction by the second dividing optical lens;

condensing and synthesizing the second plurality of beams divided in the second direction by the first synthesizing lens;

condensing and synthesizing the first plurality of beams divided in the first direction by the second synthesizing lens, wherein principal points of the first and second cylindrical lenses are shifted from each other.

24. A method according to claim 23, further comprising the steps of:

forming a gate electrode adjacent to the semiconductor film with an insulating film interposed therebetween;

introducing an impurity into the semiconductor film to form at least a source region, a drain region and a channel region between the source and drain regions.

25. A method according to claim 23, said laser irradiation apparatus further including:

the first dividing optical lens for dividing the beam into (2n+1) beams in the first direction;

the second dividing optical lens for dividing the beam into N(n−1) beams in the second direction perpendicular to the first direction;

the second synthesizing lens including the (n'−1) cylindrical lenses, wherein images obtained by orthogonal projection of respective principal points of the (n'−1) cylindrical lenses onto a plane orthogonal to the second direction become (n'−1) points arranged with an interval of d/(n'−1) on a same line, wherein the character d designates an interval of peaks of interference fringes formed on an irradiation surface by the beam passing through one cylindrical lens of the second synthesizing lens, and wherein the character N designates a natural number, the character n designates an integer not less than 3, and the character n' designates an integer satisfying 3≦n'≦n.

26. A method according to claim 23, said laser irradiation apparatus further including:

the first dividing optical lens for dividing the beam into 2n beams in the first direction;

the second dividing optical lens for dividing the beam into N(n−1) beams in the second direction perpendicular to the first direction;

the second synthesizing lens including the (n'−1) cylindrical lenses, wherein images obtained by orthogonal projection of respective principal points of the (n'−1) cylindrical lenses onto a plane orthogonal to the second direction become (n'−1) points arranged with an interval of d/(n'1) on a same line, wherein the character d designates an interval of peaks of interference fringes formed on an irradiation surface by the beam passing through one cylindrical lens of the second synthesizing lens, and wherein the character N designates a natural number, the character n designates an integer not less than 3, and the character n' designates an integer satisfying $3 \leq n' \leq n$.

27. A method according to claim 23, said laser irradiation apparatus further comprising:
   a laser generating apparatus for generating a laser beam;
   a stage being movable in one direction.

28. A method according to claim 27, wherein the laser generating apparatus generates a continuous-wave excimer laser beam.

29. A method according to claim 23, wherein the semiconductor device is an active matrix type liquid crystal display device.

30. A method according to claim 23, wherein the semiconductor device is an electroluminescence display device.

31. A method according to claim 23, wherein the semiconductor device is one selected from the group consisting of a personal computer, a video camera, a mobile computer, a goggle-type display, a player employing a recoding medium, a digital camera, a front-type projector, a rear-type projector, a cellular phone, a portable book and display.

32. A method of manufacturing a semiconductor device, said method comprising the steps of:
   forming a semiconductor film on an insulating surface;
   irradiating the semiconductor film with a continuous-wave laser light generated by a laser irradiation apparatus;
   said laser irradiation apparatus including:
      a first cylindrical lens group including a plurality of first cylindrical lenses;
      a second cylindrical lens group including a plurality of second cylindrical lenses;
      a third synthesizing lens; and
      a third cylindrical lens group including at least two fourth cylindrical lenses,
   said irradiating step including:
   dividing one beam into a first plurality of beams in a first direction by the first cylindrical lens group;
   dividing one beam into a second plurality of beams in a second direction perpendicular to the first direction by the second cylindrical lens group;
   condensing and synthesizing the second plurality of beams divided in the second direction by the third synthesizing lens;
   condensing and synthesizing the first plurality of beams divided in the first direction by the third cylindrical lens group,
   wherein principal point of the fourth cylindrical lenses are shifted from each other.

33. A method according to claim 32, further comprising the steps of:
   forming a gate electrode adjacent to the semiconductor film with an insulating film interposed therebetween;
   introducing an impurity into the semiconductor film to form at least a source region, a drain region and a channel region between the source and drain regions.

34. A method according to claim 32, said laser irradiation apparatus further including:
   the first cylindrical lens group including the (2n+1) first cylindrical lenses;
   the second cylindrical lens group including the N(n−1) second cylindrical lenses;
   the third cylindrical lens group including the (n'−1) fourth cylindrical lenses,
   wherein the first cylindrical lens group, the second cylindrical lens group, the third cylindrical lens, and the third cylindrical lens group being sequentially arranged on an optical path,
   wherein principal planes of the (n'−1) fourth cylindrical lenses form a same plane in the third cylindrical lens group,
   wherein images obtained by orthogonal projection of respective principal points of the (n'−1) fourth cylindrical lenses onto a plane perpendicular to the plane are (n'−1) points arranged with an interval of d/(n'−1) on a same line,
   wherein the character d is expressed by $d = \lambda f/L$ when $\lambda$ is a wavelength of an excimer laser, f is a focal distance of one cylindrical lens constituting the third cylindrical lens group, and L is a width of one cylindrical lens constituting the first cylindrical lens group, and
   wherein the character N designates a natural number, the character n designates an integer not less than 3, and the character n' designates an integer satisfying $3 \leq n' \leq n$.

35. A method according to claim 34,
   wherein a generatrix of the fourth cylindrical lens is parallel to a generatrix of the first cylindrical lens,
   wherein a generatrix of each of the second cylindrical lens and the third cylindrical lens is perpendicular to the generatrix of the first cylindrical lens, and
   wherein the generatrix of the second cylindrical lens is parallel to the generatrix of the third cylindrical lens.

36. A method according to claim 32, said laser irradiation apparatus further comprising:
   the first cylindrical lens group including the 2n first cylindrical lenses;
   the second cylindrical lens group including the N(n−1) second cylindrical lenses;
   the third cylindrical lens group including the (n'−1) fourth cylindrical lenses,
   wherein the first cylindrical lens group, the second cylindrical lens group, the third cylindrical lens, and the third cylindrical lens group being sequentially arranged on an optical path,
   wherein an optical axis of the second cylindrical lens is parallel to an optical axis of the third cylindrical lens,
   wherein principal planes of the (n'−1) fourth cylindrical lenses form a same plane in the third cylindrical lens group,
   wherein images obtained by orthogonal projection of respective principal points of the (n'−1) fourth cylindrical lenses onto a plane perpendicular to the plane are (n'−1) points arranged with an interval of d/(n'−1) on a same line,
   wherein the character d is expressed by $d = \lambda f/L$ when $\lambda$ is a wavelength of an excimer laser, f is a focal distance of one cylindrical lens constituting the third cylindrical lens group, and L is a width of one cylindrical lens constituting the first cylindrical lens group, and wherein the character N designates a natural number, the character n designates an integer not less than 3, and the character n' designates an integer satisfying $3 \leq n' \leq n$.

37. A method according to claim 36, wherein a generatrix of the fourth cylindrical lens is parallel to a generatrix of the first cylindrical lens, wherein a generatrix of each of the second cylindrical lens and the third cylindrical lens is perpendicular to the generatrix of the first cylindrical lens, and wherein the generatrix of the second cylindrical lens is parallel to the generatrix of the third cylindrical lens.

38. A method according to claim 32, said laser irradiation apparatus further comprising:

a laser generating apparatus for generating a laser beam;

a stage being movable in one direction.

39. A method according to claim 38, wherein the laser generating apparatus generates a continuous-wave excimer laser beam.

40. A method according to claim 32, wherein the semiconductor device is an active matrix type liquid crystal display device.

41. A method according to claim 32, wherein the semiconductor device is an electroluminescence display device.

42. A method according to claim 32, wherein the semiconductor device is one selected from the group consisting of a personal computer, a video camera, a mobile computer, a goggle-type display, a player employing a recoding medium, a digital camera, a front-type projector, a rear-type projector, a cellular phone, a portable book and display.

* * * * *